(12) United States Patent
Dowski, Jr. et al.

(10) Patent No.: US 7,450,745 B2
(45) Date of Patent: Nov. 11, 2008

(54) SYSTEMS AND METHODS FOR MINIMIZING ABERRATING EFFECTS IN IMAGING SYSTEMS

(75) Inventors: Edward Raymond Dowski, Jr., Lafayette, CO (US); Kenneth Scott Kubala, Boulder, CO (US); Alan Eugene Baron, Boulder, CO (US)

(73) Assignee: OmniVision CDM Optics, Inc., Boulder, CO (US)

( * ) Notice: Subject to any disclaimer, the term of this patent is extended or adjusted under 35 U.S.C. 154(b) by 0 days.

(21) Appl. No.: 11/561,065

(22) Filed: Nov. 17, 2006

(65) Prior Publication Data

US 2007/0122049 A1    May 31, 2007

Related U.S. Application Data

(62) Division of application No. 10/813,993, filed on Mar. 31, 2004.

(60) Provisional application No. 60/459,417, filed on Mar. 31, 2003.

(51) Int. Cl.
*G06K 9/00* (2006.01)

(52) U.S. Cl. .................. 382/128; 382/232; 382/255; 359/16; 359/279; 250/201.9

(58) Field of Classification Search ................ 382/128, 382/232–233, 255, 321; 359/16, 196, 279; 250/216, 201.9
See application file for complete search history.

(56) References Cited

U.S. PATENT DOCUMENTS

| | | | | |
|---|---|---|---|---|
| 5,002,380 A | * | 3/1991 | Aprahamian | ................ 359/859 |
| 5,555,128 A | * | 9/1996 | Khoury et al. | ............... 359/559 |
| 5,610,707 A | * | 3/1997 | Duncan et al. | ............... 356/121 |
| 5,966,216 A | * | 10/1999 | Galburt et al. | ............... 356/401 |
| 6,107,617 A | * | 8/2000 | Love et al. | ................ 250/201.9 |
| 6,111,840 A | * | 8/2000 | Hajjar | .................... 369/112.02 |
| 6,525,302 B2 | * | 2/2003 | Dowski et al. | ............ 250/201.2 |
| 6,674,519 B2 | * | 1/2004 | Mui | ........................... 356/121 |
| 7,058,235 B2 | | 6/2006 | Wakamoto et al. | |
| 2004/0051806 A1 | | 3/2004 | Cambou et al. | |

OTHER PUBLICATIONS

Dowski, Jr., Edward R., et al., "Wavefront Coding: A Modern Method Of Achieving High Performance And/Or Low Cost Imaging Systems," SPIE vol. 5299, 1999.

(Continued)

*Primary Examiner*—Sheela C Chawan
(74) *Attorney, Agent, or Firm*—Lathrop & Gage LC

(57) ABSTRACT

An imaging system for reducing aberrations from an intervening medium, and an associated method of use are provided. The system may be an optical or task-based optical imaging system including optics, such as a phase mask, for imaging a wavefront of the system to an intermediate image and modifying phase of the wavefront such that an optical transfer function of the system is substantially invariant to focus-related aberrations from the medium. A detector detects the intermediate image, which is further processed by a decoder, removing phase effects from the optics and forming a final image substantially clear of the aberrations. Other systems may employ an encoder that codes wavefronts of acoustical waves propagating through a medium to make the wavefronts substantially invariant to acoustical aberrations from the medium. Imaging and decoding of the wavefronts reverse effects of the wavefront coding and produce sounds substantially free of the aberrations.

3 Claims, 37 Drawing Sheets

OTHER PUBLICATIONS

Kubala, Kenneth, et al. "Reducing Complexity In Computational Imaging Systems" Optics Express, vol. 11, No. 18, pp. 2102-2108, Sep. 8, 2003.

Narayanswamy, Ramkumar, et al. "Applications of Wavefront Coded Imaging," SPIE vol. 5299, pp. 163-174, 2004.

* cited by examiner

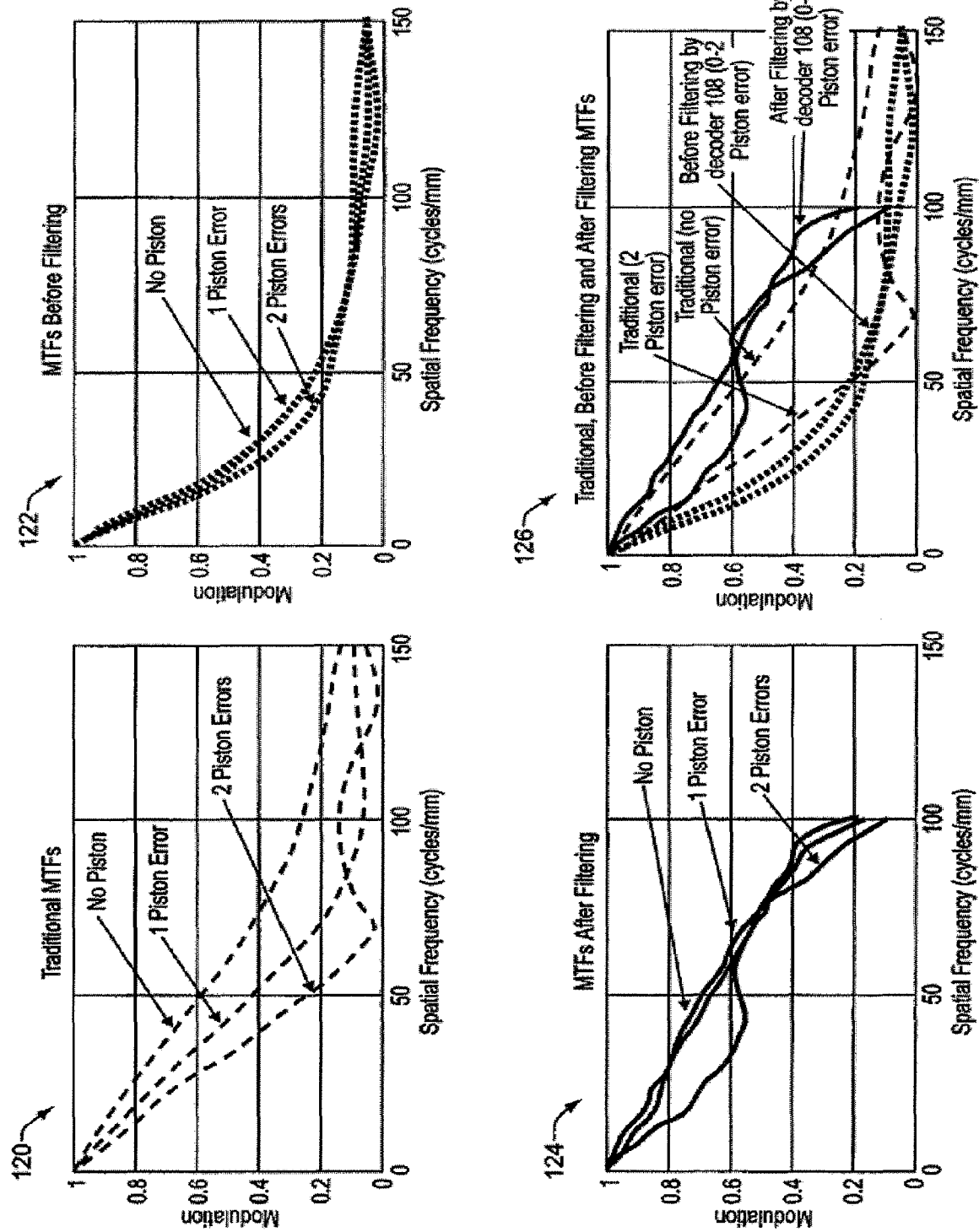

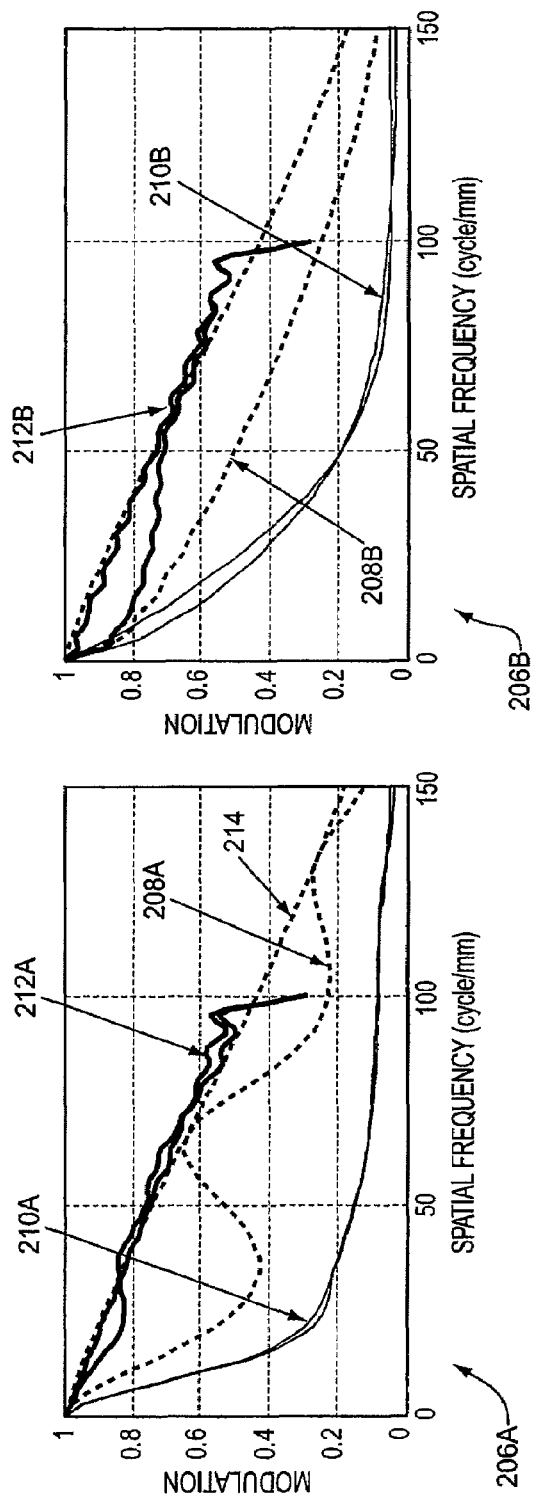
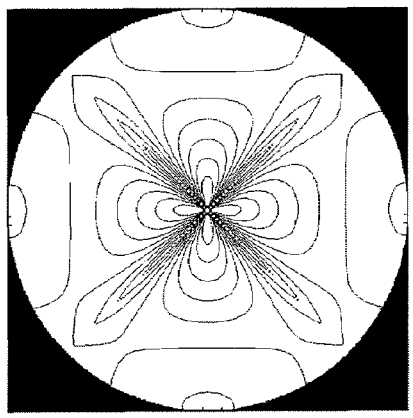
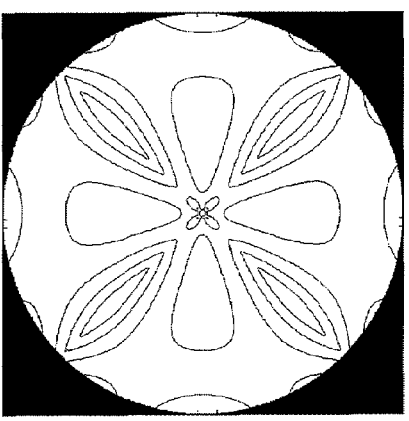
FIG. 9

FIG. 10

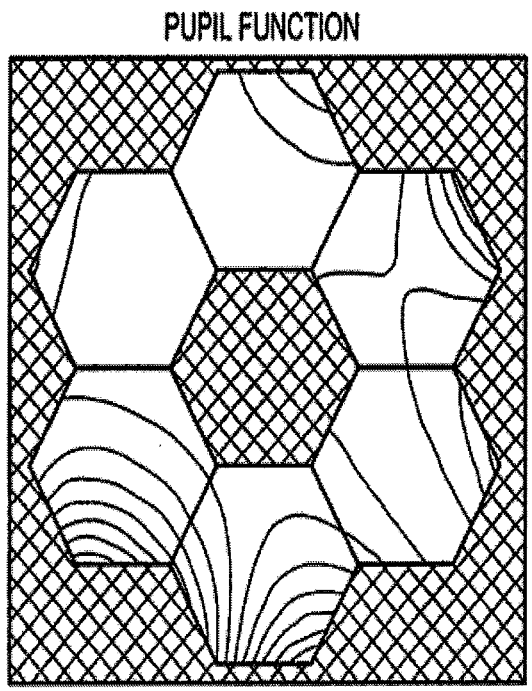

PUPIL FUNCTION

FIRST ORDER OPTICAL PARAMETERS 2-meter collecting aperture
12-meter focal length
5-μm pixel size
100% fill factor
0.5 μm wavelength Phase function is a Zernike polynomial with the following weights

| # | Mathematical Form | Weight | # | Mathematical Form | Weight |
|---|---|---|---|---|---|
| 0 | 1 | 0 | 11 | $(4\rho^2 - 3)\rho^2 \cos 2\theta$ | 0.0379 |
| 1 | $\rho \cos\theta$ | 0 | 12 | $(4\rho^2 - 3)\rho^2 \sin 2\theta$ | -0.1151 |
| 2 | $\rho \sin\theta$ | 0 | 13 | $\rho^4 \cos 4\theta$ | 0.5730 |
| 3 | $2\rho^2 - 1$ | -0.1914 | 14 | $\rho^4 \sin 4\theta$ | 0.2412 |
| 4 | $\rho^2 \cos 2\theta$ | -0.3986 | 15 | $(4\rho^4 - 12\rho^2 + 3)\rho \cos\theta$ | -0.3050 |
| 5 | $\rho^2 \sin 2\theta$ | 0.0290 | 16 | $(4\rho^4 - 12\rho^2 + 3)\rho \sin\theta$ | -0.1698 |
| 6 | $(3\rho^2 - 2)\rho \cos\theta$ | 0.1073 | 17 | $(5\rho^5 - 4\rho^3)\cos 3\theta$ | 0.0589 |
| 7 | $(3\rho^2 - 2)\rho \sin\theta$ | -0.0336 | 18 | $(5\rho^5 - 4\rho^3)\sin 3\theta$ | -0.0965 |
| 8 | $\rho^3 \cos 3\theta$ | 0.0496 | 19 | $\rho^5 \cos 5\theta$ | 0.7186 |
| 9 | $\rho^3 \sin 3\theta$ | -0.0562 | 20 | $\rho^5 \sin 5\theta$ | -0.5219 |
| 10 | $6\rho^4 - 6\rho^2 + 1$ | -0.2093 | | | |

EXIT PUPIL OPD IN WAVES

Weights = [-0.1837  -0.3292  0.3110  -0.0210  -0.0628]

Functional Form = [ $R$   $R^3$   $R^5$   $R\cos(\theta)$   $R^3\cos(3\theta)$ ]

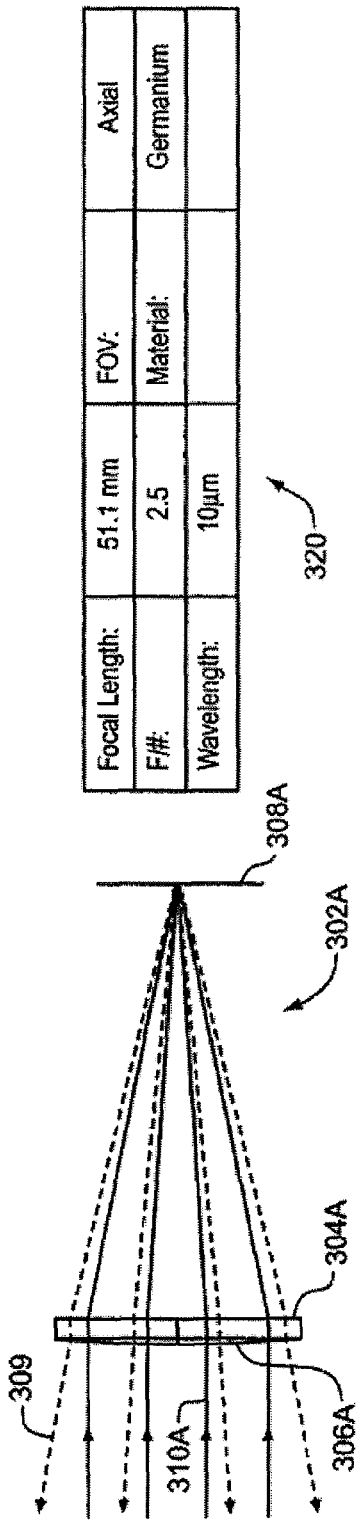
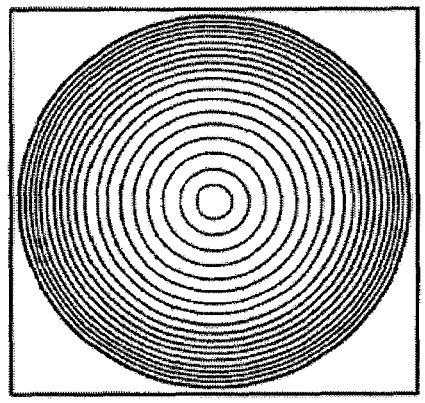
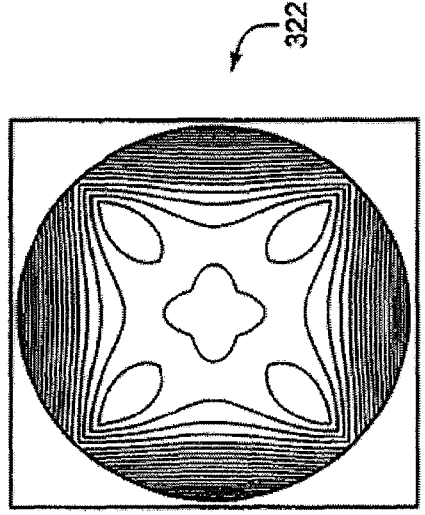

| Focal Length: | 51.1 mm | FOV: | Axial |
|---|---|---|---|
| F/#: | 2.5 | Material: | Germanium |
| Wavelength: | 10μm | | |

Odd Asphere Surface:

Aspheric Terms:

Conic    -8.42
1st      $9.35 \times 10^{-4}$
3rd     $2.61 \times 10^{-4}$
5th     $4.07 \times 10^{-4}$
7th     $9.00 \times 10^{-5}$

Constant Profile Path Surface:

Constant profile path optics, the paths being defined along the sides of a square Along the paths form given by:
$C(x) = 3.9 \times 10^{-3} + 7.7 \times 10^{-5} x^2, |x| < 1$
Across the paths form given by:
$D(y) = 1.97 \times [0.1 y - 0.18 y^2 + 1.02 y^3], 0 < y < 1$

FIG. 19

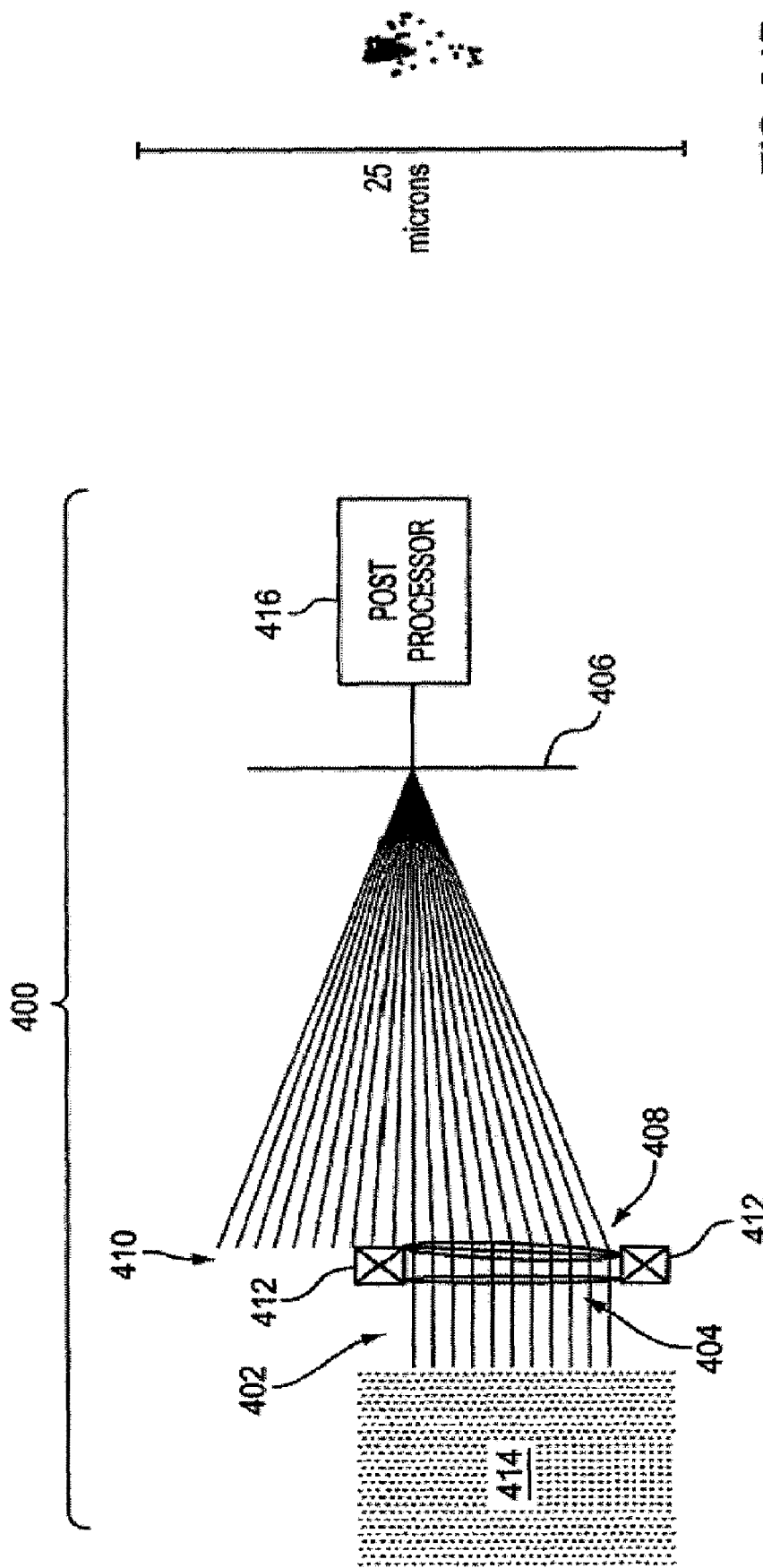

SYSTEMS AND METHODS FOR MINIMIZING ABERRATING EFFECTS IN IMAGING SYSTEMS

RELATED APPLICATIONS

This application is a divisional application of U.S. patent application Ser. No. 10/813,993, filed Mar. 31, 2004 which claims priority to U.S. Provisional Application Ser. No. 60/459,417, filed Mar. 31, 2003. The aforementioned applications are incorporated herein by reference.

BACKGROUND

One goal of an optical imaging system design is to capture nearly error-free images. The optical design thus specifically seeks to correct for certain known optical influences, including, for example, aberrating effects of a medium through which images are captured and unwanted reflections (e.g., scattering) within the imaging system.

Compensating for aberrating effects of the medium is often necessary because the medium unacceptably distorts the optical wavefront, leading to degraded images. The Earth's atmosphere is an example of one medium that can create such degraded images. Turbulent water is another example of such a medium. The only medium that does not affect the optical wavefront is a vacuum at zero atmosphere, which is idealized and practically unachievable.

The prior art has devised adaptive optics to overcome certain problems associated with optical distortions induced by the medium. In typical prior art systems incorporating adaptive optics, information about the medium-induced aberrations is first obtained. After the information is acquired, it is then used to modify or "adapt" the optics of the optical imaging system so as to compensate for the aberrations. The ability of the adaptive optics to compensate for the aberrations is thus directly related to obtaining accurate information concerning the aberrations as generated by the medium.

One prior art technique for obtaining information about aberrations induced by the medium requires direct measurement of phase effects of an optical wavefront traveling through the medium at the aperture stop of the optical imaging system. By measuring the phase of the optical wavefront from a point source with, for example, an interferometer, the optical wavefront may be corrected by changing or "adapting" an optical element, such as a deformable mirror in the optical imaging system. Another term often used to describe adaptive optical elements is "wavefront correction," which implies that the phase errors of the optical wavefront are corrected at the aperture stop. The aberration-induced effects caused by the medium typically change over time. As the properties of the medium vary, therefore, the point spread function ("PSF") or spatial impulse response of the optical imaging system also varies. Consequently, the adaptive optics must also change with time, and the phase effects of the optical wavefront must again be determined. These requirements lead to a complex process and a highly involved optical imaging system.

Another prior art technique forms an image of a known object to determine the PSF of the optical imaging system. Typically, this known object is a point source such as a guide star (e.g., non-resolvable star) or a satellite in the field of view of the optical imaging system. Since the PSF is affected by aberrations of the medium, as well as by aberrations specific to the optical imaging system, the PSF may be integrated over the exposure time to acquire the impulse response of both the optical imaging system and the medium. The PSF is then used to deconvolve each subsequent image to obtain a final image that is essentially equivalent to an image that would be obtained if no aberrations were induced by the medium. This technique, however, has a significant shortcoming due to the requirement of a reference point; for example a non-resolvable star is not often available near the object of interest. In another example, if a satellite serves as a reference, the movement of the satellite makes it difficult to synchronize with primary imaging. In more practical situations on earth, such as imaging ground-based objects with a telescope, there are often no isolated or suitable point reference objects.

Other prior art methods obtain information about aberrations in a medium and do not use an image of a non-resolvable point but attempt to extract information concerning the object from a series of images, while the properties of the aberrating medium change over time. These methods, however, produce images with a high level of noise. Furthermore, attempting to remove all time-varying portions of such images in a series, to obtain a good estimate of the imaged object, requires considerable computing power. In addition, errors are induced when the medium changes and images are taken without the benefit of a current aberration-removing calculation.

In the prior art, one method to compensate for unwanted reflections within and from an optical imaging system is to strategically employ a prism within the system. However, introducing the prism into the path of a converging optical wavefront introduces other aberrations. Moreover, the use of a prism within the system only partially compensates for the unwanted reflections and induces thermal and throughput problems.

SUMMARY

Systems and methods are disclosed for reducing the effects of aberrations in optical imaging systems. In one aspect, an optical imaging system corrects certain aberrations when imaging through a medium. By coding the optical wavefront imaged onto the system's detector, and by post processing data from the detector, the system is made substantially invariant to such aberrations caused by the medium through which a wavefront passes. The wavefront may be, for example, a common phase-front of electromagnetic radiation (e.g., visible, infrared, ultraviolet, radio wave, etc.) imaged by the optical imaging system. The wavefront may also be a phase front of acoustic waves in an acoustic imaging system. The aberrations are, for example, focus-related aberrations like Petzval (field curvature), astigmatism, thermal variations in the system and/or medium, pressure (ripple) variations within the medium, weather-related effects of the medium, etc.

In another aspect, the optical imaging system includes optics that code the wavefront to correct the effects of the aberrations. Such optics may comprise a mask (e.g., a phase mask) that modifies the optical transfer function of the system to account for certain aberrating effects of the medium such as defined by Zernike polynomials. Coding of the wavefront may also occur through an aspheric optical element forming one or more surfaces of the optics.

In one aspect, the medium is air and the wavefront coded optical system operates to diminish the effects of refractive index changes in the air (e.g., induced by temperature and/or barometric pressure changes). Such a system is, for example, useful in lithography.

In another aspect, a decoder performs post processing to generate a substantially aberration-free final image by removing effects of the mask on data from the detector. By way of example, the decoder acts to remove spatial blurring in the image data, caused by the mask, through convolution to generate the final image.

In yet another aspect, a low reflectivity optical imaging system is formed with optics that introduce tilt at an aperture stop of the system to deviate reflected waves such that the waves are blocked by an aperture of the system. Aberrations created by the tilt may be further corrected by wavefront coding and post-processing of a detected image to remove the aberrations. Wavefront coding configurations with or without a tilt at the aperture stop can also be used to further decrease unwanted reflections while also achieving a large depth of field, aberration tolerance, and/or anti-aliasing.

In still another aspect, wavefront coding optics are used within image sighting systems to diminish the effects of certain illuminating sources, such as a laser. In this aspect, the wavefront coding optics (e.g., a phase mask) spatially diffuses the incoming signal from the source such that it is less damaging to a receiving detector or a human eye, and/or such that the reflection from such sources are much lower than the reflection that would occur without the wavefront coding optics.

U.S. Pat. No. 5,748,371 is incorporated herein by reference.

BRIEF DESCRIPTION OF THE DRAWINGS

FIG. 6 shows modulation transfer functions for a representative conventional optical imaging system, an optical imaging system (employing wavefront coding) before filtering, and an optical imaging system (employing wavefront coding) after filtering.

FIG. 9 shows composite pupil maps and illustrative MTF curves illustrating effects of wavefront coding and post processing on adaptive optics affected by quilting and stuck actuator errors.

FIG. 10 shows an adaptive optics pupil overlaid with a phase function of one phase mask, and an associated Zernike polynomial.

FIG. 19 shows two phase forms for use with the element of FIG. 18.

FIG. 21A shows a low reflectivity optical imaging system with a tilt element;

FIG. 21B shows a ray intercept map of the optical imaging system of FIG. 21A.

DETAILED DESCRIPTION OF THE INVENTION

Figure 1:
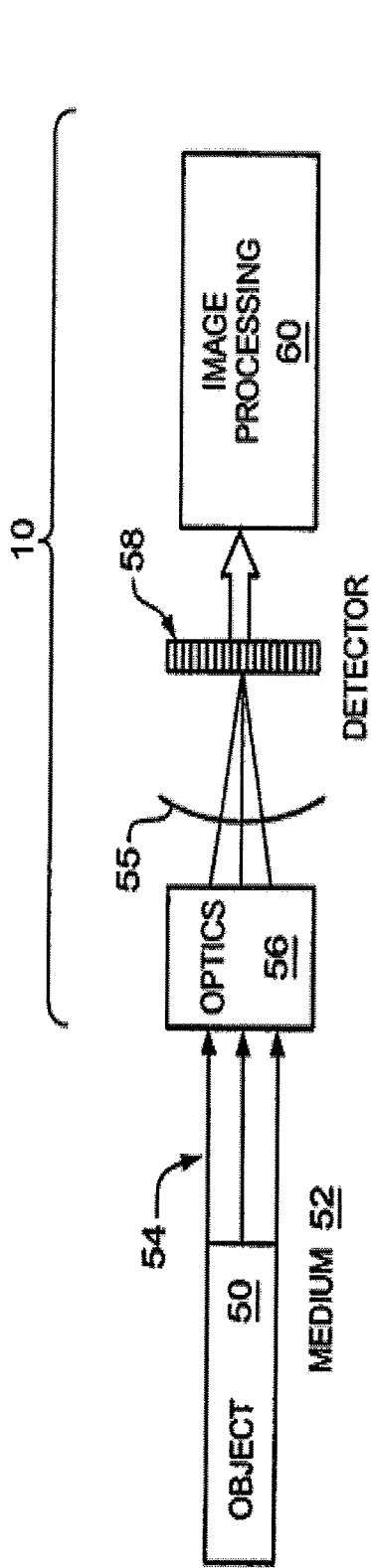
FIG. 1 shows a prior art optical imaging system.

FIG. 1 schematically shows a prior art optical imaging system 10 that images an object 50 through a medium 52 to a detector 58 (e.g., a CCD array). Detector 58 senses electromagnetic radiation 54 that emits and/or reflects from object 50 and that is imaged by optics 56 (e.g., one or more lenses) to detector 58. The electromagnetic radiation 54 imaged at detector 58 is often characterized by an optical wavefront 55, representing a constant phase front of radiation 54. Image processing 60 may then process data from detector 58, for example to provide edge sharpening, color filter array interpolation and/or contrast image adjustment.

Figure 2:
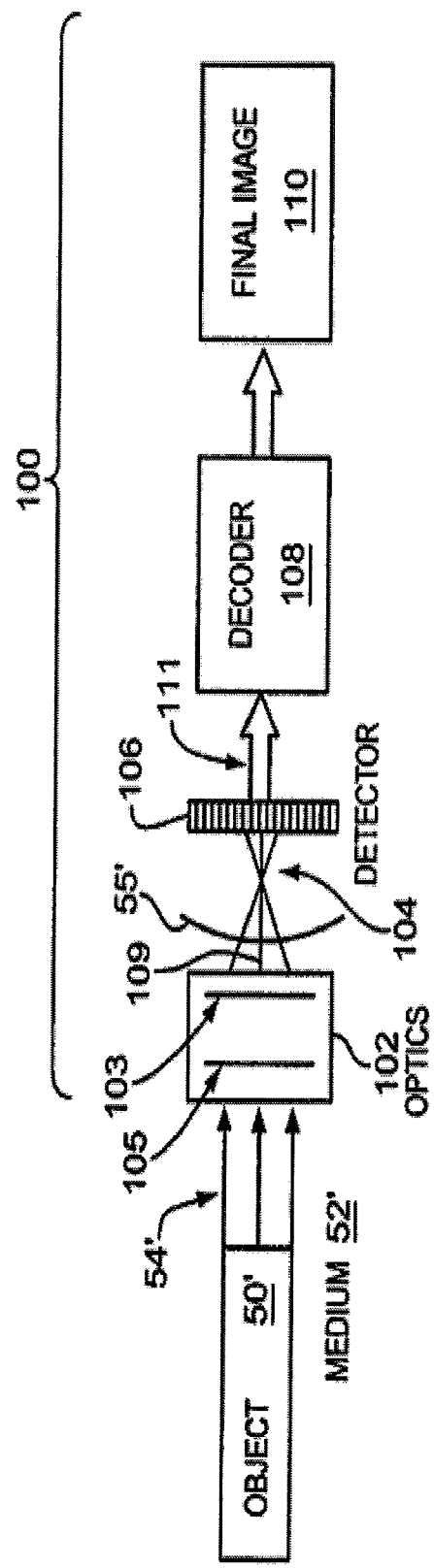
FIG. 2 shows one optical imaging system with wavefront coding optics.

An optical imaging system 100 is schematically shown in FIG. 2 to minimize certain aberrations (e.g., misfocus-related aberrations) introduced by medium 52'. Through operation of optics 102 (e.g., one or more optical lenses or mirrors), imaging system 100 images an object 50' through medium 52' to a detector 106, which converts focused electromagnetic radiation 54' to output data 111. Detector 106 is for example a CCD array, a CMOS array, an IR detector such as a bolometer, etc.

In addition to performing imaging functions, optics 102 also encodes an optical wavefront 55' from object 50' with a phase function, described in more detail below. A decoder 108 processes data 111 from detector 106 to produce a final image 110, which is substantially equivalent to an image that would be obtained by detector 106 if no aberrations were induced by medium 52'. In one embodiment, decoder 108 operates by reversing certain spatial effects induced by wavefront coding of wavefront 55', by optics 102, with the phase function. By way of illustration, decoder 108 may perform a convolution on data 111 with a convolution kernel related to the phase function representing one or more aspherical surfaces within optics 102. Decoder 108 may also act to extract certain information from the detected image. This information could, for example, be a code related to an imaged iris, or related to a location of a detected object. In these examples the final image 110 need not be suitable for human viewing but may be suitable for recognition by a machine.

More particularly, by operation of optics 102, imaging of electromagnetic radiation 54' (reflected and/or emitted by object 50') to detector 106 does not form a sharp image; rather, the focused electromagnetic radiation 54' at detector 106 is spatially blurred in imaging system 100, as indicated by blur 104. Detector 106 senses the focused, spatially blurred electromagnetic radiation 54'. Decoder 108 thus serves to remove effects of the spatial blurring, such as through a convolution, utilizing the phase form which initially caused the blurring. By altering the phase front of wavefront 55', optics 102 thus modifies the optical transfer function of optical imaging system 100; this optical transfer function is substantially the same for a range of focus positions about a best focus position at detector 106 (the best focus position being determined as if optics 102 did not encode wavefront 55').

In one example, medium 52' is the Earth's atmosphere. In another example, medium 52' is turbulent water. Medium 52' may be any medium that transmits electromagnetic radiation 54', other than an idealized zero atmosphere vacuum.

Electromagnetic radiation 54' is, for example, visible radiation, infrared radiation, ultraviolet radiation, radio waves, or any other portion of the electromagnetic spectrum, or combination thereof. Radiation 54' may also be acoustic radiation.

To encode wavefront 55', optics 102 includes a phase mask 103 that modifies the phase of wavefront 55' with the phase function. Mask 103 may be a separate optical element, or it may be integral with one or more optical elements of optics 102; for example, mask 103 may also be made on one or more surfaces of such optical elements. By way of illustration, one family of phase functions (each phase function equivalent to a surface height profile) induced by mask 103 may be represented by the following:

$$\text{Separable-forms}(x,y) = \Sigma a_i [\text{sign}(x)|x|^{b_i} + \text{sign}(y)|y|^{b_i}],$$

where $$|x| \leq 1, |y| \leq 1,$$

and $$\text{sign}(x) = +1 \text{ for } x \geq 0, \text{sign}(x) = -1 \text{ otherwise}.$$

Another exemplary family of phase functions may be described as:

$$\text{Non-separable-forms}(r, \theta) = \Sigma a_i r^{b_i} \cos(w_i \theta + \phi_i)$$

where the sum is over the subscript i. Yet another family of phase functions is described by constant profile path optics set forth in commonly-owned, pending U.S. application Ser. No. 10/376,924, filed on 27 Feb. 2003 and incorporated herein by reference. In practice, different phase functions or different families of phase functions can be combined to form new wavefront modifying phase functions.

Optics 102 may additionally include one or more adaptive optics 105, to assist in correcting distortions within wave front 55' due to medium 52'. In one embodiment, elements 105 and mask 103 comprise one and the same optical structure.

One benefit of the phase function applied by mask 103 is that it may be designed to absorb little or no energy from electromagnetic radiation 54', obviating the need for increased exposure or illumination and yet maintaining benefits of minimizing certain aberrating effects of medium 52'. In one embodiment, phase mask 103 is located either at or near one of the following locations within system 100: a principal plane, an image of the principal plane, an aperture stop, an image of the aperture stop, a lens or a mirror.

The aberrating effects induced by medium 52' may be modeled to optimize image processing by system 100, for example to make system 100 substantially invariant to focus-related aberrations across a broad spectrum of aberrations. Aberrations introduced by medium 52' may include, for example, chromatic aberration, curvature of field, spherical aberration, astigmatism, and temperature or pressure related misfocus often associated with plastic or infrared (IR) optics.

To encode the phase function onto wavefront 55', phase mask 103 may, for example, have variations in opaqueness, thickness and/or index of refraction, which affect the phase of wavefront 55'. Planar or volume holograms or other phase-changing elements may be used as mask 103. More particularly, errors or aberrations introduced by medium 52' in wavefront 55' can be characterized by the following geometric series:

$$\Phi = a + bx + cx^2 + cx^3 + \ldots$$

where the first term represents a constant phase shift, the second term represents a tilt of the phase, the third term represents a misfocus, the fourth term represents a cubic error, etc. All terms that have an even number exponent are focus-related errors, such as chromatic aberration, curvature of field, spherical aberration, astigmatism and temperature or pressure related misfocus. Through the coding of wavefront 55', these focus-related errors introduced by medium 52' are reduced or minimized within optical imaging system 100. Optics 102 may further include corrections to reduce non-focus related errors, i.e., the odd number exponent terms in the above geometric series. Such errors include phase shift and comatic errors. All errors or aberrations may be controlled by combinations of wavefront coding optics 102 and mask 103.

Zernike polynomial analysis may be used to characterize errors or aberrations induced by medium 52' in wavefront 55'. In determining the sensitivity of optics 102 (and mask 103) to minimize these aberrations, Siedel aberrations may be used. The odd and even Zernike polynomials are given by:

$$\begin{aligned}^{o}U_n^m(\rho, \phi) \\ ^{e}U_n^m(\rho, \phi)\end{aligned} = R_n^m(\rho) \begin{aligned}\sin \\ \cos\end{aligned}(m\phi) \quad (1)$$

where the radial function $R_n^m(\rho)$ is defined for n and m integers with $n \geq m \geq 0$ by $$R_n^m(\rho) = \quad (2)$$

$$\begin{cases} \sum_{l=0}^{(n-m)/2} \frac{(-1)^l(n-l)!}{l!\left[\frac{1}{2}(n+m)-l\right]!\left[\frac{1}{2}(n-m)-l\right]!}\rho^{n-2l} \\ \quad \text{for } n-m \text{ even} \\ 0 \quad \text{for } n-m \text{ odd}. \end{cases}$$

Here, $\phi$ is the azimuthal angle with $0 \leq \phi < 2\pi$ and $\rho$ is the radial distance with values between and including 0 and 1. The even and odd polynomials are sometimes also denoted as:

$$Z_n^{-m}(\rho, \phi) = {}^{o}U_n^m(\rho, \phi) = R_n^m(\rho)\sin(m\phi) \quad (3)$$

$$Z_n^m(\rho, \phi) = {}^{e}U_n^m(\rho, \phi) = R_n^m(\rho)\cos(m\phi). \quad (4)$$

Table 1 shows the mathematical form of certain representative Zernike aberrations and whether errors can be corrected using optics 102.

TABLE 1

| # | Mathematical Form | Aberration | Static Errors | Dynamic Errors |
|---|---|---|---|---|
| 0 | 1 | Piston | Correctable | Correctable |
| 1 | $\rho \cos\theta$ | X-tilt | NA | NA |
| 2 | $\rho \sin\theta$ | Y-tilt | NA | NA |
| 3 | $2\rho^2 - 1$ | Focus | Correctable | Correctable |
| 4 | $\rho^2 \cos2\theta$ | Astigmatism | Correctable | Correctable |
| 5 | $\rho^2 \sin2\theta$ | Astigmatism (45°) | Correctable | Correctable |
| 6 | $(3\rho^2 - 2) \rho \cos\theta$ | Coma | Correctable | Not Fully Correctable With Fixed Linear Filtering |
| 7 | $(3\rho^2 - 2) \rho \sin\theta$ | Coma | Correctable | Not Fully Correctable With Fixed Linear Filtering |
| 8 | $6\rho^4 - 6\rho^2 + 1$ | Spherical | Correctable | Correctable |
| 9 | $\rho^3 \cos3\theta$ | Trefoil | Correctable | Not Fully Correctable With Fixed Linear Filtering |
| 10 | $\rho^3 \sin3\theta$ | Trefoil | Correctable | Not Fully Correctable With Fixed Linear Filtering |
| 11 | $(4\rho^2 - 3)\rho^2 \cos2\theta$ | Spherical & Astigmatism | Correctable | Correctable |
| 12 | $(4\rho^2 - 3)\rho^2 \sin2\theta$ | Spherical & Astigmatism | Correctable | Correctable |
| 13 | $(4\rho^4 - 12\rho^2 + 3) \rho \cos\theta$ | Coma | Correctable | Not Fully Correctable With Fixed Linear Filtering |
| 14 | $(4\rho^4 - 12\rho^2 + 3) \rho \sin\theta$ | Coma | Correctable | Not Fully Correctable With Fixed Linear Filtering |
| 15 | $20\rho^6 - 30\rho^4 + 12\rho^2 - 1$ | Spherical | Correctable | Correctable |

Table 1 shows that static errors and dynamic errors can be corrected by optics 102 (including mask 103) for a number of aberrations. In one example, static and dynamic errors brought about by coma aberrations may be corrected with optics 102. In another example, x-tilt and y-tilt aberrations are not corrected with optics 102 for general unknown tilts, but are corrected by other methods. Coma and Trefoil are special aberrations that can be corrected although specialized signal processing may be required.

If medium 52' is, for example, a turbulent medium such as Earth's atmosphere, adaptive optics 105 may still be used. However, because of optics 102 (and mask 103), the amount of aberration correction performed by separate adaptive optics (e.g., adaptive optics 105), if used, is reduced. Accordingly, optical imaging system 100 may be designed to minimize the system's coma and lateral chromatic aberrations, as well as the probability that coma and lateral chromatic aberrations will arise, through optimization and tolerancing of system 100. More particularly, the combination of optics 102 (with mask 103) and the optimization of system 100 to minimize coma and lateral chromatic aberrations results in a robust imaging system 100 that minimizes aberrating effects introduced by medium 52'.

As described in more detail below, one skilled in the art appreciates that adaptive optics 105 may include a segmented mirror, each part of the segmented mirror being moveable (or actuated) to adapt the wavefront to a desired phase form. Those skilled in the art also appreciate that piston error may result from such segmented mirrors. Fortunately, piston error is one form of aberration that may also be minimized by optical imaging system 100 with optics 102.

Figure 3:
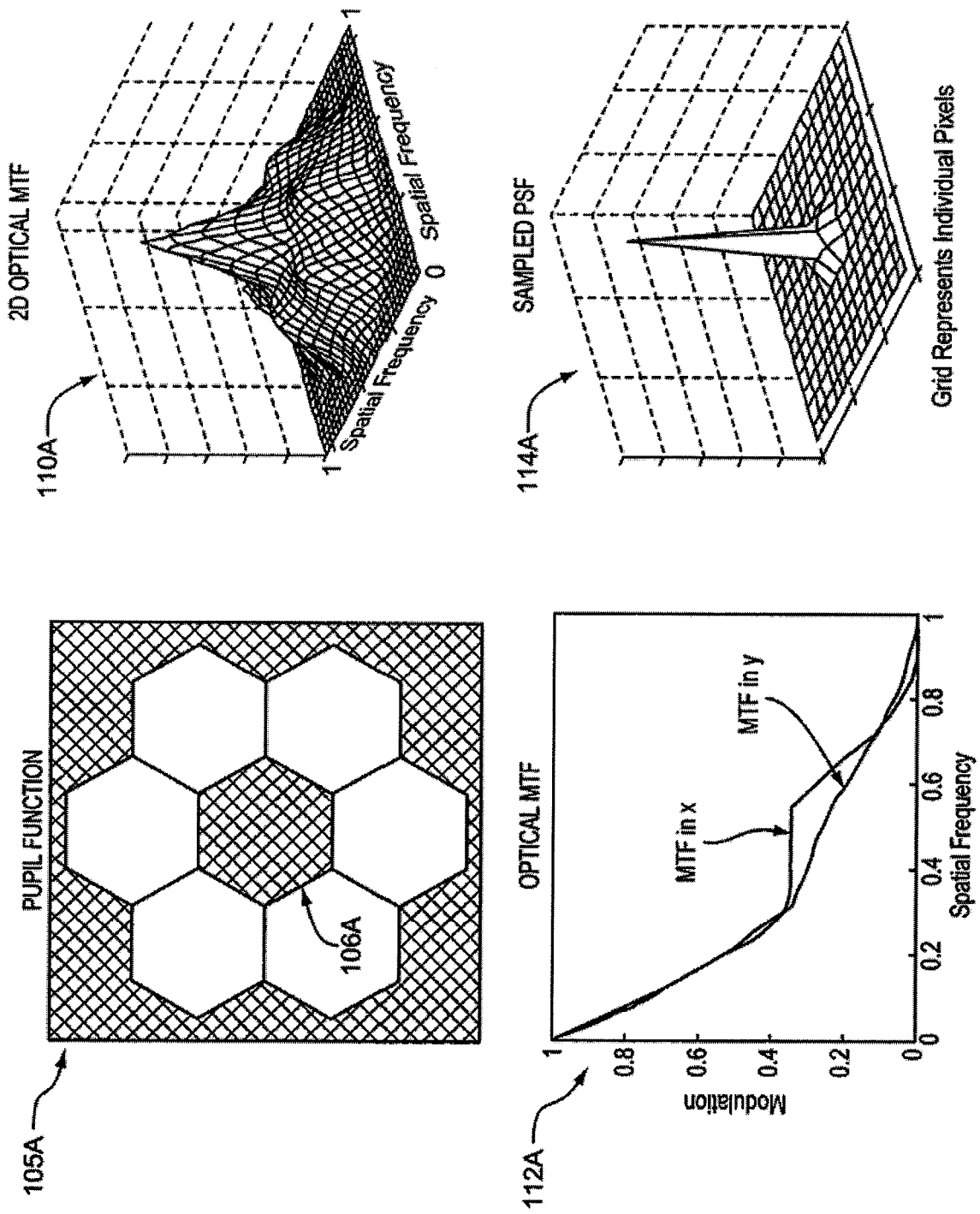
FIG. 3 shows a pupil map and corresponding 2D optical modulation transfer function ("MTF"), sample PSF, and Optical MTF for a segmented optical system without piston error.

FIG. 3 illustrates a pupil function 105A illustrating segmented adaptive optics. Pupil function 105A has an obscuration 106A at its center and is free of piston error across each segment. The optical modulation transfer function ("optical MTF", or "MTF") of a wavefront passing through pupil function 105A is illustratively shown in graph 110A. Graph 110A shows a two-dimensional (2D) MTF for pupil function 105A, illustrating diffraction-limited performance. Graph 112A specifically shows traces along the vertical (y) and horizontal (x) axes for the 2D MTF, which has a steady but decreasing modulation as spatial frequency increases. A sampled point spread function ("PSF") as sampled by a detector is shown in graph 114A.

Figure 4:
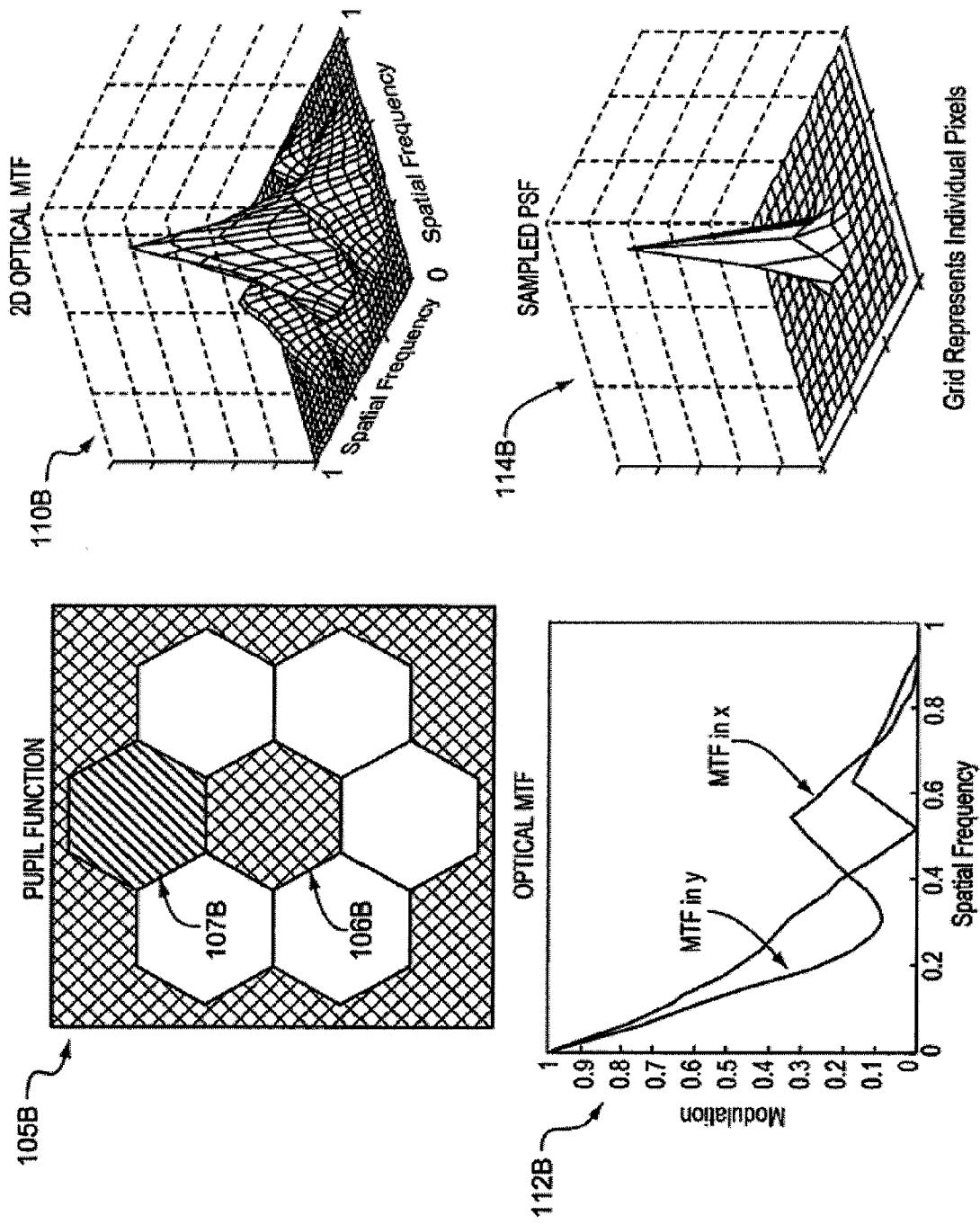
FIG. 4 shows a pupil map and corresponding 2D optical MTF, sample PSF, and MTF curves for a segmented optical system with one segment piston error.

FIG. 4 illustrates a pupil function 105B illustrating another segmented adaptive optics. Pupil function 105B has an obscuration 106B at its center and has one segment 107B with a pi/2 phase shift piston error. The MTF of a wavefront passing through pupil function 105B is illustratively shown in graph 110B. Graph 110B shows the 2D MTF for pupil function 105B, illustrating less than diffraction-limited performance due to a phase shift of segment 107B. Graph 112B specifically shows a reduction in contrast, as compared to graph 112A, as spatial frequency increases. A sampled point spread function ("PSF") as sampled by a detector is shown in graph 114B. The sampled PSF of graph 114B noticeably broadens (as compared to the PSF of graph 114A) due to a reduction in spatial resolution.

Figure 5:
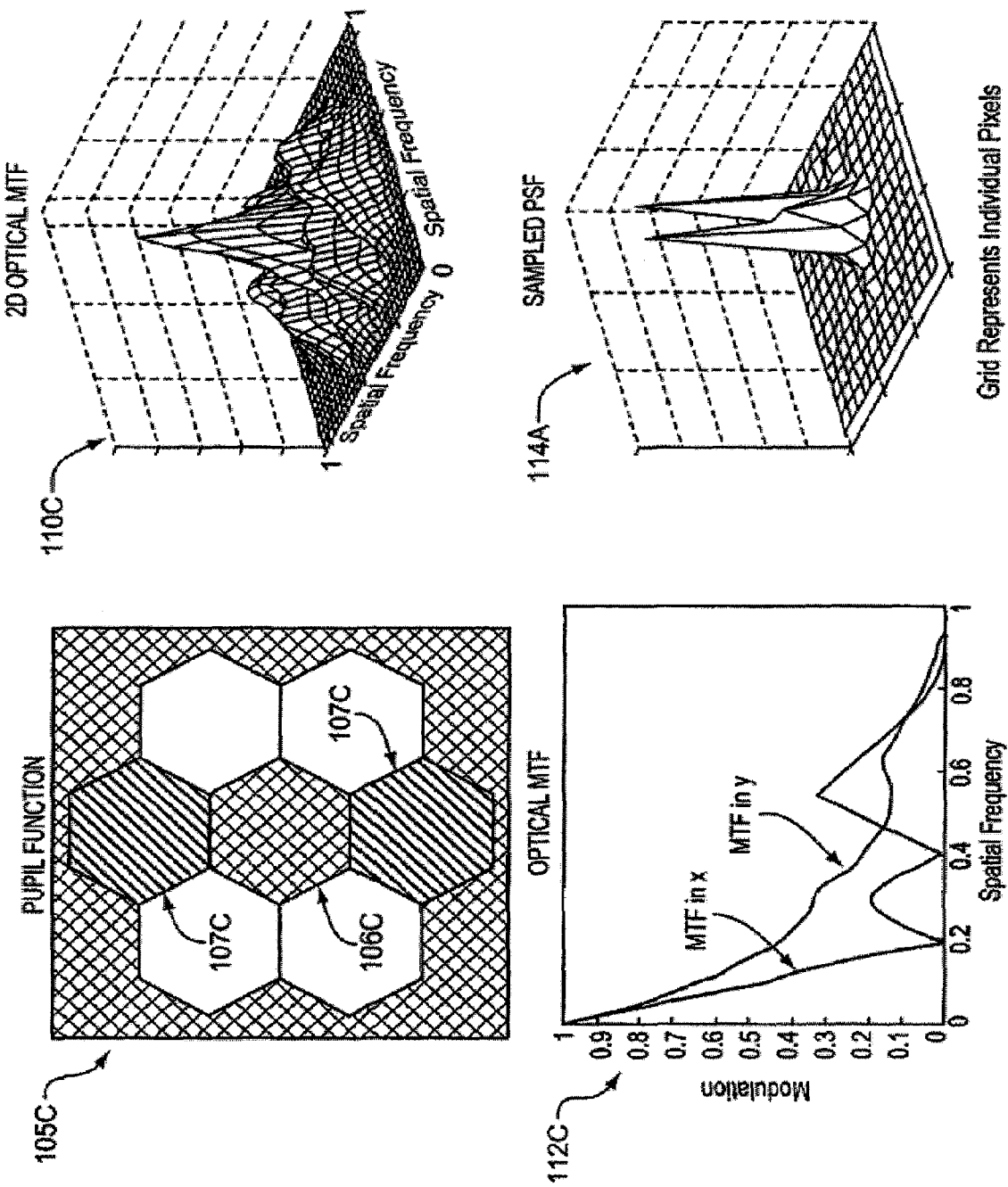
FIG. 5 shows a pupil map and corresponding 2D optical MTF, sample PSF, and optical MTF curves for a segmented optical system with two segment piston error.

FIG. 5 is similar to FIG. 4, and illustrates the same segmented optical adaptive optics but with two segment piston error shown in a pupil function 105C. Pupil function 105C has two segments 107C, each having a pi/2 phase shift piston error. Pupil function 105C has a central obscuration 106C, as above. The MTF of a wavefront passing through pupil function 105C is illustratively shown in graph 110C. Graph 110C shows the 2D MTF for pupil function 105C, illustrating even greater loss of contrast due to the phase shifts of segments 107C. Graph 112C shows slices through the 2D MTF also illustrating the loss of contrast. A sampled point spread function ("PSF") as sampled by a detector is shown in graph 114C. The sampled PSF of graph 114C noticeably broadens (as compared to the PSF of graph 114B) due to a further reduction in spatial resolution.

MTF curves are plotted in FIG. 6 to further illustrate how optical systems are affected by piston error. Each of the four sets of MTF curves of FIG. 6 are shown both with and without piston error. In graph 120, a set of MTFs are shown that correspond to a traditional optical imaging system 10, FIG. 1; optics 56 employ adaptive optics with pupil functions such as shown in FIG. 2-FIG. 4. As shown, the MTFs of graph 120 have reduced MTF with increasing spatial frequency and piston error (these MTF curves are the same as the MTF curves of FIG. 3-FIG. 5).

In graph 122, another set of MTF curves are shown that correspond to imaging system 100, FIG. 2, but before processing by decoder 108. As shown, the MTFs of graph 122 generally exhibit less contrast than the MTFs of graph 120, over most spatial frequencies; however, these MTFs also have less variation over the range of spatial frequencies due to piston errors. Notice in particular that the MTFs of graph 122 are essentially constant regardless of the piston error. Notice also that while piston error causes zeros in the MTF of graph 120, piston errors cause no zeros in the MTFs of graph 122. As the MTF is a representation of image information, zeros in the MTF are equivalent to a loss of image information. The optical imaging system shown in graph 122 therefore removes the information loss caused by the MTF zeros shown in graph 120.

In graph 124, another set of MTF curves are shown representing MTF curves after filtering by decoder 108; these MTF curves exhibit nearly the contrast of the diffraction limited MTFs of graph 120 (in the traditional imaging system) without piston error. Graph 126 illustrates this comparison in greater detail, showing that optical imaging system 100 provides high contrast over an extended depth of focus while minimizing the effects of piston error. The filtering provided by decoder 108 assumed no information about the particular piston error. If decoder 108 has access to the amount of piston error, or access to an estimate of the amount of piston error, even better results are possible. Decoder 108 can be viewed as an information decoder of the formed imagery. The more information that decoder 108 can access about the formation of the image, the better the decoding process can be.

Figure 7A:
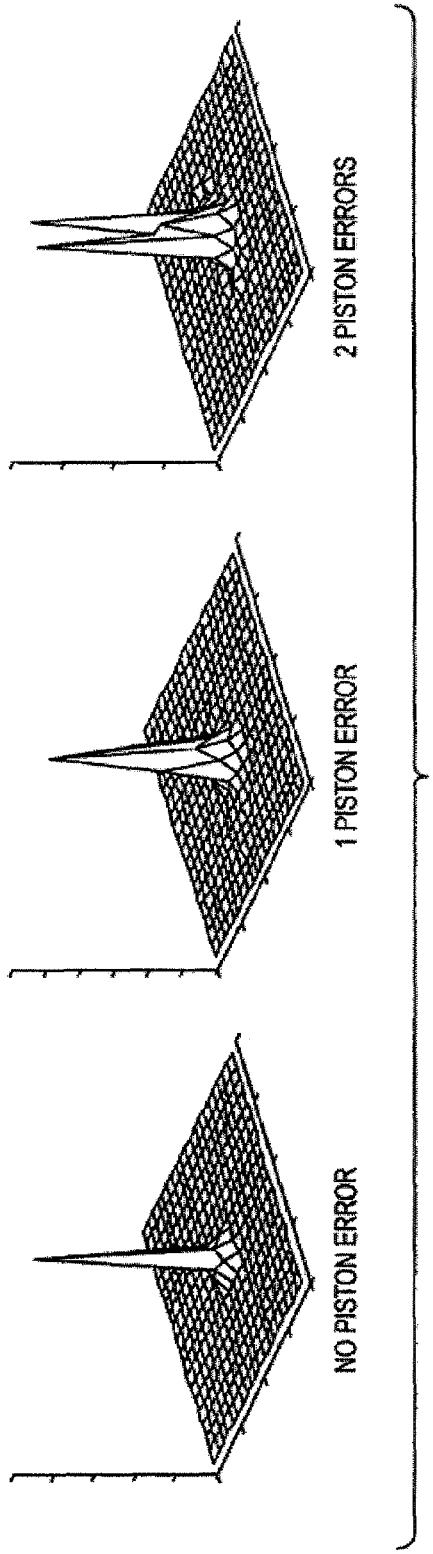
FIG. 7A shows image intensity plots for a representative conventional optical imaging system.
Figure 7B:
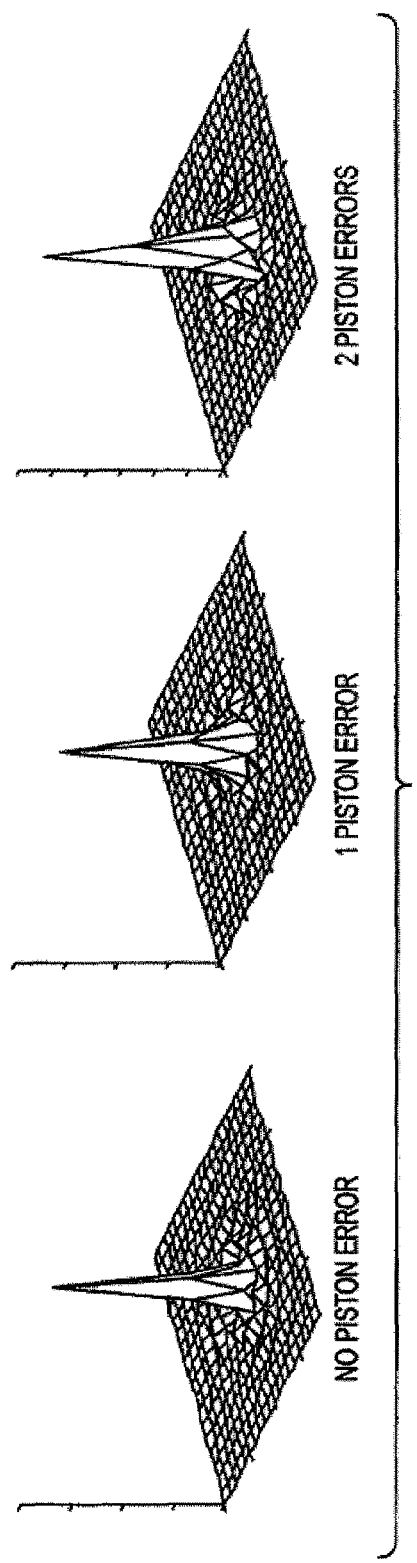
FIG. 7B shows image intensity plots for an optical imaging system employing wavefront coding.

FIG. 10 shows an exit pupil phase function (equivalent to surface height), and general system parameters, for the optical system described in FIG. 6 and FIG. 7B. This pupil function has an asymmetric form and is mathematically represented by eighteen of the first twenty-one Zernike polynomials as shown.

FIGS. 7A and 7B show sampled PSFs for both traditional system 10, FIG. 1 and system 100 (employing wavefront coding), FIG. 2, each affected by piston error due to adaptive optics with pupil functions 105 of FIG. 3-FIG. 5. The sampled PSFs of FIG. 7A and FIG. 7B correspond to the MTFs of FIG. 6. In particular, conventional imaging system 10 results in PSFs as shown in FIG. 7A (these are the same PSFs shown above in FIG. 3-FIG. 5), which demonstrate a broadening of the PSF (reducing spatial resolution) as each segment of piston error is encountered. In comparison, optical imaging system 100 with optics 102 (and mask 103) and decoder 108 results in PSFs as shown in FIG. 7B. Again, decoder 108 had no information about the amount of piston error. The PSFs of FIG. 7B demonstrate little change of resolution as a function of segmented piston error. It should therefore be apparent that the foregoing provides a solution to correct certain aberrations caused by non-ideal adaptive optics. Wavefront coding by optics 102 facilitates this correction.

The foregoing paragraph may also hold true for other types of errors, including problems associated with electromechanical or pressure-mechanical actuators that move segments of the adaptive optics. Such errors may be denoted herein as "stuck actuator" errors. Certain other errors are denoted as "quilting errors," which are caused by a plurality of actuators behind a deformable mirror. Stuck actuator and quilting errors can cause a significant decrease in system MTF, yielding low quality final images.

Figure 8:
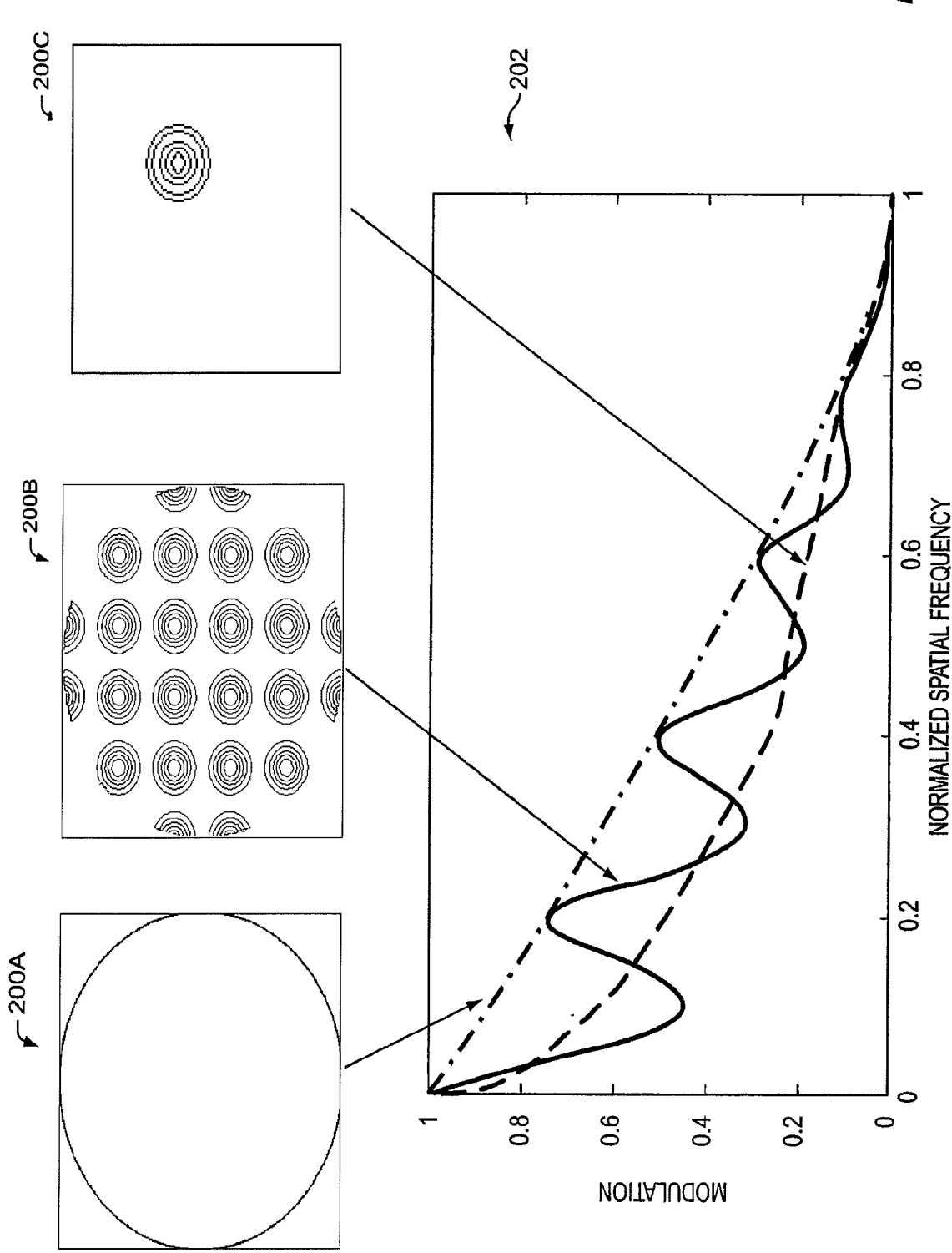
FIG. 8 shows pupil maps and associated MTF curves for an adaptive optical element showing effects of quilting and stuck actuator errors.

Quilting errors are modeled below using a periodic array of Gaussian disturbances, each with a half-wave of wavefront error. Stuck actuator errors are also modeled using a single Gaussian disturbance, with a wavefront error peak value of five waves. With this modeling, FIG. 8 shows pupil maps 200 and resulting MTFs 202, illustrating contrast performance with and without the stuck actuator and quilting errors. Pupil map 200A shows an error-free pupil; its associated MTF has the highest contrast. Pupil map 200B corresponds to a pupil with quilting error; its associated MTF is degraded from the error-free MTF. Pupil map 200C corresponds to a pupil with a stuck actuator error; its associated MTF is further degraded, as shown.

FIG. 9 illustrates how MTF is improved through wavefront coding, such as through processing by system 100, FIG. 2. Phase mask 103 is configured with an appropriate surface function to modify the wavefront phase and generate pupil functions 204A, 204B: pupil function 204A is particularly well suited to controlling quilting errors; pupil function 204B is particularly well suited to controlling stuck actuator errors. FIG. 9 also shows corresponding MTFs in graphs 206A, 206B: graph 206A illustrates MTFs with quilting errors; graph 206B illustrates MTFs with stuck actuator errors. In graph 206A, if optics 56 of system 10, FIG. 1, includes adaptive optics with quilting errors, an MTF 208A may result. In graph 206B, if optics 56 of system 10, FIG. 1, includes adaptive optics with stuck actuator errors, an MTF 208B may result.

The other MTFs of graphs 206A, 206B result from processing within system 100, FIG. 2, when optics 102 include adaptive optics 105 with quilting and stuck actuator errors, respectively with exit pupils 204A and 204B. In graph 206A, MTF 210A represents MTFs with and without quilting errors and prior to filtering by decoder 108. In graph 206B, MTFs 210B represent MTFs with and without stuck actuator errors and prior to filtering by decoder 108. In graph 206A, MTFs 212A represent MTFs with and without quilting errors but after filtering by decoder 108. In graph 206B, MTFs 212B represent MTFs with and without stuck actuator errors but after filtering by decoder 108. MTFs 212A, 212B thus illustrate that the resulting MTFs within system 100 (after wavefront coding by mask 103 and post processing by decoder 108) are approximately the same as the error free MTF 214 (corresponding to pupil 200A, FIG. 8), thus providing near ideal image quality irrespective of quilting and stuck actuator errors. Note that MTFs 202, FIG. 8 (also shown in FIG. 9 as 214, 208A and 208B) vary widely as a function of stuck actuator and quilting errors. Once phase is changed at the pupil, by phase mask 103, there are no zeros in the MTF of system 100 and MTFs 210A, 210B are essentially constant with pupil error, demonstrating system invariance to the adaptive optic errors.

Exit pupils 204A and 204B of FIG. 9 result from constant profile path optics as set forth in commonly-owned U.S. patent application Ser. No. 10/376,924. The specific paths for these optics are four sides of a square about the optical axis (e.g., axis 109, FIG. 2). Each side of every square, or path, has identical form in this example. For exit pupils 204A, 204B, the form of the paths may be described by a second order polynomial, each path modulated by a constant that varies for each path. The functional form of these 'across the path' modulations is then given by a fourth order polynomial. The number of paths in the exit pupil is large, essentially forming a continuous function. For exit pupil 204A, the parameters defining constant profile path parameters are:

Along the paths form: $C(x) = -5.7667 + 0.7540x^2$, $|x| < 1$

Across the path form: $D(y) = 0.0561x[-3.3278 + 35.1536y - 34.3165y^2 - 7.5774y^3]$, $0 < y < 1$ where the length of each path is considered in normalized unit length and the distance from the optical center to the surface edge is considered a normalized unit distance. For each path, the same distance from the optical center is modulated similarly across the path form. The parameters for the exit pupil of 204B are:

Along the paths form: $C(x) = -1.7064 + 1.2227x^2$, $|x| < 1$

Across the path form: $D(y) = 0.1990x[-6.4896 + 7.4874y + 5.1382y^2 - 4.9577y^3]$, $0 < y < 1$ Although not shown, pupil functions that give similar or improved results to pupil functions of 204A and 204B can be formed by the combination of two or more constant profile path optics.

Other known or unknown aberrations may also be addressed by optical imaging system 100, FIG. 2. For example, note that the aberration "coma" may have both "focus related" components and other components which are not focus related. Simulations below show reduction in the effects of coma when using system 100 without a priori knowledge of coma. The following description applies wavefront coding aberration correction in terms of optical aberrations up to fifth order and the first thirteen Zernike aberration coefficients. The wavefront coding of system 100 may also operate to correct and remove other misfocus-like aberrations, including spherical aberration, astigmatism, Petzval or field curvature, axial chromatic aberration, temperature related misfocus, and/or fabrication and assembly related misfocus. Aberrations that are not misfocus-like are related to coma. The description below offers solutions to both misfocus-like aberrations and other non focus-related aberrations. From this, third and fifth order Seidel wavefront aberrations are described. Finally, with knowledge of the third and fifth order Seidel aberrations, a partial set of the Zernike wavefront aberrations can be understood in terms of wavefront coding.

Misfocus-like aberrations have the characteristic that a subset of the aberration may be corrected by movement of the image plane. If all subsets of the aberration are corrected at the same time, as for example by extending the depth of focus, then the effects of the aberration may be substantially eliminated. Below, we specifically describe the misfocus-like aberrations of spherical aberration, astigmatism, Petzval curvature, axial chromatic aberration and temperature related aberrations.

Figure 11:
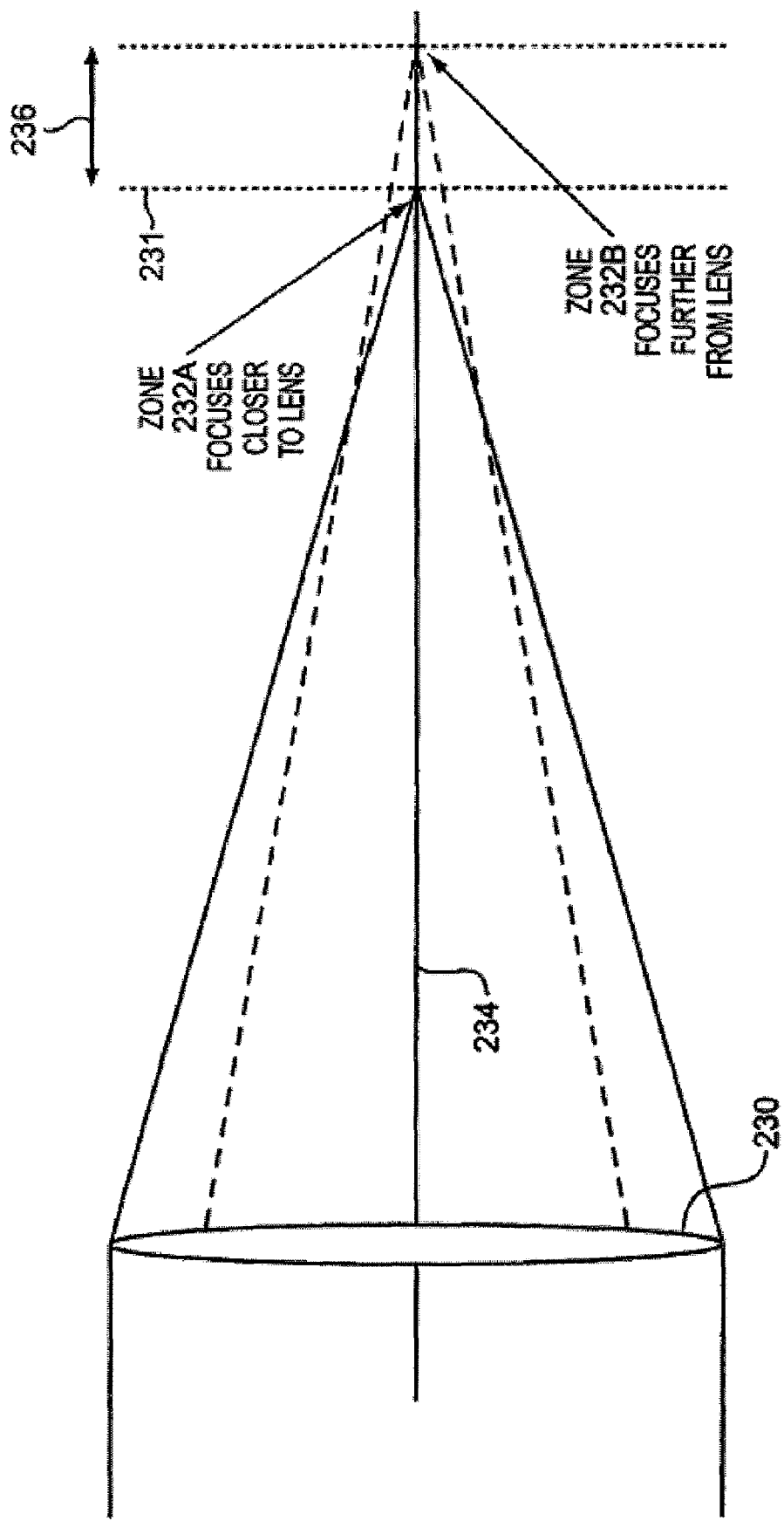
FIG. 11 illustrates certain misfocus effects due to spherical aberration.

FIG. 11 illustrates spherical aberration from an optical element in the form of a lens 230. The spherical aberration causes different radial zones 232 (232A, 232B) to focus at different positions along a range 236 of an optical axis 234. Zones 232 result in a change of focus along range 236 due to misfocus associated with the zones. Spherical aberration is a misfocus-like aberration since each zone 232 of lens 230 can theoretically be brought into correct focus by movement of the image plane 231. All zones 232 can be in correct focus at the same time if the depth of focus is extended to cover range 236.

Figure 12:
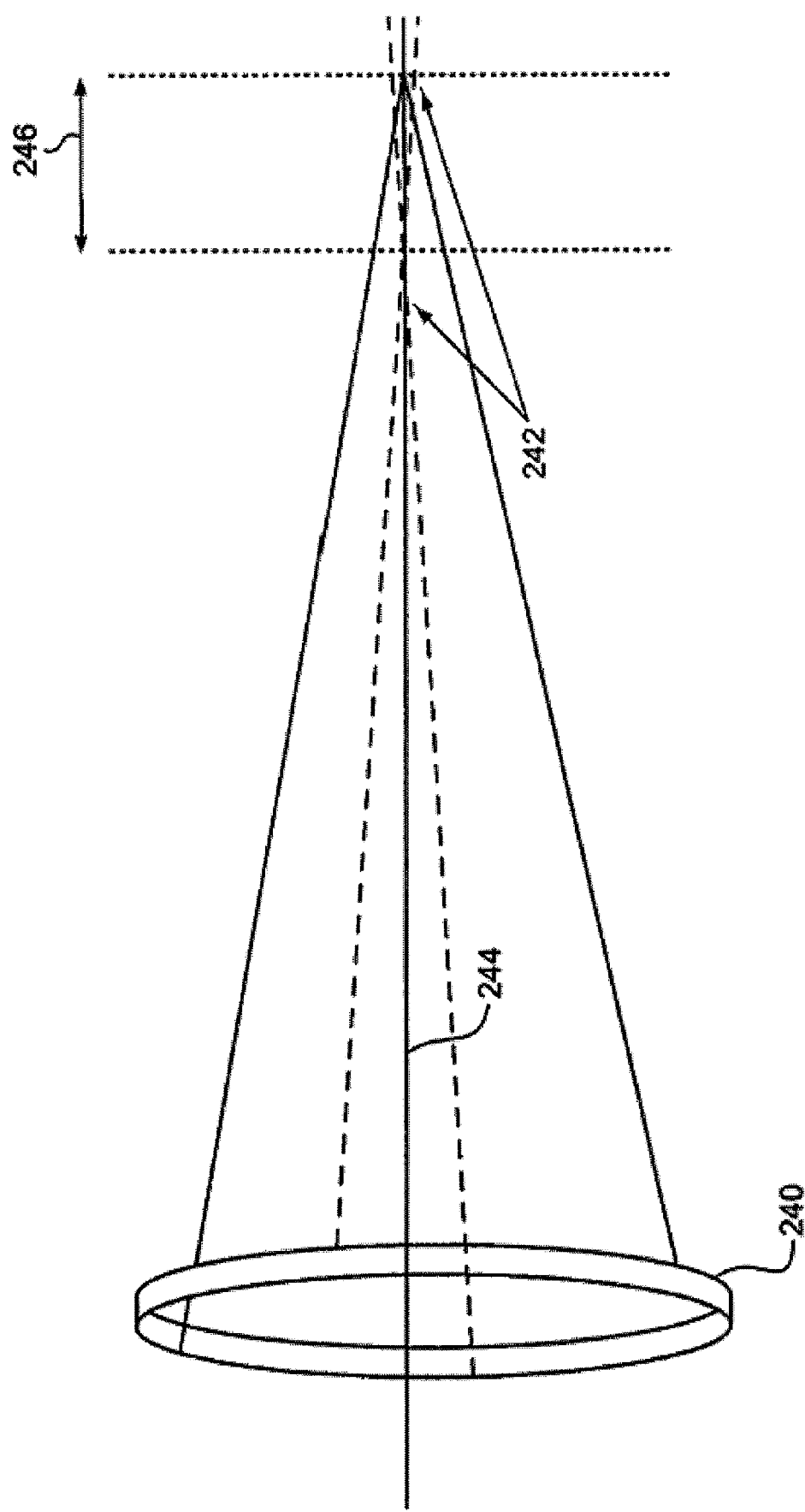
FIG. 12 illustrates certain misfocus effects due to astigmatism.

FIG. 12 illustrates astigmatism from an optical element in the form of a lens 240. Astigmatism causes orthogonal axes of lens 240 to come to a focus at different positions 242 along the optical axis 244. This aberration is again a misfocus-like aberration since each axis can theoretically be brought into proper focus through movement of the image plane (along range 246). If the depth of focus is large enough to cover range 246, so that light from both axes are in proper focus, then the effects of astigmatism are substantially removed.

Figure 13:
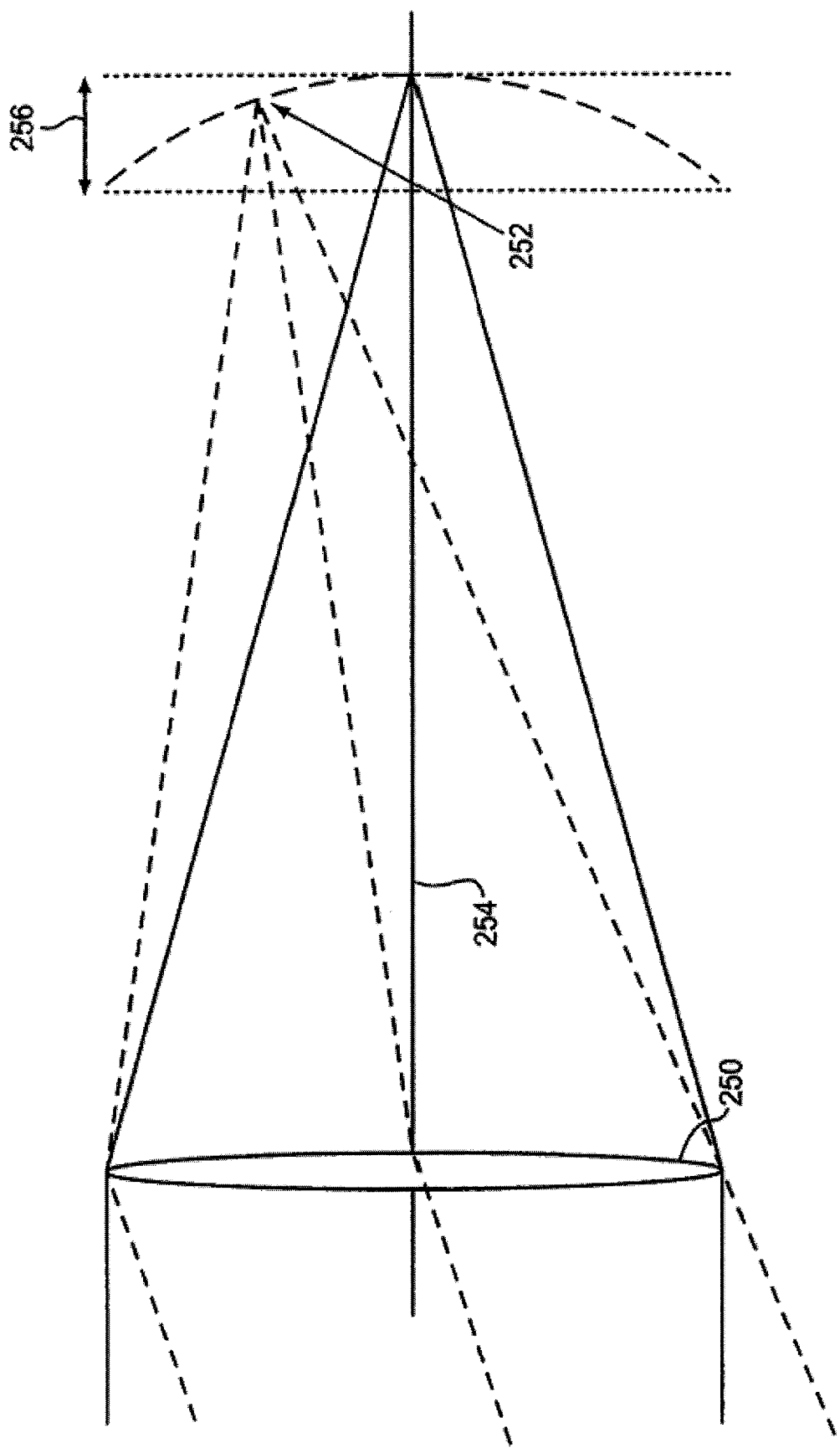
FIG. 13 illustrates certain misfocus effects due to Petzval curvature.

FIG. 13 illustrates Petzval curvature from an optical element in the form of a lens 250. Petzval curvature images a planar object to a curved image 252. Object points at different radial distances from the optical axis 254 are therefore essentially imaged with different misfocus values, i.e., over a range 256. Petzval curvature is a misfocus-like aberration since each point of a planar object can theoretically be brought into correct focus by movement of the image plane over range 256. If the depth of focus is large enough to cover range 256, the effects of Petzval curvature can be substantially eliminated.

Figure 14:
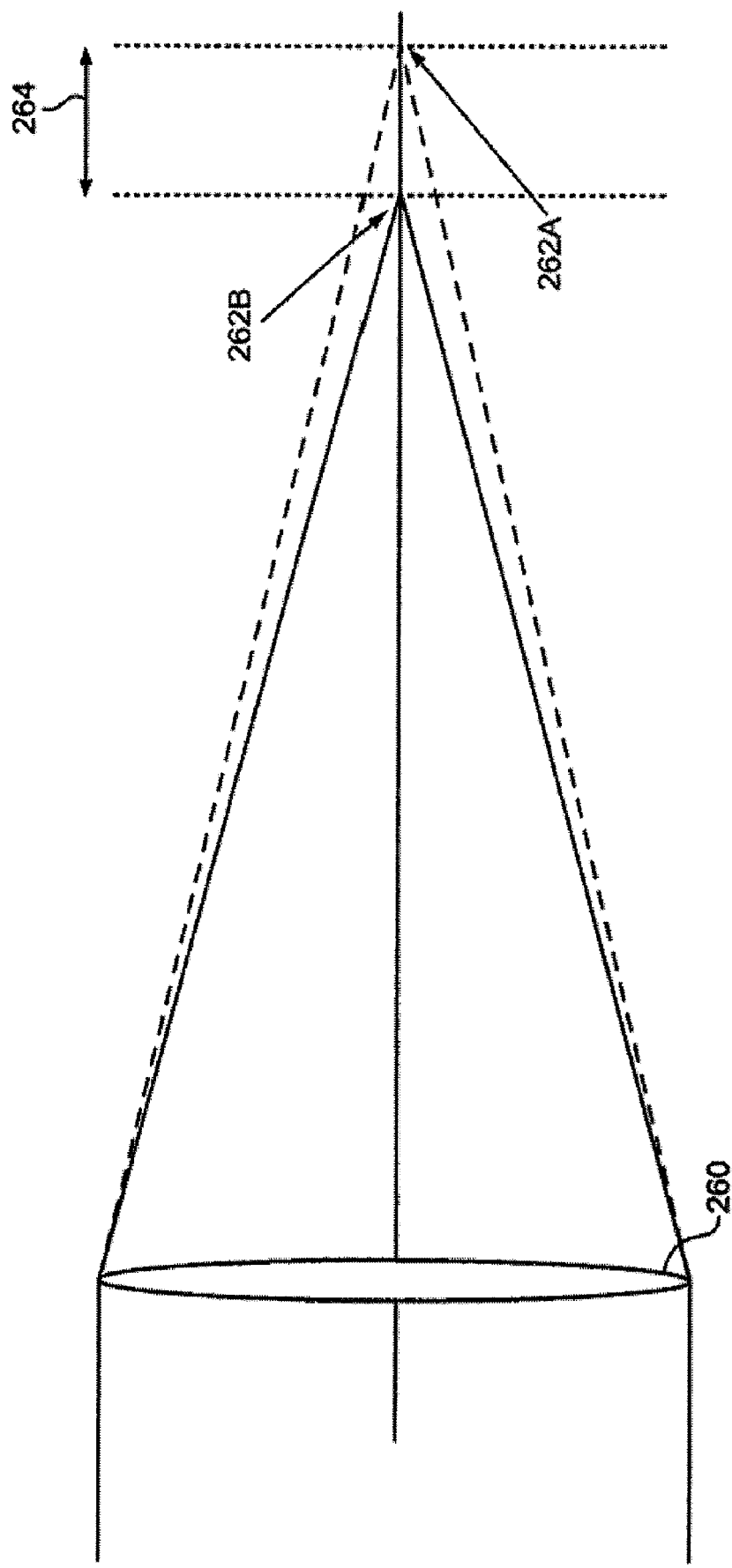
FIG. 14 illustrates certain misfocus effects due to axial chromatic aberration.

FIG. 14 illustrates axial chromatic aberration from an optical element in the form of a lens 260. Axial chromatic aberration causes a best focus position 262 to be a function of wavelength or color of the illumination; for example 262A is the best focus position for red light, while 262B is the best focus position for blue light. The focus spread over the range of wavelengths results in a defocus range 264. Axial chromatic aberration is a misfocus-like aberration since movement of the image plane can theoretically bring the image formed at each color into proper focus. If the depth of focus is extended so that the images at all colors are in focus over range 264, then the effects of axial chromatic aberration can be substantially eliminated.

Figure 15:
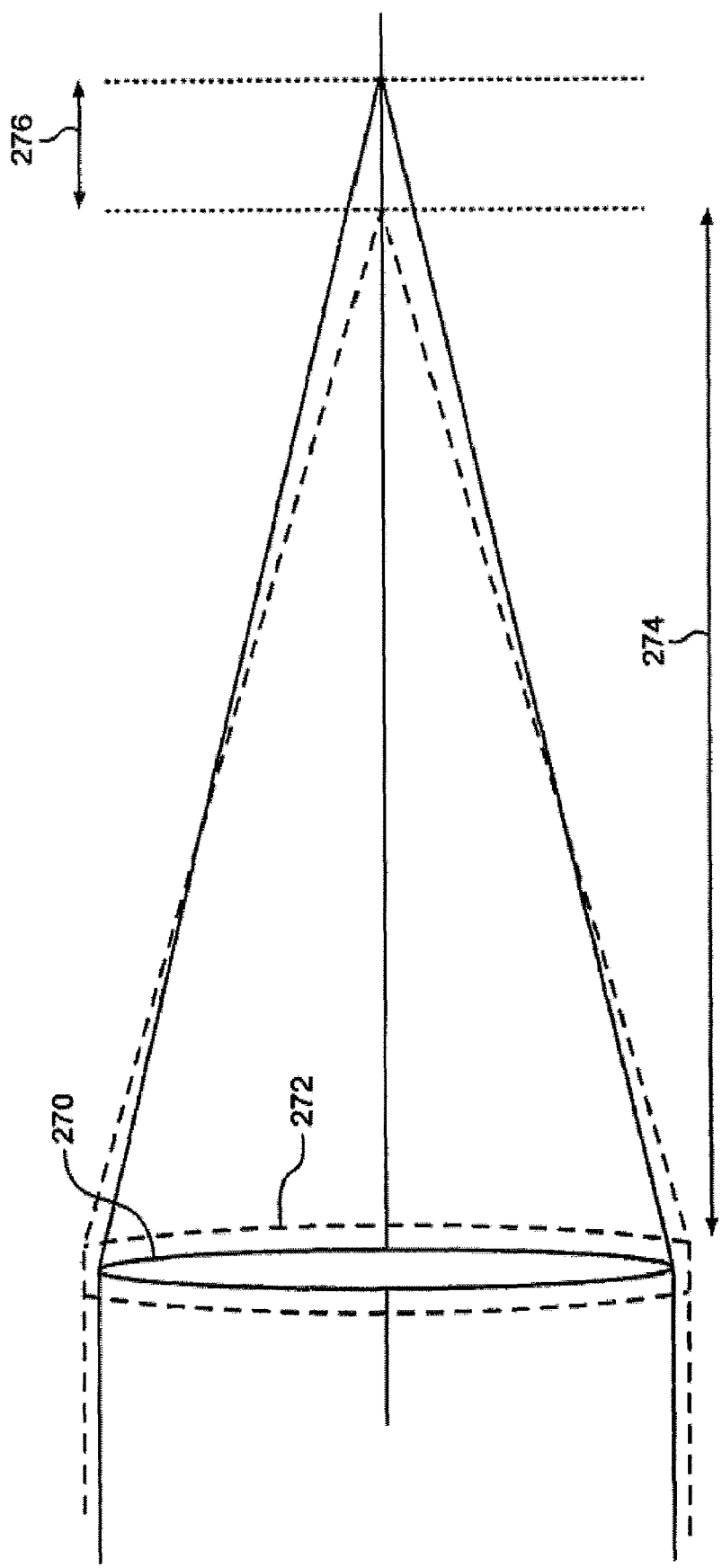
FIG. 15 illustrates certain misfocus effects due to temperature induced aberrations.

FIG. 15 illustrates temperature related aberrations in association with an optical element in the form of a lens 270. Temperature-related aberrations are due to changes in physical lengths, distances, and diameters as well as to changes in index of refraction of the associated optical materials. Such changes may, for example, occur due to environmental temperature change that expands or contracts lens 270 and/or associated opto-mechanical structure. In one example, lens 270 expands or contracts due to such temperature change, such as illustrated by outline 272. In another example, the mounting structure expands or contracts due to such temperature change, as shown by expansion line 274. In still another example, an index of refraction of lens 270 may change. Certain optical imaging systems may therefore model thermal variations as a change in best focus position as a function of temperature, e.g., over defocus range 276 (dependent on temperature). For certain other optical systems, other aberrations such as spherical aberration and astigmatism are also introduced by changes in temperature. Temperature-related aberrations may therefore be considered misfocus-like aberrations since theoretical movement of the image plane as a function of temperature can reduce the effects of temperature change. If the depth of focus is large enough to cover range 276 (and, if desired, the other aberrations such as spherical aberration and astigmatism), then the effects of temperature can be substantially eliminated.

Figure 16:
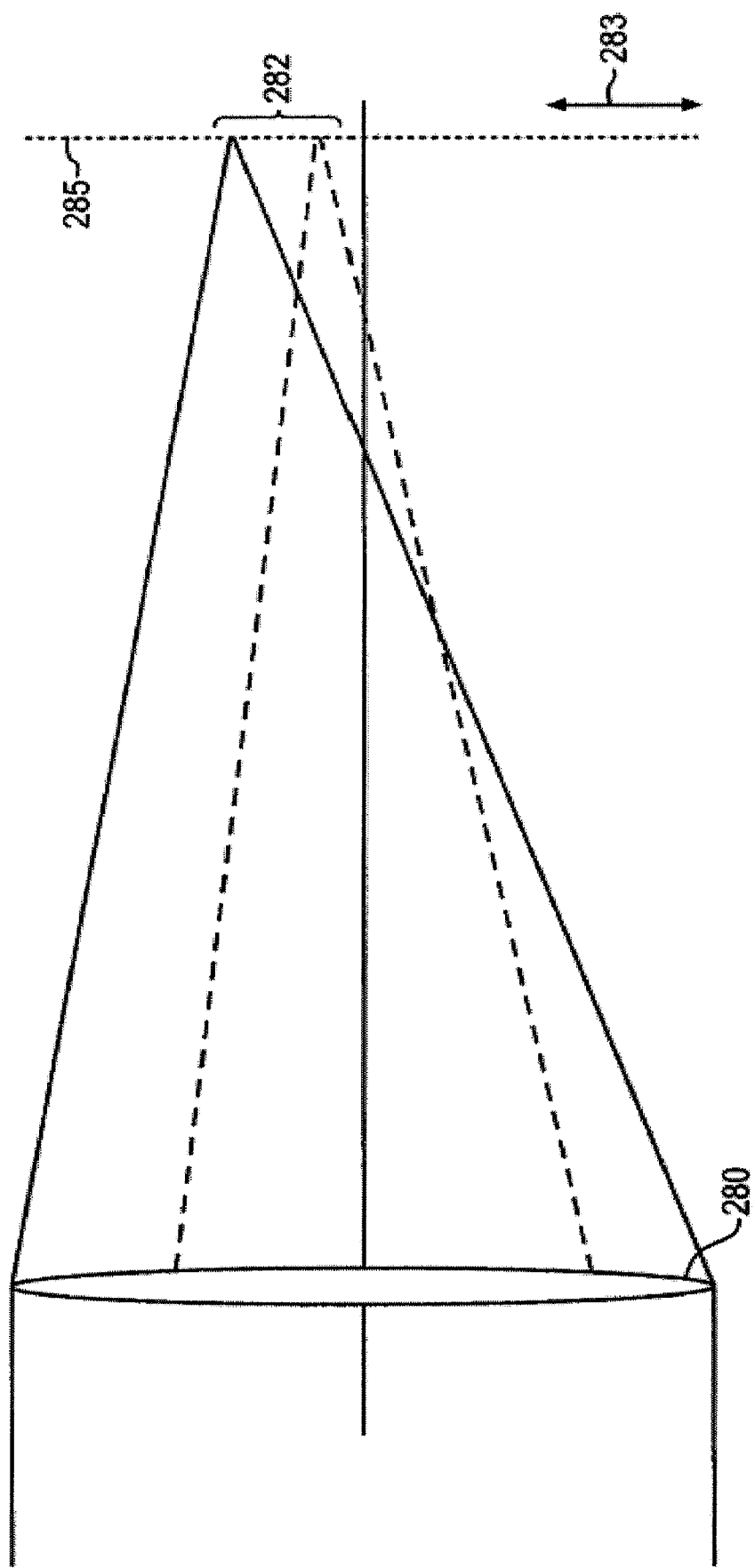
FIG. 16 illustrates certain aberrations due to coma.

FIG. 16 illustrates coma in association with an optical element in the form of a lens 280. Coma is an off-axis aberration where different zones of the lens image with different magnifications. The effects of coma increase linearly with the distance of the object point from the optical axis, causing blurring 282 along the field axis 283 of the image plane 285.

Figure 17:
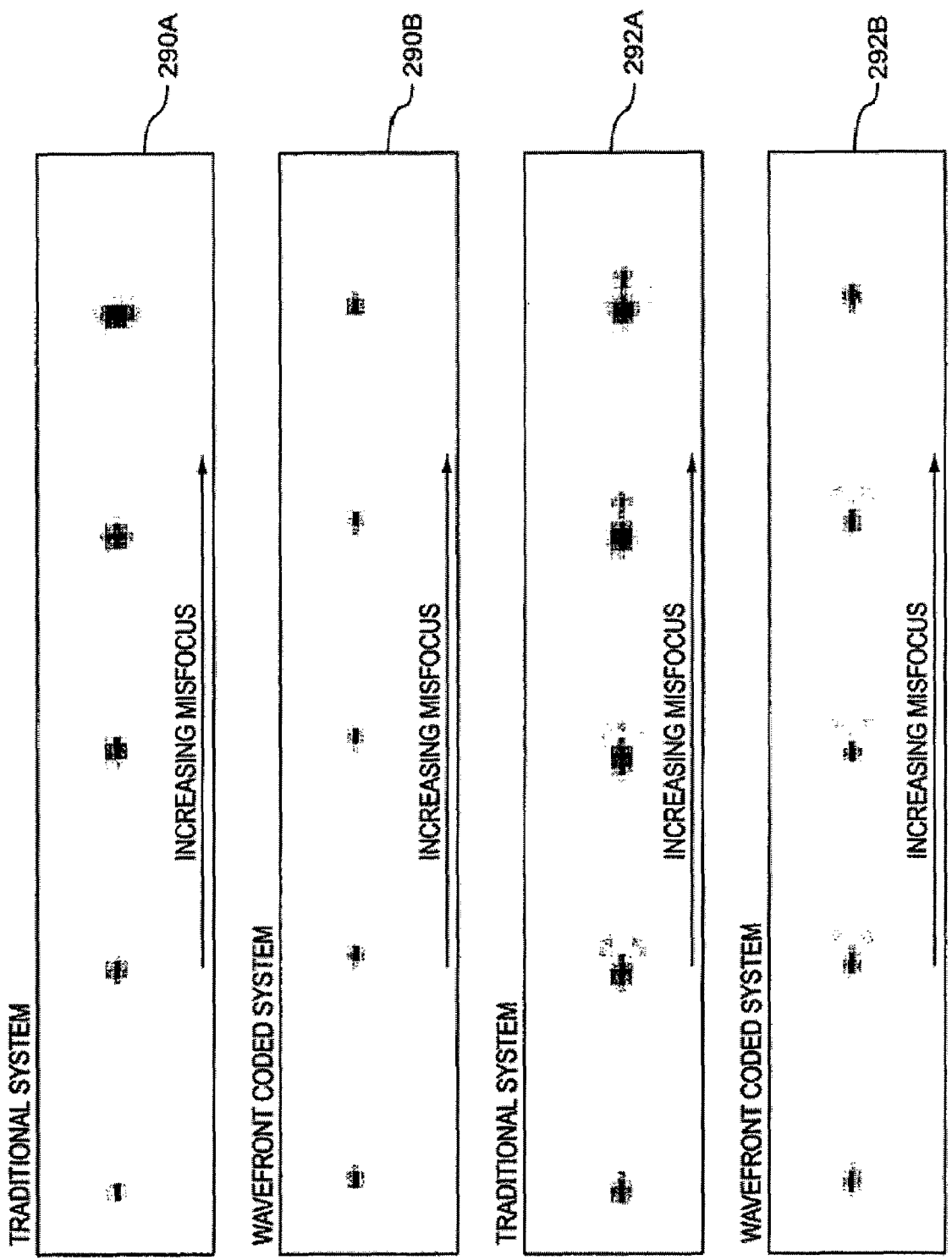
FIG. 17 shows a comparison of PSFs between traditional imaging systems and imaging systems (employing wavefront coding) as to coma effects, as a function of misfocus.

Coma is a special aberration different from the misfocus aberration, such as field curvature and chromatic aberration. If decoder 108 employs only a linear filter, wavefront coding by system 100 may not completely eliminate the effects of coma; thus some characteristic imaging effects of coma can be unchanged by the addition of wavefront coding. FIG. 17 provides graphical examples of PSFs caused by coma within both imaging system 10 and imaging system 100, each as a function of misfocus. In particular, FIG. 17 shows a comparison of PSFs for one wave of coma and misfocus within system 10 (part 290A) and within imaging system 100 (part 290B); FIG. 17 also shows a comparison of PSFs for two waves of coma and misfocus within system 10 (part 292A) and within imaging system 100 (part 292B). The amount of misfocus within FIG. 17 varies from zero to one wavelength, left to right. The wavefront coded optics (i.e., the phase form of phase mask 103) and signal processing within decoder 108 are not made with a priori knowledge of the amount of coma. Notice, however, that the effects of a small amount of coma are reduced but not eliminated within parts 290B, 292B, indicating improvement over imaging system 10.

Figure 17A:
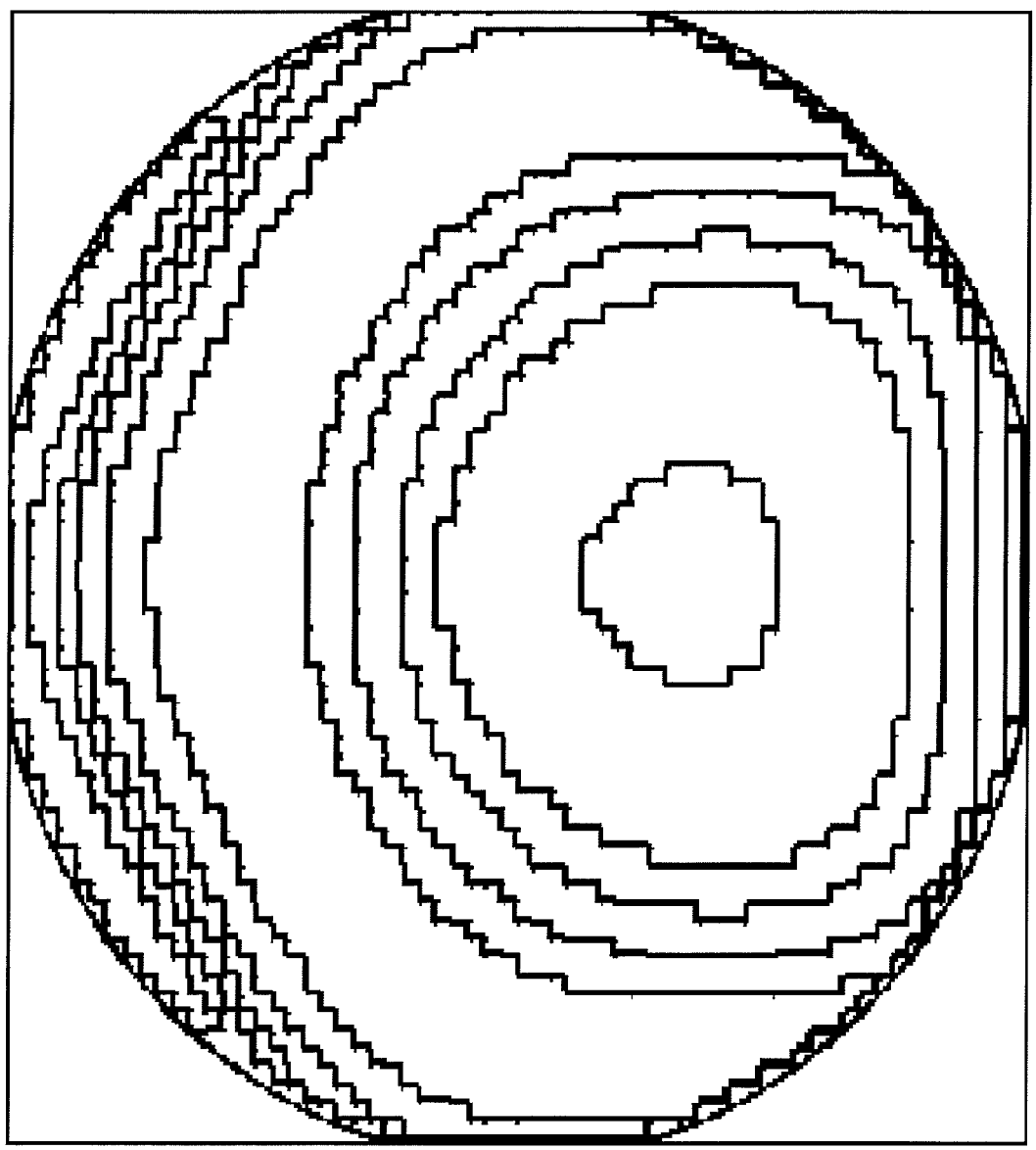
FIG. 17A illustrates the exit pupil optical path difference (OPD) and a polynomial representation.

FIG. 17A describes the phase function at the exit pupil of the optical system (mask 103) that formed the wavefront coded images 290B and 292B (shown after decoding 108) of FIG. 17. This phase form is represented in polar coordinates with five terms. The phase form is the sum of the five terms with their corresponding weights. The peak to valley phase deviation for this phase function is about one wavelength.

To achieve imaging as in parts 290B, 292B, phase mask 103 may, for example, employ a non-separable aspheric phase at the exit pupil of system 100; signal processing by decoder 108 may then perform a reverse convolution on the image data to generate the PSFs of parts 290B, 292B. The non-separable phase of phase mask 103 means that decoder 108 utilizes non-separable 2D signal processing. The optical resolution and the resolution of detector 106 are assumed to be matched in order to critically sample the object. Notice that the blur size is accentuated with misfocus within parts 290A, 292A of system 10. In contrast, optical imaging system 100 generates a slightly reduced blur at zero misfocus and then changes very little with misfocus (in parts 290B, 292B) compared to the changes in optical imaging system 10. While the effects of coma have been reduced with wavefront coding, the reduction of misfocus effects is essentially unaffected by the addition of coma.

Figure 17B:
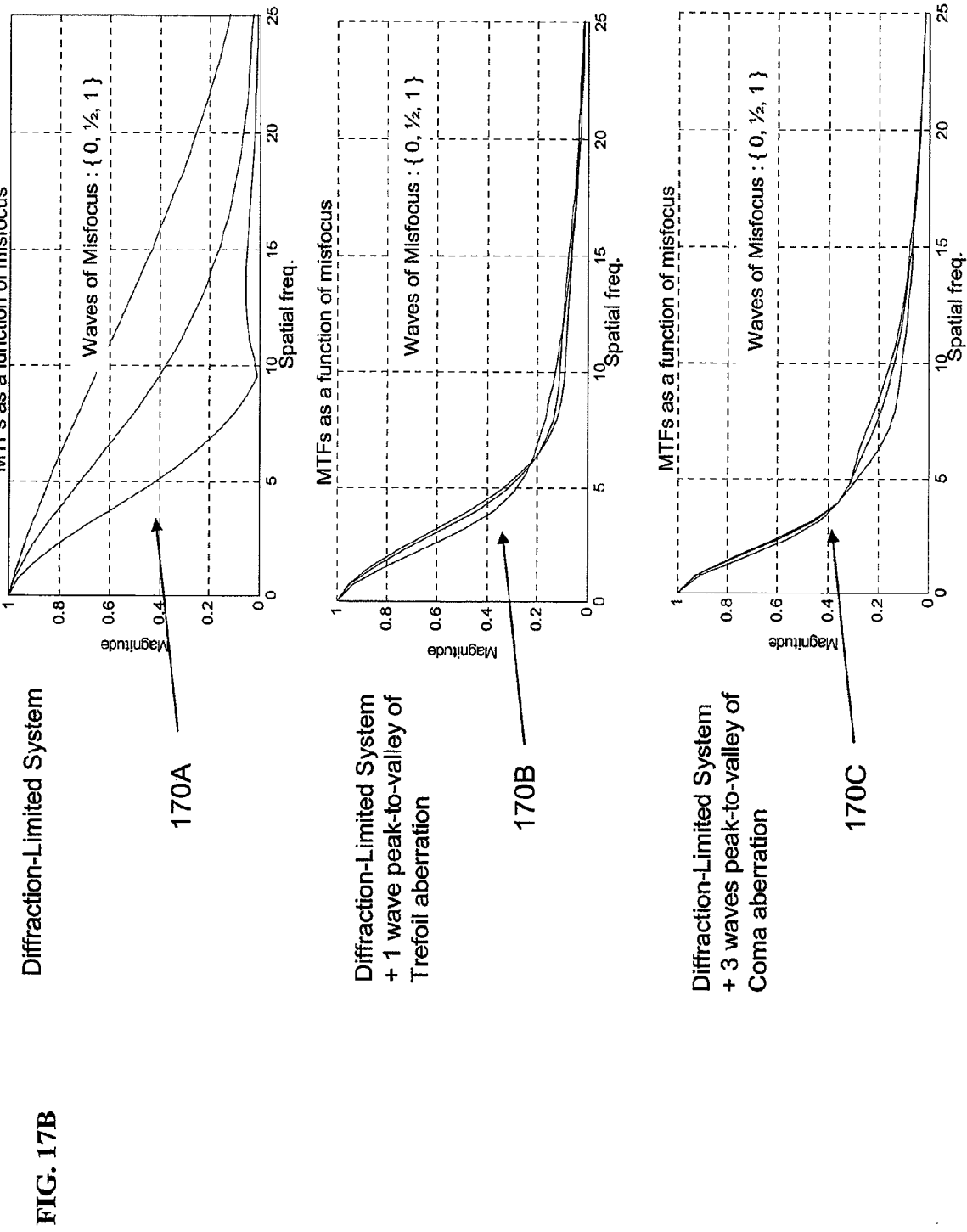
FIG. 17B shows a comparison of MTF curves over spatial frequency for waves of misfocus in a diffraction-limited system, and the same system affected by trefoil or coma aberrations.

To more fully understand the special nature of the aberrations trefoil and coma, as described in Table 1, consider the graphs of FIG. 17B. Graph 170A shows MTFs resulting from misfocus effects of a diffraction-limited system with misfocus varying from 0, ½, to 1 wave. Over this range the MTF changes drastically and even has an MTF zero for 1 wave of misfocus. Graph 170B shows the MTFs for a diffraction-limited system that additionally has one wavelength of trefoil aberration over the same range of misfocus. The form of this trefoil aberration is listed as #9 in Table 1. Notice that trefoil causes a drop in the MTF at all misfocus values, but the change in misfocus is much less than that shown in graph 170A. Graph 170C shows the MTFs for a diffraction-limited system that additionally has three wavelengths of coma. The form of this coma aberration is listed as #6 and #7 in Table 1, with both aberrations being added in the same proportion. Notice that coma also causes a drop in the MTF at all misfocus values, but the change in misfocus is much less than that shown in graph 170A. Notice also that the MTFs in Graphs 170B and 170C have no zeros in the MTF shown. The MTFs shown in graph 122 (FIG. 6) show the same change of MTF with aberration. Thus, the addition of trefoil and coma, for at least some proportion of these aberrations, act to make the overall system insensitive to effects of misfocus. It is then possible to use trefoil and coma as part of Mask 103 in system 100.

Figure 17C:
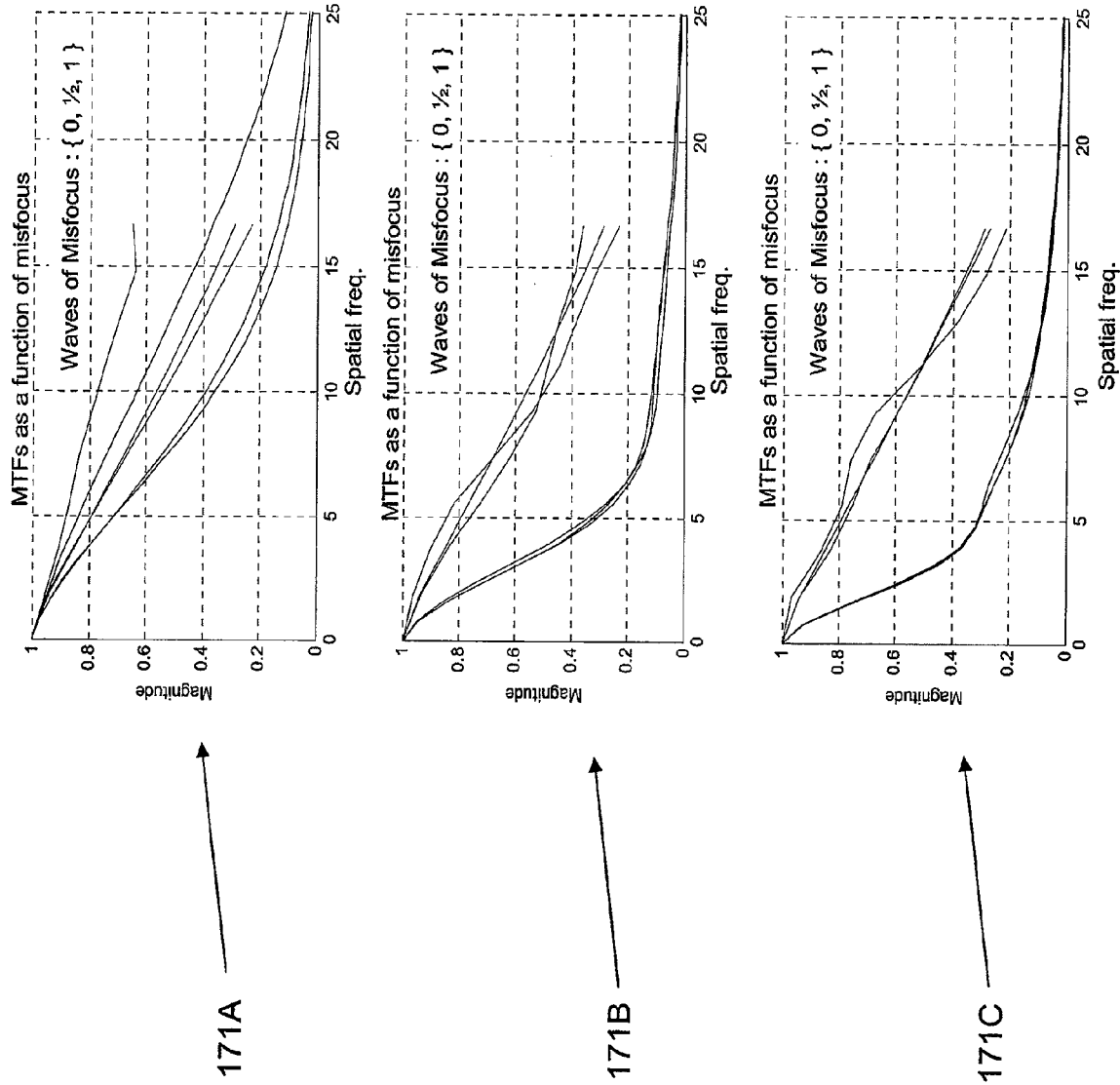
FIG. 17C shows a comparison of MTF curves over spatial frequency for waves of misfocus in a modified diffraction-limited system, and the same system affected by trefoil or coma aberrations, and the same systems after linear filtering.

Although trefoil and coma can be used solely as phase functions for Mask 103 in system 100, other combinations that can give improved imaging performance are possible. Consider the MTF graphs of FIG. 17C. Graph 171A shows the MTFs as a function of misfocus for system 100 with the wavefront phase function of FIG. 17A. The long lower MTFs represent the MTFs before linear filtering, the MTFs that are only plotted out to spatial frequency value of 18 are the MTFs after linear filtering. The MTFs of 171A are high for all values of misfocus, but show a smaller amount of change with misfocus compared to system 10 of graph 170A. Graph 171B shows the MTFs as a function of misfocus for the system that has the phase function of FIG. 17A plus the trefoil aberration of graph 170B. Graph 171C shows the MTFs as a function of misfocus for the system that has the phase function of FIG. 17A plus the coma aberration of graph 170C. Notice that both the addition of trefoil and coma to the phase of FIG. 17A show increased insensitivity of misfocus effects in graphs 171B and 171C. Notice also that the addition of trefoil and coma acted to slightly reduce the MTFs from those of graph 171A, when only the phase of FIG. 17A is used. Decoder 108 of system 100 could be different for three versions of Mask 103 composed of three different phase functions of FIG. 17C. The MTFs show that these versions of Mask 103 can act to preserve object information by removing MTF zeros, but the change in MTF for the three versions of Mask 103 may dictate changes in the operation of decoder 108. Decoder 108 could act to estimate these changes directly from the images of detector 106 or could be informed of the changes by an external source and change accordingly.

Figure 17D:
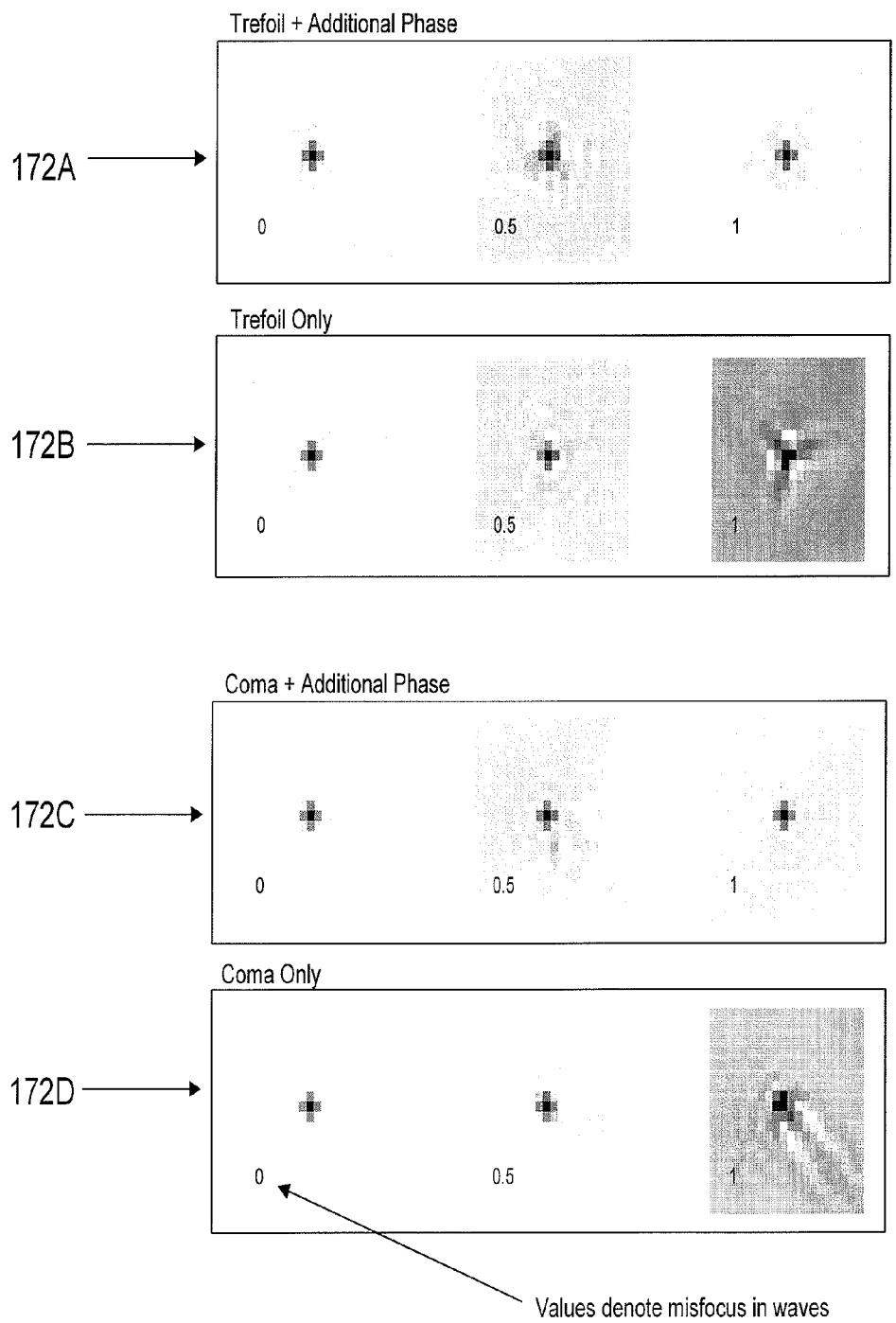
FIG. 17D shows a comparison of PSFs for several waves of misfocus for modified and unmodified diffraction-limited systems with trefoil and coma aberrations, with linear filtering.

If optics 102 of system 100 contains trefoil and coma aberrations, system performance can often be improved by the addition of specialized aberrations. This is shown by PSFs after filtering for a variety of PSFs as a function of misfocus, in FIG. 17D. The misfocus values are 0, ½, and 1 wavelength as in FIGS. 17, 17B and 17C. Graph 172A of FIG. 17D shows PSFs after linear filtering with Mask 103 being composed of the phase from Graph 171B. Decoder 108 was configured to perform linear filtering that resulted in a high quality PSF at zero misfocus. This same filter was applied to the other misfocus PSFs as well. Notice that the PSFs of graph 172A are compact with little change as a function of misfocus. Graph 172B shows the PSFs resulting when mask 103 only contains the trefoil aberration from graph 170B. Decoder 108 is again chosen to produce a high quality PSF with no misfocus through linear filtering. Notice that the PSFs of graph 172A are more compact as a function of misfocus compared to the PSFs of graph 172B. The addition of the phase function of FIG. 17A acts to smooth the phase response of the optical system (not shown) when trefoil aberration is present in optics 102. The same is true when coma is present in system 102 as shown by graphs 172C and 172D. The PSFs after filtering when optics 102 contains only coma (the amount and form of coma as in graph 170C) are not as compact when optics 102 also contains the phase function of FIG. 17A.

Therefore, the special trefoil and coma aberrations can be used alone in optics 102 of system 100, but PSF and/or MTF can often be improved by the addition of other aberrations in optics 102.

With an overview of misfocus-like aberrations, a relationship may be formed between the third and fifth order Seidel wavefront aberrations. The Seidel aberrations allow the decomposition of wavefront aberrations into component aberrations that have physical significance to primary optical errors. While the third and fifth order Seidel aberrations are not orthogonal, they do allow considerable insight into wavefront aberrations for many types of imaging systems. Below, we describe the third and fifth order Seidel aberrations and their relationship to misfocus-like aberrations. Table 2 shows Third Order Seidel Aberrations. Table 3 shows Fifth Order Seidel Aberrations.

TABLE 2

| Name | Aberration Coefficient | Mathematical Form | Relationship to Misfocus-like Aberrations |
|---|---|---|---|
| Piston | $W_{000}$ | 1 | If piston is constant over the pupil, then no effect on the image |
| Defocus | $W_{020}$ | $p^2$ | Original misfocus-like aberration. |
| Tilt | $W_{111}$ | $H\, p \cos(\theta)$ | If tilt is constant over the pupil then the entire image is shifted. No other effect on the image or wavefront coding. |
| Field Dependent Phase | $W_{200}$ | $H^2$ | Has no effect on the image. |
| Spherical Aberration | $W_{040}$ | $H\, p^4$ | Misfocus-like aberration |
| Coma (third order) | $W_{131}$ | $H\, p^3 \cos(\theta)$ | Special aberration |
| Astigmatism | $W_{222}$ | $H^2 p^2 \cos(\theta)^2$ | Misfocus-like aberration |
| Field Curvature | $W_{220}$ | $H^2 p^2$ | Misfocus-like aberration |
| Distortion | $W_{311}$ | $H^3 p \cos(\theta)$ | Has no effect on wavefront coding. |
| Field Dependent Phase | $W_{400}$ | $H^4$ | Has no effect on the image. |

H represents the height of the image point. ($p, \theta$) represent pupil polar coordinate variables.

TABLE 3

| Name | Aberration Coefficient | Mathematical Form | Relationship to Misfocus-like Aberrations |
|---|---|---|---|
| Fifth order Spherical Aberration | $W_{060}$ | $p^6$ | Misfocus-like aberration |
| Fifth order Coma | $W_{151}$ | $H\, p^5 \cos(\theta)$ | Special aberration |
| Fifth order Astigmatism | $W_{422}$ | $H^4 p^2 \cos(\theta)^2$ | Misfocus-like aberration |
| Fifth Order Field Curvature | $W_{420}$ | $H^4 p^2$ | Misfocus-like aberration |
| Fifth Order Distortion | $W_{511}$ | $H^5 p \cos(\theta)$ | Has no effect on Wavefront Coding |
| Sagittal Oblique Spherical Aberration | $W_{240}$ | $H^2 p^4$ | Misfocus-like aberration |
| Tangential Oblique Spherical Aberration | $W_{242}$ | $H^2 p^4 \cos(\theta)^2$ | Misfocus-like aberration |
| Cubic (Elliptical) Coma | $W_{331}$ | $H^3 p^3 \cos(\theta)$ | Special aberration |
| Line (Elliptical) Coma | $W_{333}$ | $H^3 p^3 \cos(\theta)^3$ | Special aberration |
| Field Dependent Phase | $W_{600}$ | $H^6$ | Has no effect on the image. |

H represents the height of the image point. ($p, \theta$) represent pupil polar coordinate variables.

There are four types of coma in the third and fifth order Seidel aberrations that are special aberrations that act in some proportions to decrease the sensitivity to misfocus effects, as shown above. Linear phase aberrations such as tilt and distortion are not directly corrected by wavefront coding; however, linear phase aberrations typically do not contribute to a loss of resolution, as other aberrations can. Certain aberrations, such as piston and constant phase, have no noticeable effect on the image when constant over the entire exit pupil. If the piston and phase terms vary over the exit pupil, as is found in segmented adaptive optics (described above), then the resulting wavefront aberration may be decomposed into the component aberrations and analyzed. From the Seidel aberrations, the relationship between the terms of the Zernike aberration polynomials and the misfocus-aberrations may be found.

The Zernike aberrations are an orthogonal polynomial decomposition over a circular area. Their orthogonal nature makes the Zernikes a useful tool for many forms of analysis and optimization. Table 4 shows the first 13 Zernike polynomial terms, and describes their relationship to the Seidel aberrations and misfocus-like aberrations.

TABLE 4

| Term # | Mathematical Form | Relationship to Seidel Aberrations | Relationship to Misfocus-like Aberrations |
|---|---|---|---|
| 1 | 1 | Piston | Does not effect image |
| 2 | $p \cos(\theta)$ | Tilt | Wavefront coding not affected by tilt. |
| 3 | $p \sin(\theta)$ | Rotated version of #2 | Wavefront coding not affected by tilt. |
| 4 | $2p^2 - 1$ | Misfocus & Piston | Misfocus-like aberration |
| 5 | $p^2 \cos(2\theta)$ | Astigmatism & Misfocus | Misfocus-like aberration |
| 6 | $p^2 \sin(\theta)$ | Rotated version of #5 | Misfocus-like aberration |
| 7 | $(3p^2 - 2) p \cos(\theta)$ | Coma & tilt | Special aberration |
| 8 | $(3p^2 - 2) p \sin(\theta)$ | Rotated version of #7 | Special aberration |
| 9 | $6p^4 - 6p^2 + 1$ | Spherical Aberration & Misfocus & Piston | Misfocus-like aberration |
| 10 | $p^3 \cos(3\theta)$ | | Special aberration |
| 11 | $p^3 \sin(3\theta)$ | | Special aberration |
| 12 | $(4p^2 - 3) p^2 \cos(2\theta)$ | Tangential Oblique Spherical Aberration & Astigmatism & Misfocus | Misfocus-like aberration |
| 13 | $(4p^2 - 3) p^2 \sin(2\theta)$ | Rotated version of #12 | Misfocus-like aberration |

($p, \theta$) represent pupil polar coordinate variables.

The Zernike terms #7 and #8 are related to coma and thus are special wavefront coding terms that can be used to control the effects of misfocus as described above. The Zernike terms #10 and #11 are also special in the same manner. One particular wavefront coding surface is given in polar coordinates as $p^3 \cos(3\theta)$. This term in rectangular coordinates is related to the form $[X^3 + Y^3 - 3(XY^2 + X^2 Y)]$. The cubic terms $[X^3 + Y^3]$ can be used to form a rectangularly separable wavefront coding surface (on phase mask 103). Higher order Zernike terms are composed of seventh and higher order Seidel aberrations and are not shown.

With Zernike wavefront analysis, the root-mean-square (RMS) wavefront error is calculated as the RMS value of the weights of each Zernike polynomial term. Wavefront coding by system 100 may allow an effective RMS wavefront error where the weights of the misfocus-like aberrations in the Zernike expansion are considered zero since the effect can be controlled with wavefront coding. In one embodiment, the effective RMS wavefront error with wavefront coding may consider the weights on the Zernike polynomial terms 4, 5, 6, 9, 12 and 13 to be equal to zero. In other configurations, where decoder 108 can be dynamic, the Zernike polynomial terms 7, 8, 10 and 11 can also be considered to be equal to zero.

Figure 18:
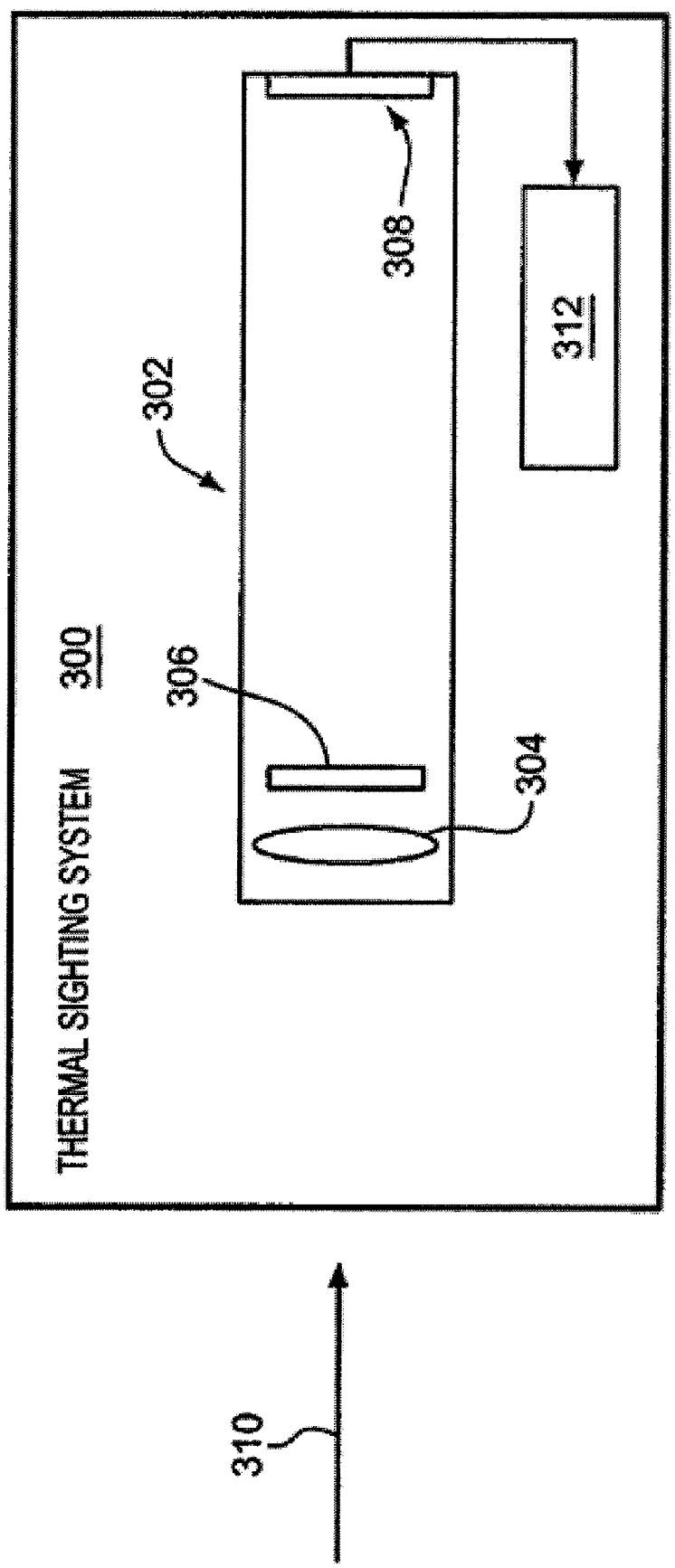
FIG. 18 shows a thermal sighting system with an optical element (employing wavefront coding) to diffuse incoming radiation and reduce reflections.

Wavefront coding has other advantages in optical imaging systems. For example, when used within thermal sighting systems, such as within reconnaissance aircraft, the inclusion of wavefront coded optics can diffuse or diminish system responsiveness to unwanted radiation, such as from a targeting laser. By way of example, FIG. 18 shows one thermal sighting system 300, which includes an optical imaging system 302 with one or more optics 304, optics 306 (e.g., employing phase mask 103, FIG. 2), and a detector 308 (detector 308 may be a human eye, or other detector such as a CCD or a thermal detector (e.g., an InSb array)). Optics 304 and wavefront coded optics 306 need not be separate physical elements in practice. Sighting system 300 can, in general, operate over any band on the electromagnetic spectrum. Optical imaging system 302 serves to diffuse incoming radiation 310 so as to reduce possible negative effects on detector 308. In particular, although optics 304 may be such that radiation 310 is focused on detector 308, optics 306 operate to disperse radiation 310 at detector 308. Post processing within a decoder 312 (e.g., decoder 108, FIG. 2) then serves to recreate an image of optics 306 in a clear manner. Post processing at decoder 312 may occur within a human brain if detector 308 is a human eye.

FIG. 19 shows one illustrative optical imaging system 302A, including a optics 304A and wavefront coding element 306A (which in this example is a surface of optics 304A). The system parameters of system 302A are shown in table 320. Also shown are two exemplary phase forms suitable for use in forming wavefront coding element 306A: phase form 322 is a constant path profile surface; phase form 324 is an odd aspheric surface. Incident radiation 310A is dispersed by optics 304A/306A, reflected off of detector 308A, and dispersed out of system 302A, as shown by rays 309.

Figure 20B:
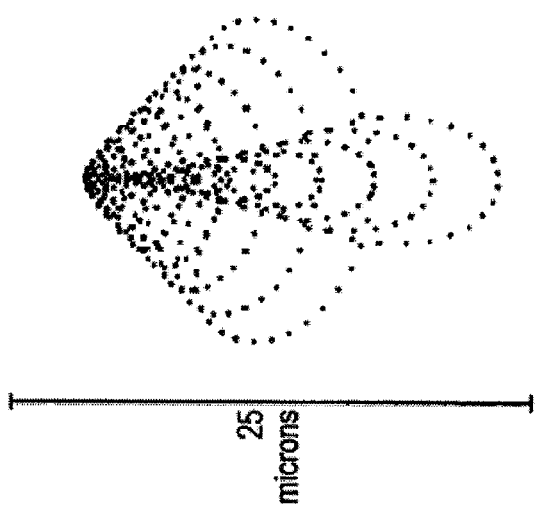
FIG. 20B shows a ray intercept map of the optical imaging system of FIG. 20A.
Figure 20A:
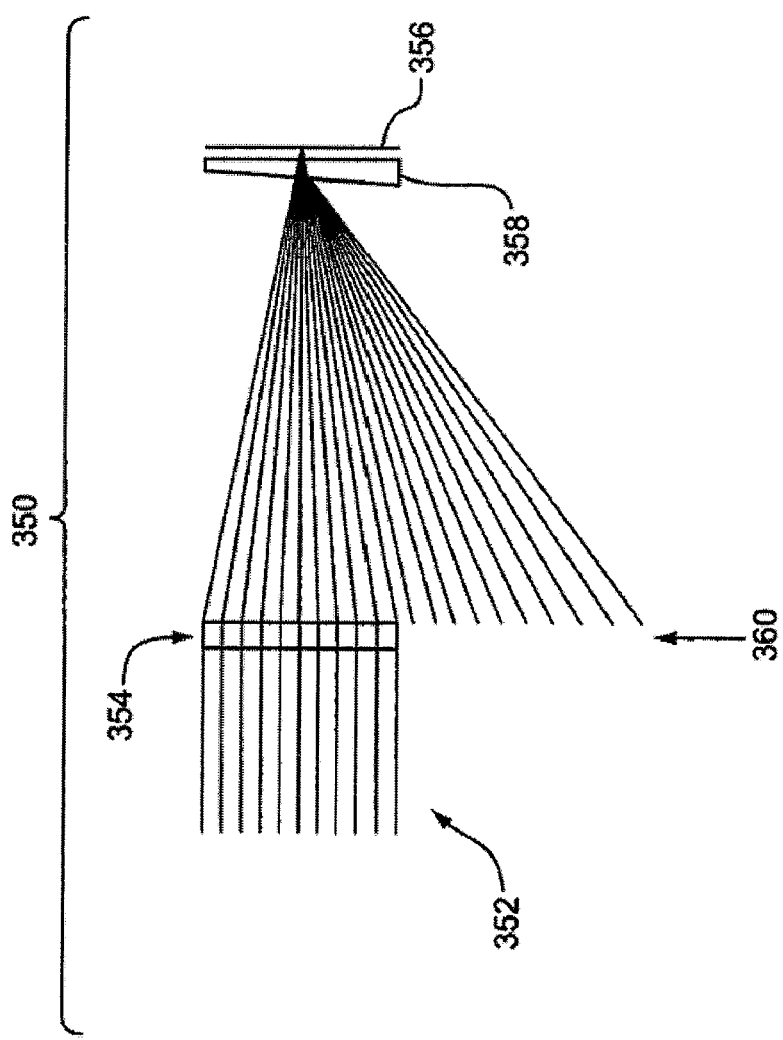
FIG. 20A shows a prior art low reflectivity optical imaging system.

Addressing the problem of unwanted reflections in an optical imaging system by conventional means typically introduces unwanted aberrations into the system. FIG. 20A shows a prior approach that utilizes low reflectivity of an optical imaging system 350. Incident optical waves or rays 352 are focused by optics 354 onto a focal plane array detector 356 in system 350. Detector 356 back scatters at least some portion of rays 352, for example when detector 356 has some characteristics of a Lambertian reflector. A prism 358 may be inserted into system 350 near detector 356 to bend rays 352 so that they are reflected back through system 350, such that the reflected rays are blocked by an aperture stop 360 of system 350.

A disadvantage of the methods of FIG. 20A is that prism 358 introduces aberrations into system 350. A ray intercept map related to system 350 is shown in FIG. 20B and demonstrates the image aberrations introduced by placing prism 358 into system 350. Without prism 358, the ray intercept map would consist of highly concentrated points much closer together than those of FIG. 20B. While aberrations introduced by prism 358 may be reduced by positioning prism 358 as close to detector 356 as possible (i.e., at the focal plane of system 350), the aberrations are not fully corrected due to the spatial variation, or separation, of rays 352 from different field points.

FIG. 21A shows an optical imaging system 400 in which a tilt surface 408 is introduced in optics 404, or in other optics (not shown) adjacent to optics 404, at an aperture stop 410 of system 400. Optical waves or rays 402 incident on optics 404 are focused onto a focal plane array detector 406 in system 400. Reflections of rays 402 back scattered from detector 406 are deviated by tilt surface 408 such that the reflected rays 402 are substantially blocked by aperture 412 surrounding optics 404, and before such reflections propagate into object space 414. Tilt surface 408 is tilted away from a plane perpendicular to the path of travel of rays 402. Optical imaging system 400 therefore does not suffer from the same shortcomings as system 350 with prism 358, since the tilt introduced by tilt surface 408 at aperture stop 410 ensures that there is no spatial variation between reflections of rays 402 coming from different locations in object space 414. Since all of the fields see the same part of tilt surface 408, additional aberrations due to the tilt can be corrected by processing an image detected by detector 406 with post processor 416 (e.g., decoder 108, FIG. 2). Post processing 416 has a priori information about the degree of tilt of tilt surface 408. FIG. 21B shows a ray intercept map of rays 402 in system 400. Notice that the energy of rays 402 is concentrated near the on-axis position, showing the desired co-focusing of rays. In an equivalent system detector 406 may be tilted, instead of a tilt being added to surface 408.

Further reduction of reflectivity in optical imaging system 400 may be realized by configuring optics 404 with wavefront coding (e.g., such as optical imaging systems employing mask 103, FIG. 2, or wavefront coding element 306A, FIG. 19). Even with the addition of tilt surface 408, system 400 does not block all reflected rays 402 from traveling backwards through optics 404 to object space 414. Optics 404 uniformly blur rays 402 such that the energy of rays 402 entering system 400 are spread out prior to reaching detector 406. Because ray energy is less concentrated, there are fewer Lambertian-like reflections from detector 406. Wavefront coded optics 404 may further be selected with a phase function such that the few rays 402 reaching optics 404 are blurred to reduce reflections.

Figure 22:
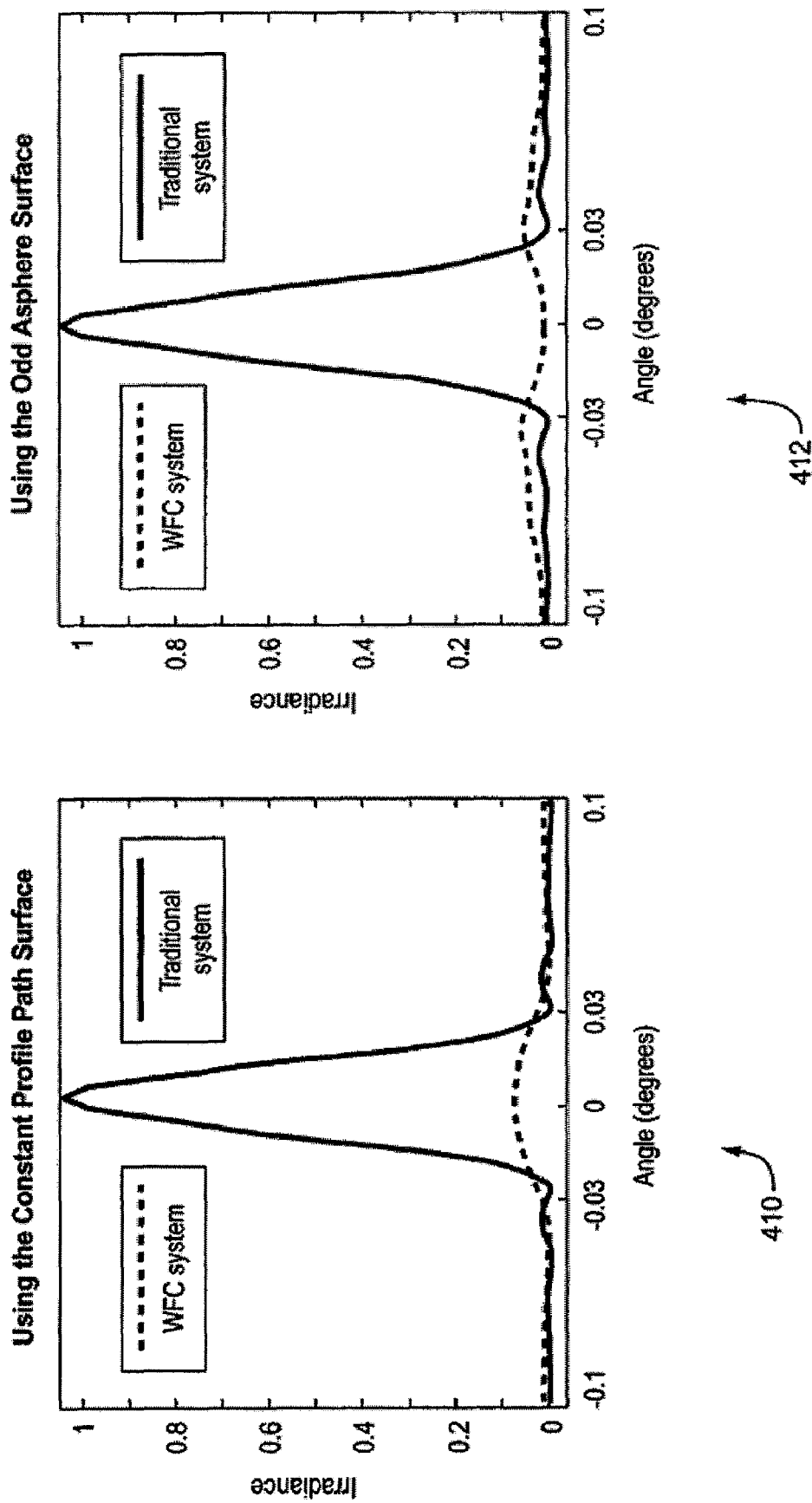
FIG. 22 shows intensity profiles for reflected ray energy for a conventional optical imaging system and two optical imaging systems employing wavefront coding.

FIG. 22 shows typical intensity profiles for the reflected ray energy at a far field (e.g., 500 meters) with a conventional optical imaging system and with wavefront coding by system 302A, FIG. 19. Plot 410 corresponds to phase form 322; plot 412 corresponds to phase form 324. The intensity of reflected energy 309, or irradiance, is much lower when wavefront coded optics 306A are used in optical imaging system at an on-axis position as compared to a conventional optical imaging system (e.g., system 10, FIG. 1). Even at off-axis positions, the irradiance of reflected energy 309 is lower.

Figure 22A:
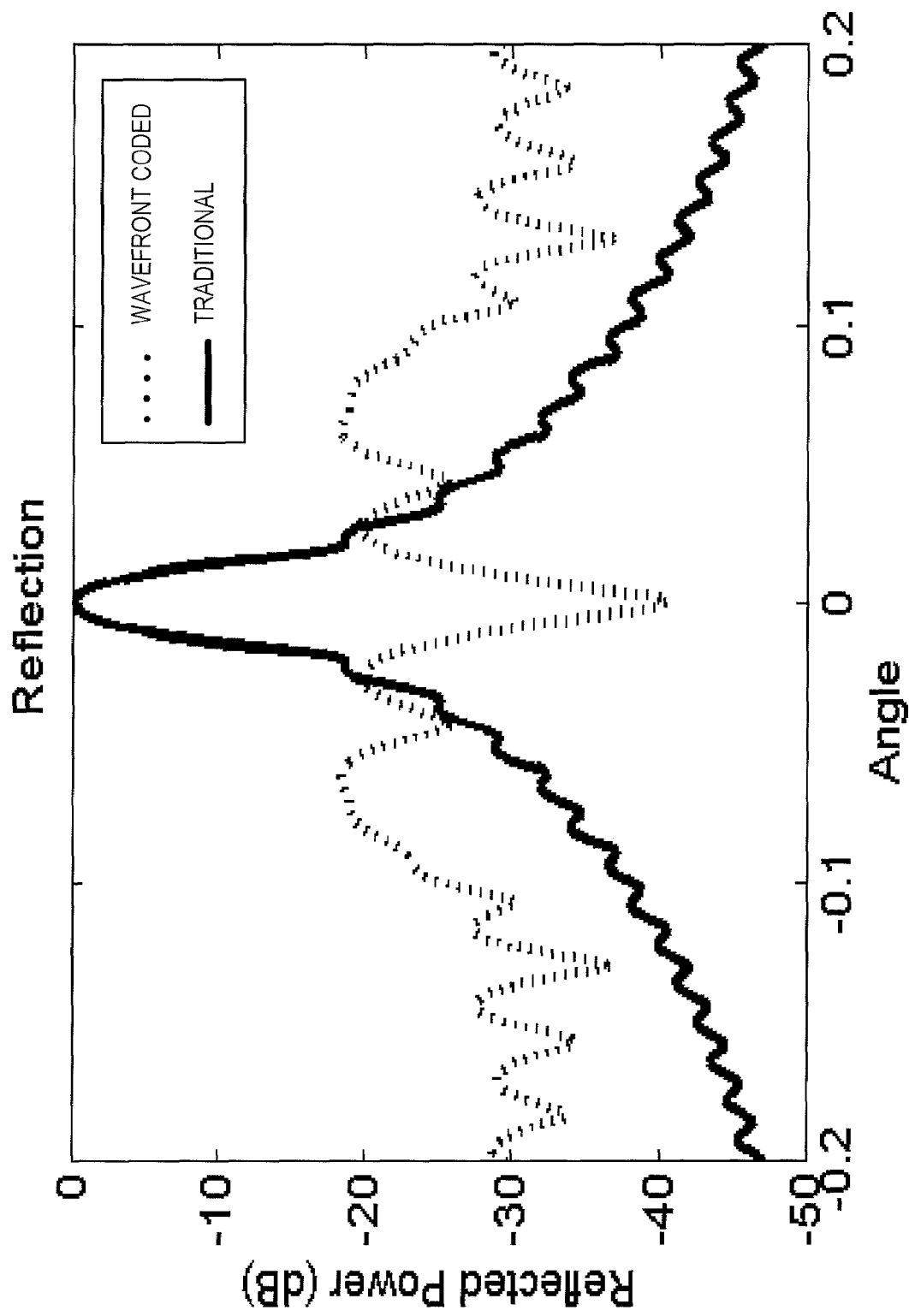
FIG. 22A shows a plot of integrated reflected power from a traditional diffraction-limited system and an optical imaging system employing wavefront coding.

A further example of the anti-reflection performance possible with wavefront coding is shown in FIGS. 22A, 22B, 22C, and 22D. FIG. 22A shows the integrated reflected power from an example optical imaging system (employing wavefront coding) and a traditional diffraction-limited system. The simulated system has a working F/# of 0.9, 10 micron illumination, and 25 micron square pixels with 100% fill factor. The integrated reflected power is represented as a function of angle at the far field of the sensor. The vertical scale is in dB and is given as $10*\log_{10}$(reflected energy). The integration area is ¼ of the width of the reflected main lobe of the traditional or diffraction-limited system. The reflected power is approximately 42 dB less for the optical imaging system as compared to the traditional system, at an angle of zero as shown in FIG. 22A.

Figure 22B:
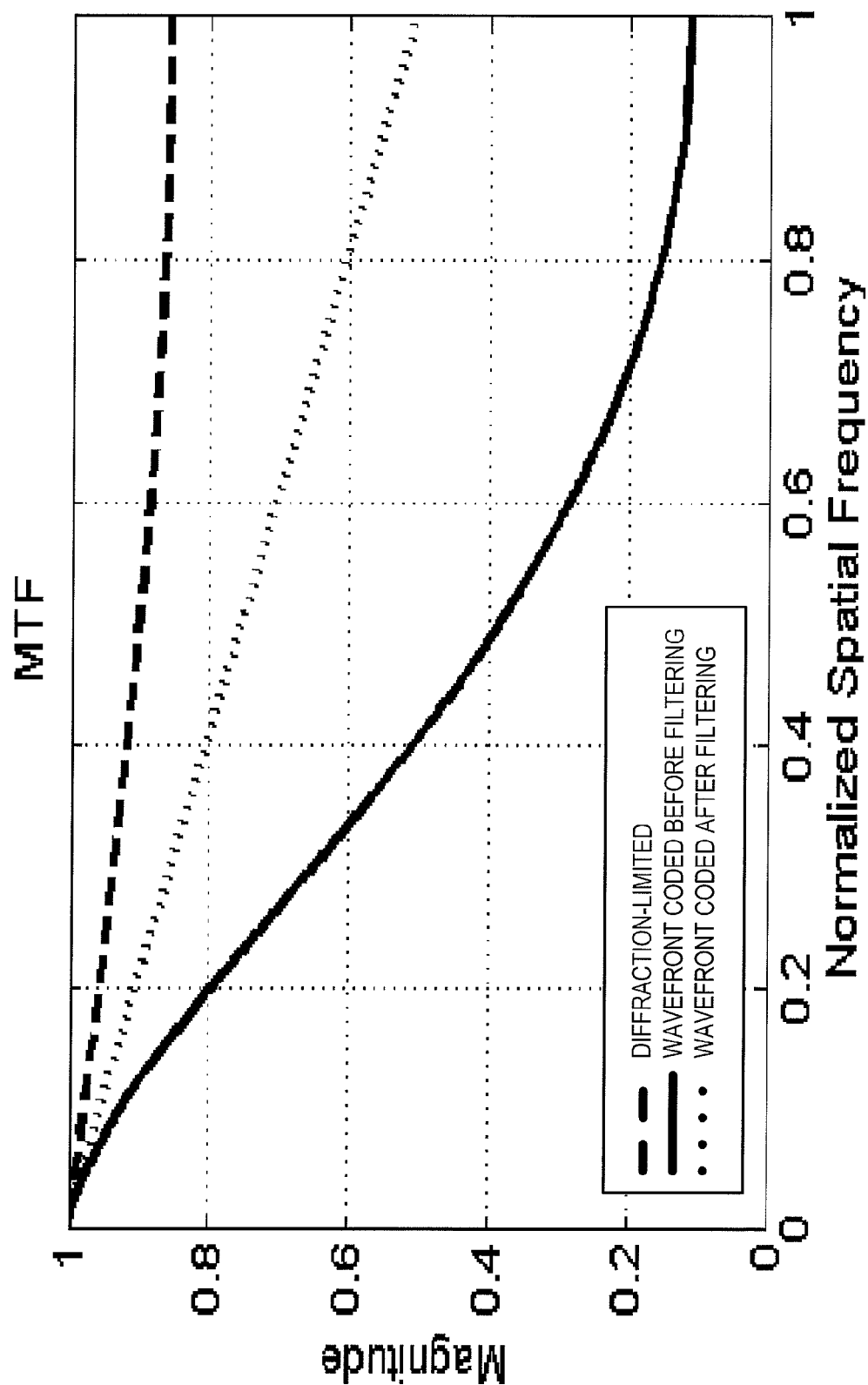
FIG. 22B shows a plot of MTF curves over normalized spatial frequency for a traditional diffraction-limited system and optical imaging systems (employing wavefront coding) with and without filtering.

The MTFs related to the imaging system 300 (from FIG. 18) that generated the graph of FIG. 22A is shown in FIG. 22B. The wavefront coding phase function reduces the MTF (and also greatly reduces the reflected on-axis energy). After processing by decoder 312 the MTF is increased to a system specified level. For this particular system, the MTF at the detector cutoff frequency (denoted at the normalized spatial frequency of 1.0 on FIG. 22B) was 0.4. Notice that the wavefront coded MTF before filtering of FIG. 22B also had no zero values within the passband of the image detector.

Figure 22C:
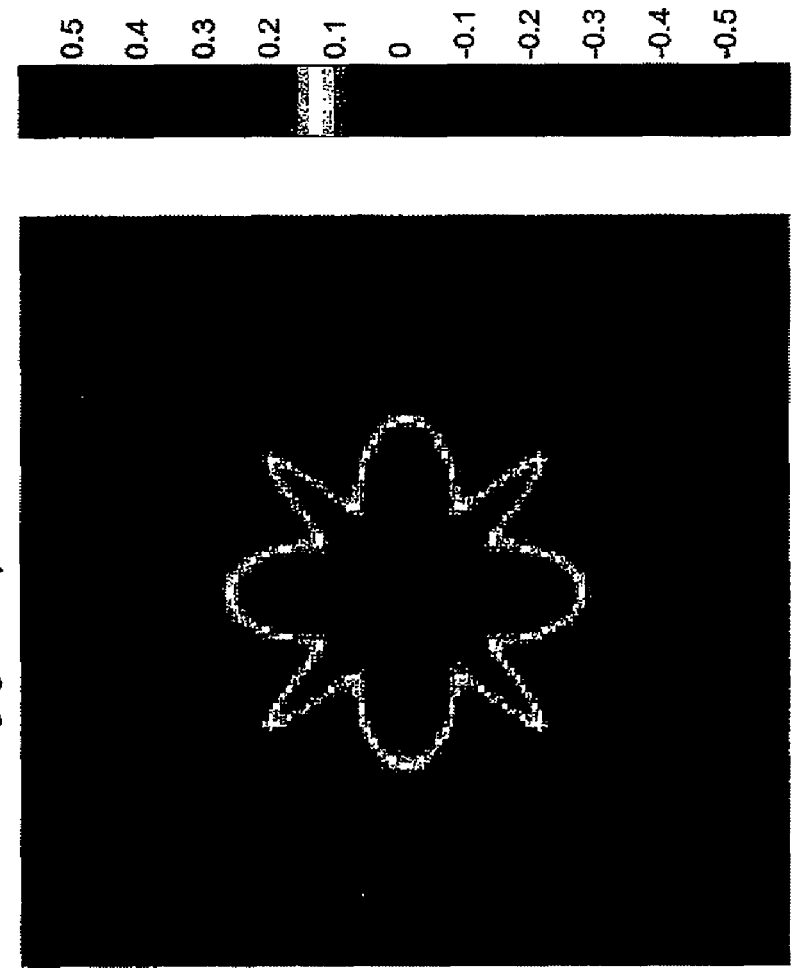
FIG. 22C illustrates an imaging exit pupil related to the optical imaging system of FIG. 22A.

The imaging exit pupil (or phase function added to the diffraction-limited system) related to FIG. 22A is shown in FIG. 22C. This exit pupil has about one wave peak-to-valley phase deviation and is constructed as the sum of two constant profile path phase functions. As this exit pupil has 180 degree symmetry, the equivalent exit pupil for the reflected energy is twice the imaging exit pupil. The mathematical form of this sum of two constant profile path exit pupils is, for this example, defined as:

Along the paths form #1: $C(x)=0.645-1.95x^2+3.45x^4-1.80x^6, |x|<1$

Across the path form #1: $D(y)=1, 0<y<1$

Along the paths form #2: $C(x)=1, |x|<1$

Across the path form #2: $3.79+2.87x-6.29x^3+2.80x^4$, $D(y)=, 0<y<1$

Figure 22D:
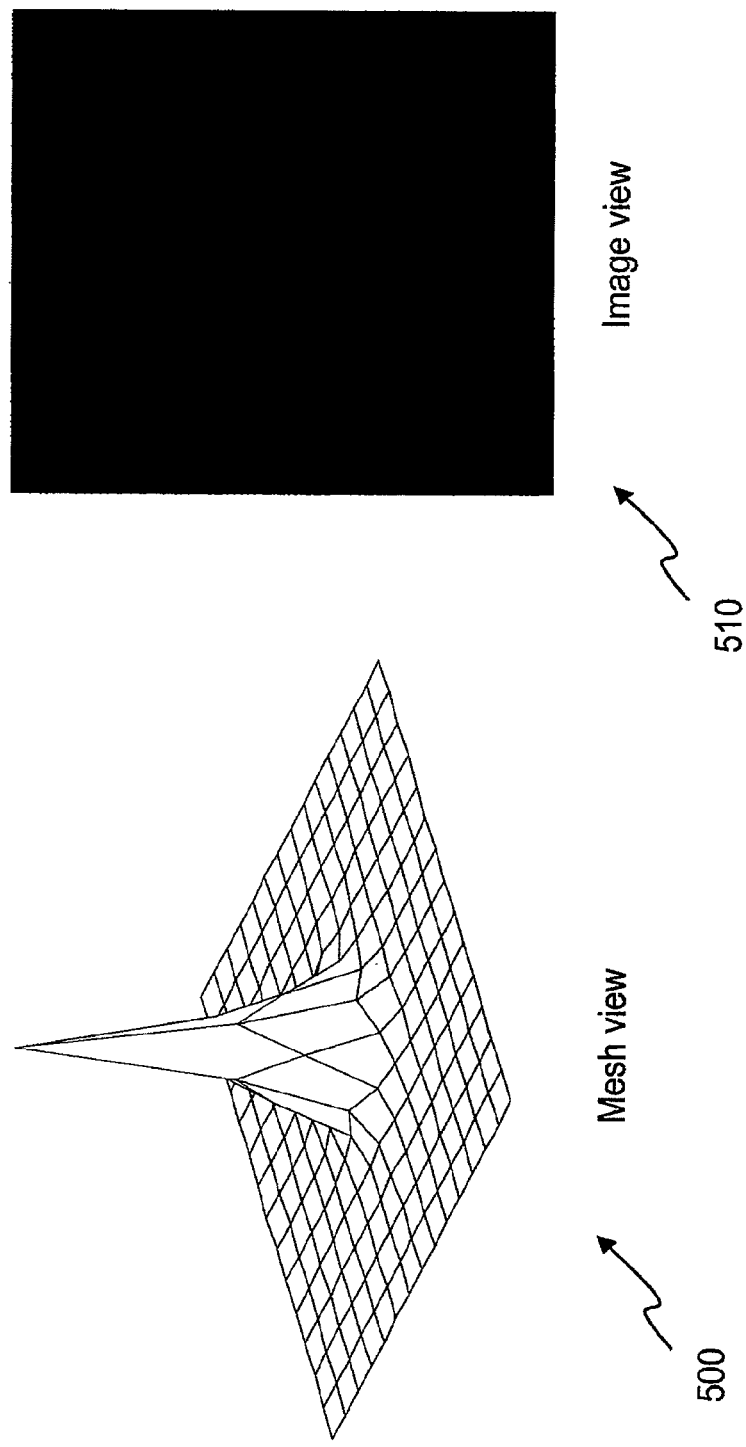
FIG. 22D illustrates a mesh view and an image view of a sampled PSF formed from the imaging exit pupil of FIG. 22C.

A mesh view 500 and an image view 510 of a sampled PSF related to the imaging exit pupil of FIG. 22C are shown in FIG. 22D. The sampled PSF is seen to be spatially compact. Decoder 312 acts on the sampled PSF of FIG. 22D to produce high quality images. Decoder 312 can be specialized to the use of the produced images. If a human is viewing the images, decoder 312 may have no operation, as the human brain can be used to remove the spatial effects. As the imaging MTF from FIG. 22B has no zeros, all object information is contained in the sampled PSF of FIG. 22D. If a target detection system is viewing the images then decoder 312 can be configured to produce the type of images best suited for the particular target detection system. In general, the target detection system (or image information system) that acts on the produced imagery may be jointly optimized with decoder 312 to increase overall system performance and decrease total costs.

Figure 23:
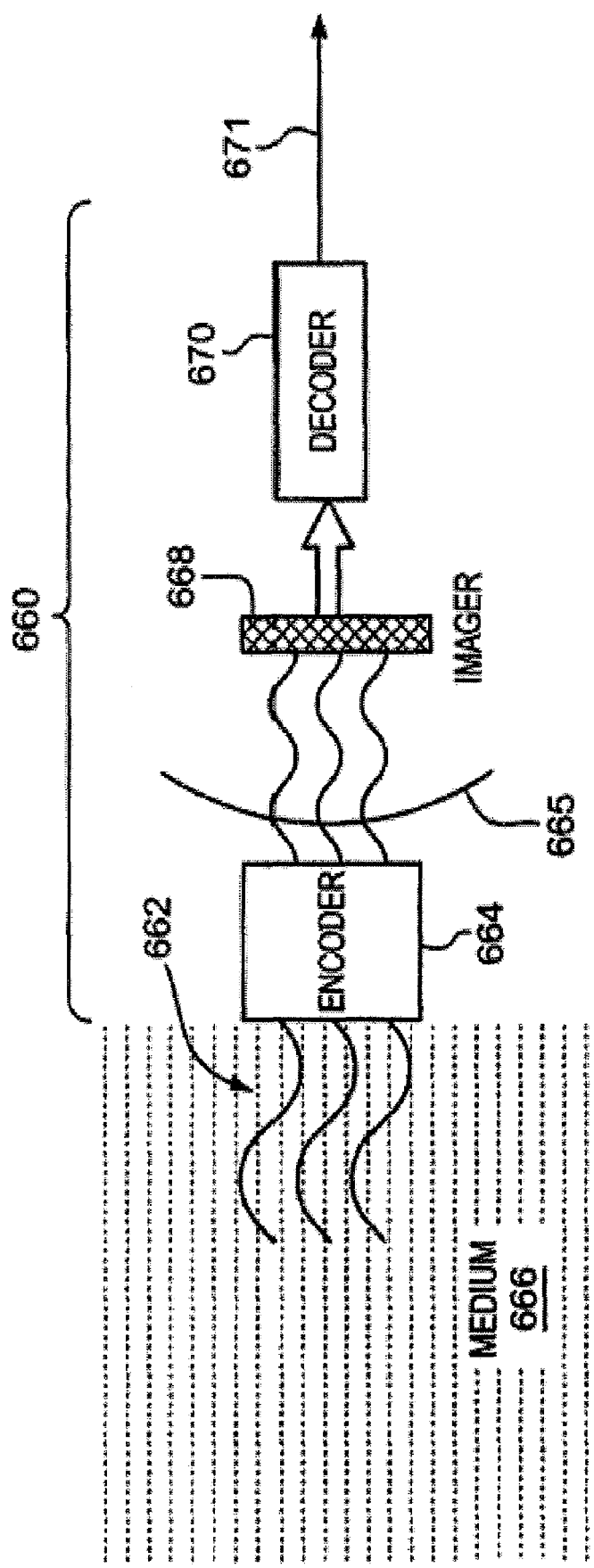
FIG. 23 shows an imaging system for imaging acoustical waves with wavefront coding.

FIG. 23 schematically shows an imaging system 660 for imaging acoustical waves 662. System 660 has an encoder 664 for coding a wavefront of acoustical waves 662 incident thereon from a medium 666. Encoder 664 makes an imaged wavefront 665 of acoustical waves 662 substantially invariant to acoustical aberrations caused by medium 666. Acoustical sound imager 668 detects encoded acoustical waves 662 and decoder 670 removes effects caused by encoder 664 when coding acoustical waves 662. In this way, system 660 generates acoustical sounds 671 that are substantially equivalent to sounds that would be obtained if no aberrations were introduced by medium 666.

System 660 thus operates similarly to imaging system 100, FIG. 2. System 660 may also be modeled to provide further refinement of the optimal acoustical imaging properties through medium 666, similar to the above modeling for system 100.

The following describes software processing suitable with certain optical imaging systems (employing wavefront coding) that utilize extended depth of field and/or passive ranging. Such processing is for example particularly useful in a number of applications where more than the minimum amount of signal processing is available such as in miniature cameras, microscopy, biometric imaging and machine vision systems. In one example of the prior art, a major problem in automated microscopy is the determination of best focus (or range to the object) and the act of securing best focus before an image is acquired and archived. This problem is complicated in the prior art since the focus position over the entire specimen (i.e., the object being imaged) may vary dramatically, requiring refocusing at each image acquisition location. More particularly, in the prior art, best focus is estimated by acquiring a series of images over various axial positions (z). A focus score is determined for each image, and an image with the highest focus score indicates best focus position (or range), or an interpolated focus score is used. This process may repeat for different magnifications, e.g., for coarse magnification objectives or fine magnification objectives.

Figure 24:
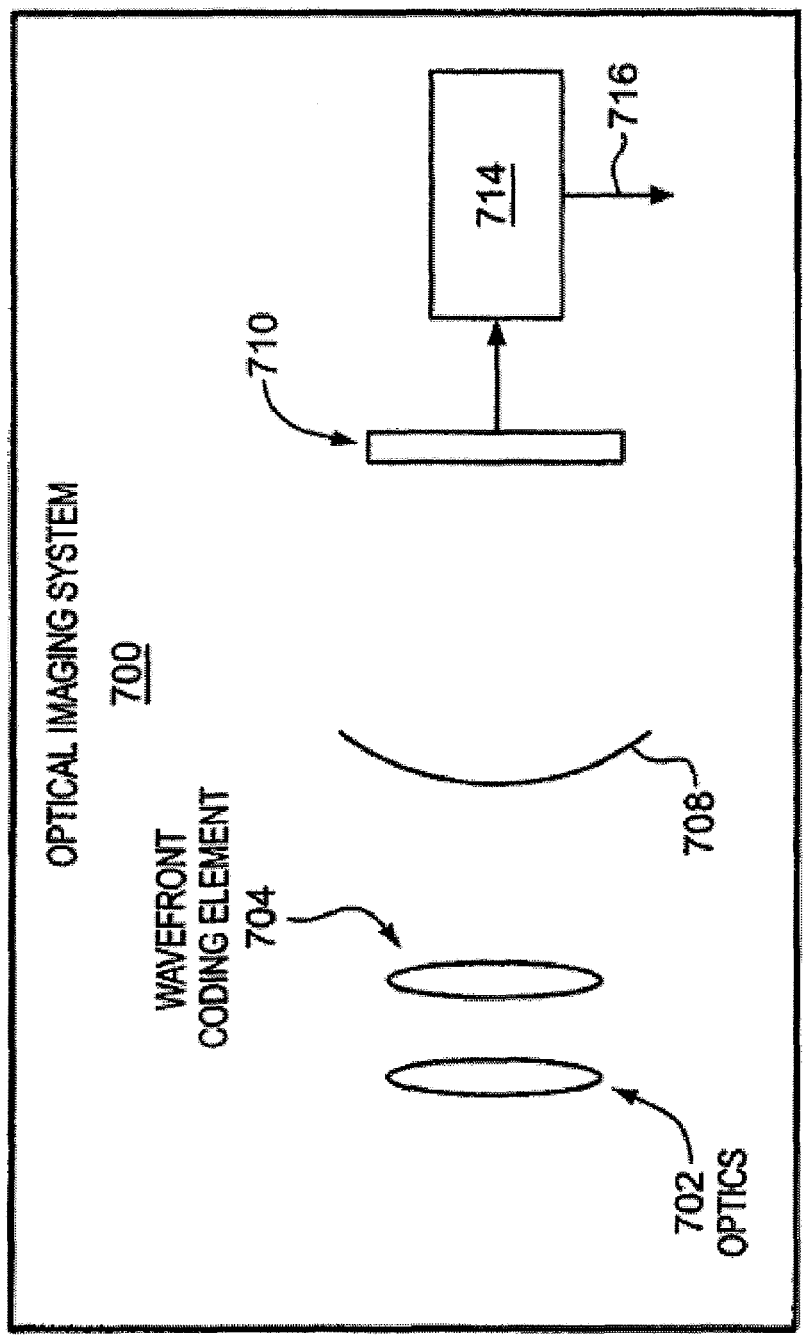
FIG. 24 shows an optical imaging system with automated software focusing.

Consider optical imaging system 700 of FIG. 24. System 700 has optics 702 and an associated wavefront coding element 704 (which may be integral with optics 702). Optics 702 and wavefront coding element 704 encode and focus a wavefront 708 onto a detector 710; wavefront 708 is a constant phase front from an imaged object 712. Post processing 714 serves to post process data from detector 710 to generate a final in focus image 716.

System 700 may, for example, be an automatic microscopy system, used for slide scanning and high throughput screening. System 700 may also be a biometric imaging system used for access control. System 700 may also be a miniature camera where the object is either "far" or "near", essentially acting as an electronic macro system with no moving parts. System 700 avoids the problems and repeat procedures of the prior art. As described in more detail below, system 700 may employ software processing in a variety of forms to generate high-quality images.

More particularly, system 700 processes data from object 712 (or, for example, the "specimen" if system 700 is a microscope) to automatically refocus and possibly range on a single acquired image. This is accomplished by characterizing optical system 700, then acquiring a single image and best focus through software processing within post processing 714. In general, the expected range of the object exceeds the depth of field of the imaging system. However, due to optics 702 of wavefront coding element 704, the MTFs have no zeros over this broad object range. When the MTF has no zeros, the underlying object information is preserved by optics 702. Post processing 714 then acts in a manner similar to decoder 312 or decoder 108 to decode the proper information from the sampled image. This allows determination of the object range, as well as digital processing best suited to the particular object location. In greater detail, these steps may, for example, be performed by:

(1) Acquiring PSF images (or other samples of system images) over a wide range of focus positions (e.g., for a 20×/0.5 objective, acquiring images +/−20 μm from best focus). The range of focus positions exceeds the depth of field of the system so that the PSFs can change appreciably over the range of focus positions.

(2) The incremental steps of (1) can be linear or irregular, based upon PSF rate of change. Building "specific" digital filters used in post processing 714 for each focus position or broad range of object positions; "specific" means that the filter is optimized from only one PSF image or region of focus positions.

Figure 25:
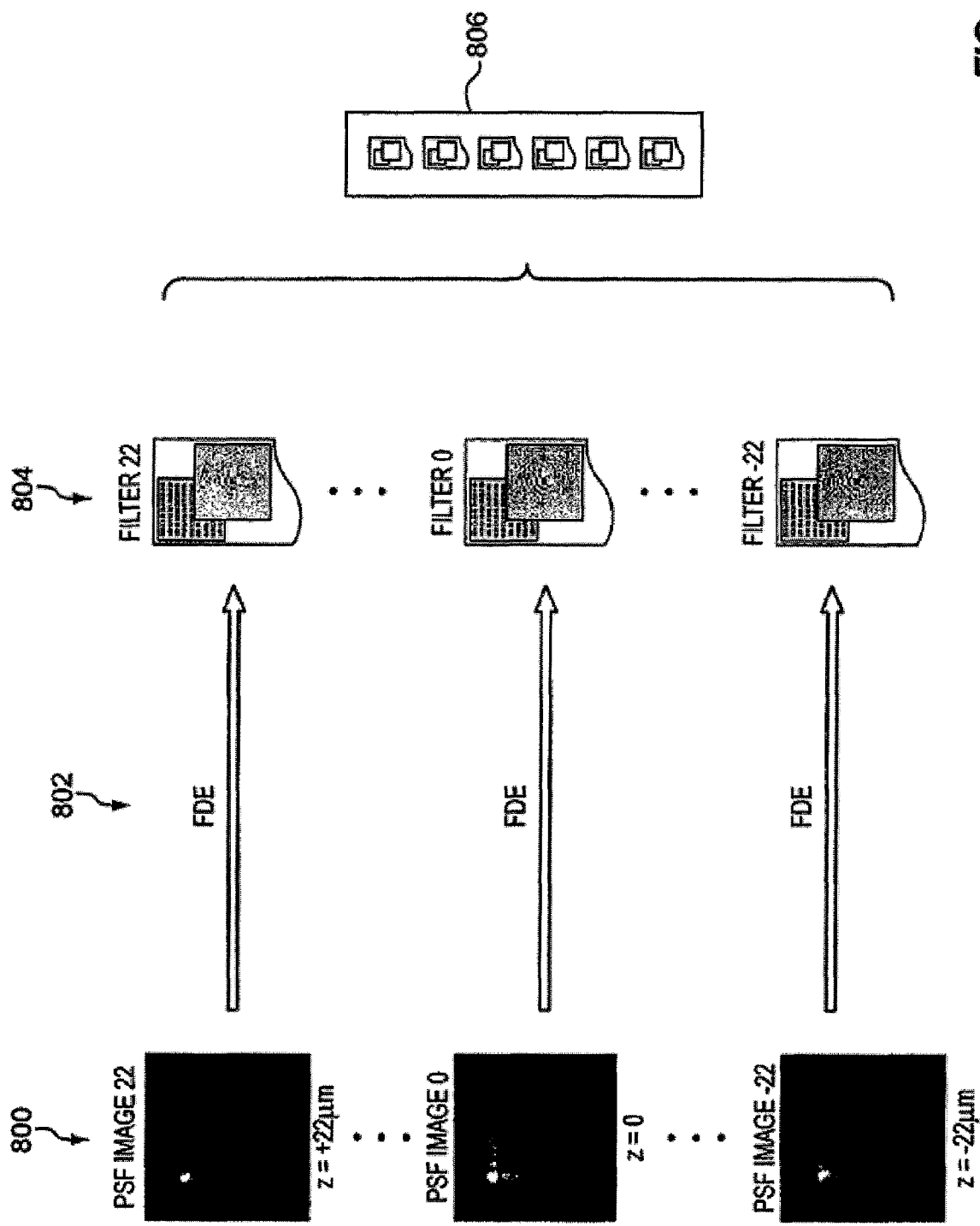
FIG. 25 illustrates certain software processing steps for the system of FIG. 24.

FIG. 25 illustrates step (1). In FIG. 25, a series of PSF images 800 taken over a broad range of focus positions is shown. This range exceeds the depth of field of the imaging system forming the PSFs; therefore, the PSFs change appreciably over this range of focus positions. A filter design engine (FDE) process 802 formulates a corresponding set of filters 804, as shown, to create a filter stack 806, one filter for each region of focus positions. The process of step (1) may occur in system 700 with or without wavefront coding element 702.

Figure 26:
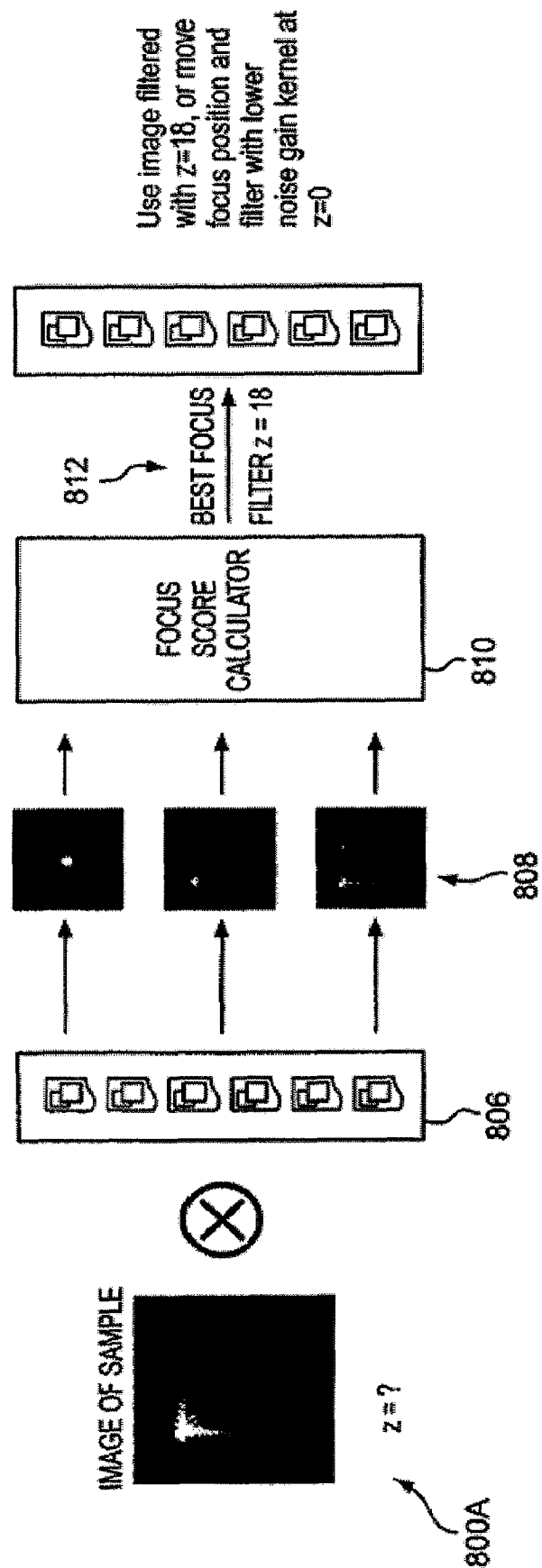
FIG. 26 illustrates certain other software processing steps for the system of FIG. 24.

In step (3), the following sub-steps may be made, such as illustrated in FIG. 26:

(3.1) Acquire a single image 800A at one focus position or object range. The image may be formed from a general scene.

(3.2) Filter image 800A with filter stack 806 to create a stack of filtered images 808.

(3.3) Calculate focus score 810 from stack of filtered images 808.

(3.4) Find best focus score 812 (or estimate of object range/best filter for the given image). In general, the particular filter from the filter stack 806 that "best" removes the blur from the sampled image 800A also describes an estimate of the misfocus amount or range to the object.

(3.5) Use the best focused image (e.g. archive or analyze) or use one additional step 3.6.

(3.6) Set a focus position (based on knowledge of particular amount of focus position from best focus score 812) and retake an image at best focus. A phase mask 103 can be specifically used for ranging purposes. This ranging may occur with coarse focus functions using a low power lens. Fine focus imaging may occur with higher magnification and numerical apertures, thus permitting use of a less pronounced phase mask 103 (or no phase mask 103). Since many optical systems have asymmetrical defocus (i.e., the response of an ideal imaging system to + and − misfocus is not the same), ranging may be performed on the sampled images without wavefront coding or on logarithmic, rotationally symmetric pupils. One advantage of using phase mask 103 (versus no mask) is that the PSF with wavefront coding has no MTF zeros, providing better information capture at small misfocus values.

Figure 27:
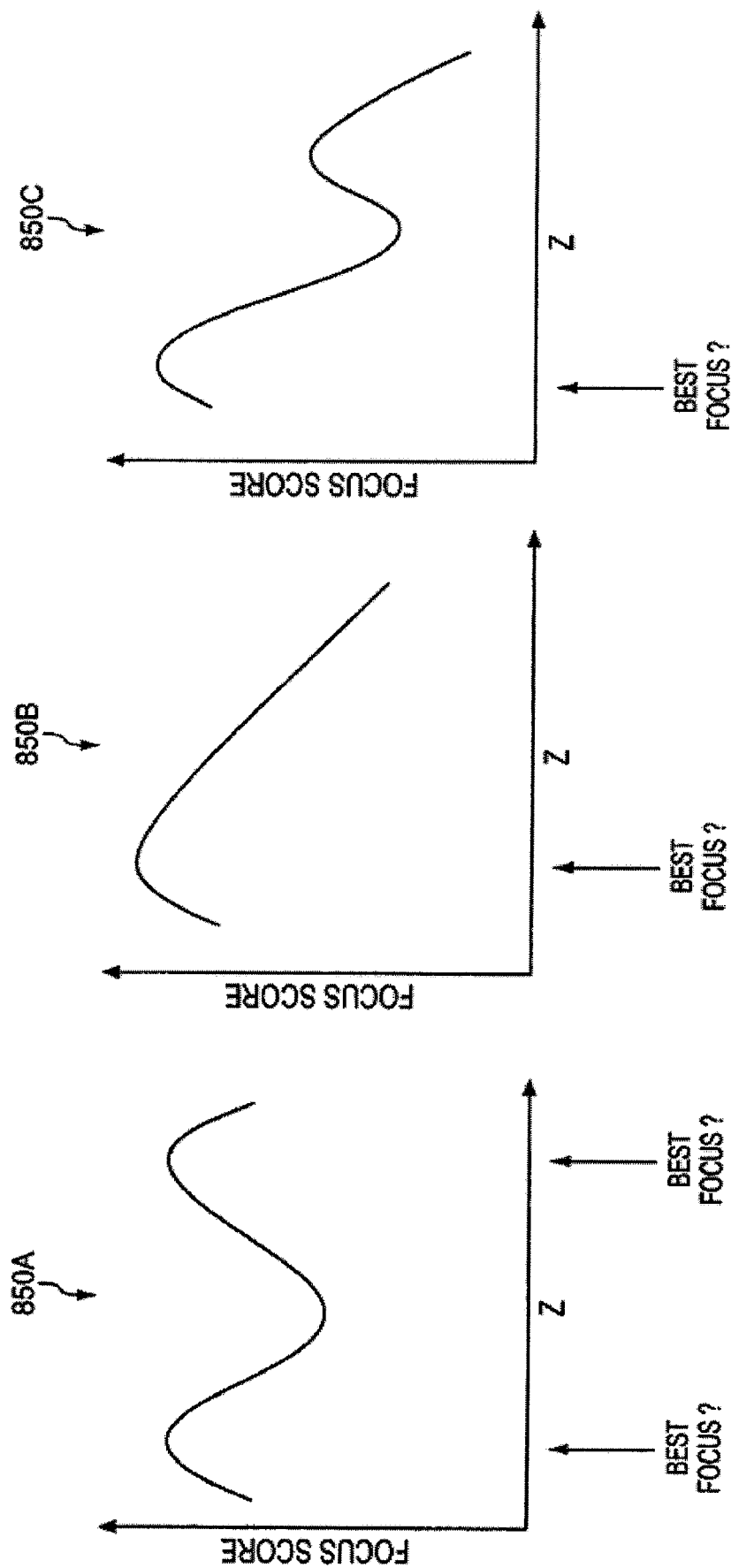
FIG. 27 graphically illustrates focus score for certain exemplary cases.

FIG. 27 illustrates focus score through use of an asymmetric or symmetric defocusing phase mask 103. In particular, FIG. 27 shows three graphs 850A, 850B and 850C illustrating hypothetical focus score versus z for symmetric defocusing (850A), asymmetric defocusing (850B), and a pseudo-symmetric defocusing (850C).

Software focusing as described in connection with FIG. 24-FIG. 27 may provide certain advantages. For example, system 700 may be a fixed focus miniature camera that exhibits auto-focus and/or macro-focus functionality. In another example, system 700 is a cell phone camera that has a fixed focus which makes good quality portraits and close-up images of objects 712 (e.g., business cards). Moreover, filter stack 806 may be determined a priori over a range of expected object distances. In one variation, manual adjustment may also be used to determine best focus, as an alternative to use of the focus score. The stack of filters (i.e., filter stack 806) need not be linear filters. They could be any combination of digital processing operations that act on the sampled image to produce a high quality image suitable for the user (human or machine) of the image.

It should be clear to those skilled in the art that system 700 may have other features. For example, it may optically zoom to greater range of focus and magnifications by moving zoom lenses, where focus score is determined by a series of filters taken at different zoom positions, to select best focus. Accordingly, a user may adjust the filters at a particular zoom to select the preferred or desired object distance. Or, focus score may be used with a matrix of filters, first by zoom, then by object distance (e.g. rows=zoom, columns=subject distance).

Therefore, system 700 may have further application as a software-athermalized optical imaging system, such as within telescopes and IR imagers. It may alternatively serve within machine vision systems using fixed focus lenses 702.

It may also serve as an endoscope with hardware zoom features but with software optimized filter selection.

In many types of imaging systems 10 of FIG. 1, image processing 60 is specific, task-based image processing. Such task-based processing is often used to determine image information. This information may include, for example, the spatial location of objects, lines, edges and/or points; the presence or absence of bars and/or squares, and general image-based statistical quantities, the latter two types corresponding to task-based image systems such as bar code scanners and biometric recognition systems, respectively. Structured light imaging systems, where image information is coded onto the spatial location of objects such as bars in the image, is another example of a task-based imaging system used to determine image information.

As described in more detail below, a version of task-based processing (employing wavefront coding) may also occur with system 100, FIG. 2, with additional image processing 60 after decoder 108. Such a system is, for example, used to produce the task-based image information over a larger depth of field (or depth of focus) as compared to system 10, FIG. 1, which under like conditions produces aberrated images due to poorly performing lenses over a broader temperature range, etc.

Since specific optical imaging systems are used to determine image information, and do not produce images for human viewing, in one embodiment, decoder 108 is not included within system 100. More particularly, decoder 108 may have the characteristic that it does not create or remove needed image information. The image information is instead transformed into a form more suitable for human viewing or other specialized processing by decoder 108. The amount of image information, or image "entropy," may also be unchanged by decoder 108. Since the amount of image information may be unchanged by decoder 108, image processing 60 after decoder 108 may be essentially insensitive to processing by decoder 108. In other words, certain performance aspects of task-based wavefront coding optical and digital imaging systems can be unaffected by either the presence or absence of decoder 108. In such cases, decoder 108 may be removed from system 100 of FIG. 2 with no adverse effects. That is, the stored electrical representation of the image output by certain task-based processing does not contain effects of wavefront coding that would otherwise require explicit processing to remove.

Figure 28A:
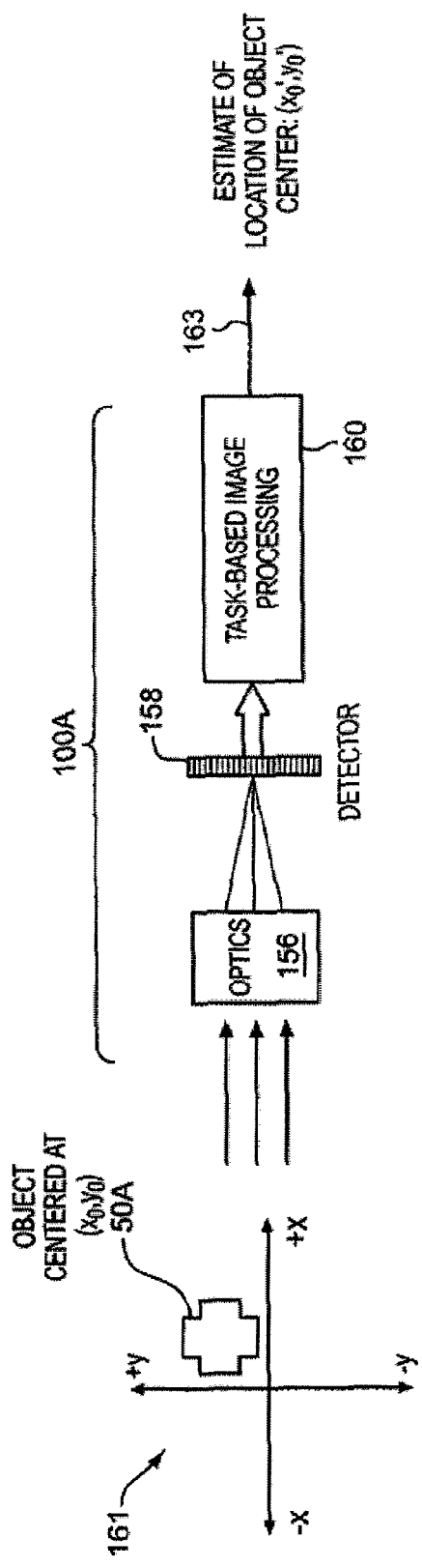
FIG. 28A shows one task-based optical imaging system.

Consider, for example, the task-based imaging system 100A of FIG. 28A. System 100A is illustratively functionally equivalent to system 10, FIG. 1, except for specialized task-based processing by task-based image processing 160. System 100A operates to image object 50A to detector 158 and accurately estimate the spatial center of object 50A. That is, the stored electrical representation of the object output by system 100A is the spatial center of object 50A. On (x,y) coordinates known to system 100A, the spatial center of object 50A is $(x_0, y_0)$. The output 163 of task-based imaging system 100A is an estimate of $(x_0, y_0)$, denoted as $(x_0', y_0')$. The actual image formed and seen by a human on detector 158 is not important for this example. In this system, and in other systems, only an estimate of spatial location $(x_0, y_0)$ is desired. This task is therefore an example of a task-based system forming images in order to estimate image information.

Wavefront coding within system 100A is, for example, useful if the distance between object 50A and system 100A is unknown or varies, i.e., such that the image formed on detector 158 does not contain sufficient accuracy to object 50A and estimates $(x_0, y_0)$ are not readily made by task-based image processing 160. Wavefront coding can also be used to reduce the complexity and cost of imaging optics 156 by removing negative effects of aberrations due to optics, mechanics, alignment, thermal changes and/or aliasing, each of which can have effects on the accuracy of the estimate of $(x_0, y_0)$.

Figure 28B:
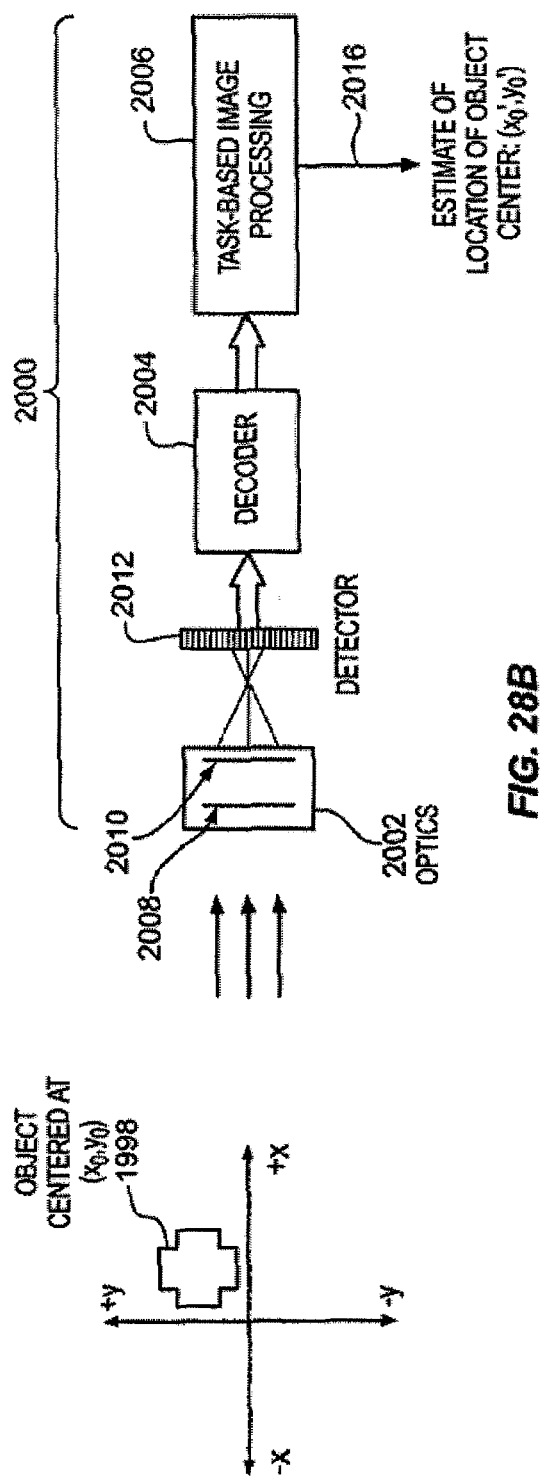
FIG. 28B shows one task-based optical imaging system employing wavefront coding.

System 2000 of FIG. 28B is a version of system 100A (employing wavefront coding), FIG. 28A. System 2000 has optics 2002, decoder 2004, and task-based image processing 2006. Optics 2002 contain image forming lenses 2008 and wavefront coding aspheric optics 2010. Lenses 2008 and optics 2010 create an image of object 1998 at a detector 2012. Lenses 2008 and optics 2010 may be combined so that the total number of optical elements is one or more. Task-based image processing 2006 can, but does not have to, be the same as processing 160 of FIG. 28A.

Now consider one task-based image processing performed by processing 2006 in order to generate an estimate 2016 of a center $(x_0, y_0)$ of object 1998. The spatial information about the object center can be described in the spatial domain by a centroid of object 1998. Calculation of the image centroid can be used to estimate $(x_0, y_0)$. The spatial information about the object center can also be described by a linear phase term of a Fourier transform of the image formed by optics 2002 at detector 2012. As known to those skilled in the art, spatial location is represented in the frequency domain through the slope of a linear phase component of a complex Fourier transform of the image. Calculation of the slope of the linear phase component in the frequency domain yields an estimate of $(x_0, y_0)$. Due to the nature of these frequency domain calculations, the estimate of $(x_0, y_0)$ may be insensitive to the presence or absence of decoder 2004.

For example, assume that a spatially centered version of object 1998 is represented mathematically (in one dimension for clarity of illustration) as $o(x)$ with spatial Fourier transform $O(u)$. Assume for this example that this spatially centered version has no linear phase component in $O(u)$. Also assume that the spatial blurring function of wavefront coded optics 2002 is given by $h(x)$, with spatial Fourier transform $H(u)$. Assume also that decoder 2004 acts to minimize the spatial blur $h(x)$ through convolution with a spatial kernel $f(x)$ (with a spatial Fourier transform $F(u)$). Then, the image of object 1998 with center $(x_0, y_0)$ measured at detector 2012 can be approximated as:

$$\text{sampled\_image} = o(x - x_0) * h(x)$$

where '*' denotes spatial convolution. In the spatial frequency domain, this sampled image can be represented as:

$$\text{sampled\_image}' = \{O(u) \exp(j\, u\, x_0)\} \times H(u)$$

where u is the spatial frequency variable, j is the square root of −1, and 'x' denotes point-by-point multiplication. Notice that spatial location $x_0$ is now part of a linear phase term, $(u\, x_0)$. Any linear phase term of $H(u)$, if $H(u) = H(u)' \exp(j\, u\, z_0)$, can be considered as a known spatial bias of amount $z_0$. The sampled image after decoder 2004 in the spatial domain can be approximated as:

$$\text{sampled\_image\_after\_filtering} = o(x - x_0) * h(x) * f(x)$$

With the sampled spatial image after filtering (by decoder 2004), a centroid calculation (within processing 2006) can be used to estimate the spatial center $x_0$, since the combination of the system blur $h(x)$ and filter $f(x)$ are combined to essentially yield, for this example, $h(x) * f(x) \approx \text{delta}(x)$, where $\text{delta}(x)$ is 1 if $x = 0$, and equal to 0 otherwise. If the centroid calculation is performed before applying filter $f(x)$ (i.e., before filtering by decoder 2004), the spatial blurring by $h(x)$ could yield inaccurate estimates of the spatial center $x_0$. Since processing 2006 is a centroid calculation, it is not alone sufficient to remove effects of wavefront coding (of element 2010) without decoder 2004.

The equivalent filtered image after decoder 2004 can be approximated by applying filter F(u) in the frequency domain. This results in:

sampled_image_after_filtering'={O(u)exp(j u $x_0$)}×H(u)×F(u)

Figure 28C:
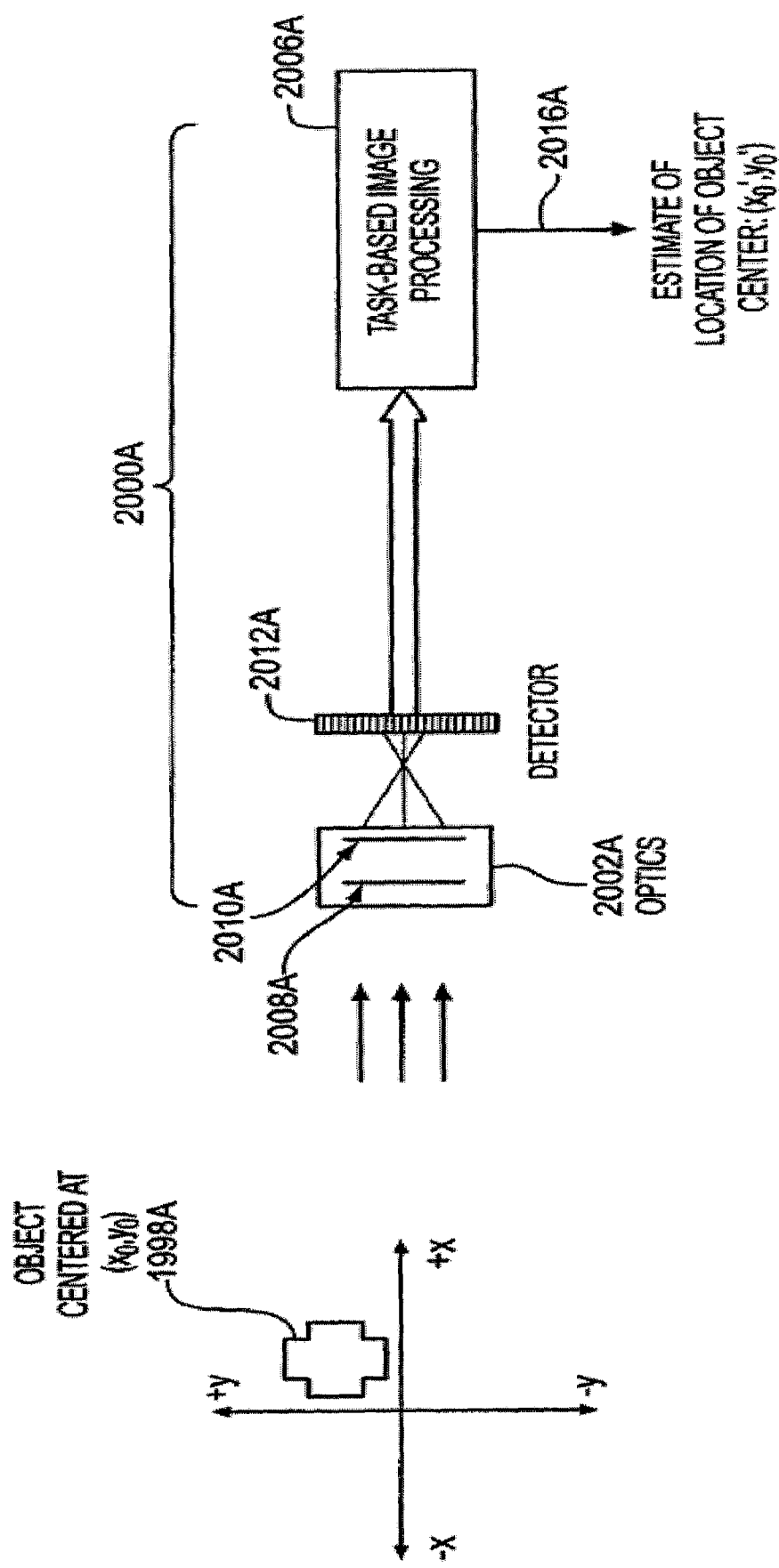
FIG. 28C shows one other task-based optical imaging system employing wavefront coding.

If the filter F(u) has a linear phase term, such that F(u)=F(u)'exp(j u $z_1$), then the filter adds an additional known bias term $z_1$ to the linear phase component of the sampled image after filtering. But since the magnitude of F(u) is typically greater than zero, applying filter F(u) does not help or hurt the calculation of the linear phase amount $x_0$ in the frequency domain. With or without filter F(u), the process of estimating $x_0$ is the same: 1) calculate the spatial Fourier transform of the signal, 2) separate the complex phase and magnitude, 3) calculate the linear phase component, and 4) subtract any system bias. Calculation of the linear phase component can be performed through a least squares technique by fitting the phase to a straight line (for 1D images) or a plane (for 2D images). Filter F(u), if |F(u)|>0, alters the calculation of the spatial shift through the addition of a known spatial location bias $z_1$, which may be subtracted during calculation of the estimate of $x_0$. Therefore, task-based processing 2006 is insensitive to the presence or absence of decoder 2004 as to determining estimate 2016. Decoder 2004 is not required to achieve the benefits of wavefront coding in system 2000 compared to that of system 100A without wavefront coding. More specifically, the frequency domain processing within processing 2006 outputs a stored electrical representation of object 1998 that is insensitive to effects of wavefront coding that would otherwise require explicit processing to remove. FIG. 28C shows system 2000A with task-based image processing 2006A and without decoder 2004 of FIG. 28B. Optics 2002A contain image forming lenses 2008A and wavefront coding aspheric optics 2010A, which create an image of object 1998A at a detector 2012A. System 2000A is functionally equivalent to system 2000 (like numbers providing like functionality), absent decoder 2004; decoder 2004 being absent due to specialized processing 2006A, providing like output 2016A The reason that decoder 2004 is not required in system 2000A is that task-based imaging processing 2006, 2006A is used to determine information from the formed images at detector 2012, 2012A, respectively. Such information, also often called entropy, is a mathematical term often used in communication systems to describe the amount of bits needed to transmit or describe a signal, e.g., a voice signal, a radar signal, an image, etc. In image processing, such information is often related to the amount of randomness or un-anticipated aspects of an image. If an image is completely known before being viewed, then this image brings little information to the viewer. If the image is unknown before viewing, the image may bring a significant amount of information to the viewer depending on the imaging system used and the object being imaged. In general, the object contains the information and the imaging system transfers this information. Since imaging systems cannot transfer spatial information perfectly, the information contained in the image is typically less than that of the object. If the imaging system misfocuses, then the MTF of the imaging system can have regions of zero power and the system can transfer little information from the object. After sampling by the detector, the amount of image information can only be kept constant or destroyed (reduced) with digital processing (e.g., by decoder 2004 and processing 2006). Digital processing cannot create information previously lost within an imaging system; it is only used to change the form of the image information. This concept is termed the Data Processing Inequality (see, e.g., Elements of Information Theory, Cover and Thomas, John Wiley & Sons, Inc, 1991). In one example, a human can have difficulty viewing and understanding a modified image where each spatial frequency component of the image has been deterministically modified with a non-zero phase, even though the amount of information can technically be exactly the same as the un-modified image. In contrast, image processing 2006, 2006A of a task-based system can be designed and used such that deterministic modifications of the spatial frequency components have little to no effect on performance of the task.

Figure 29:
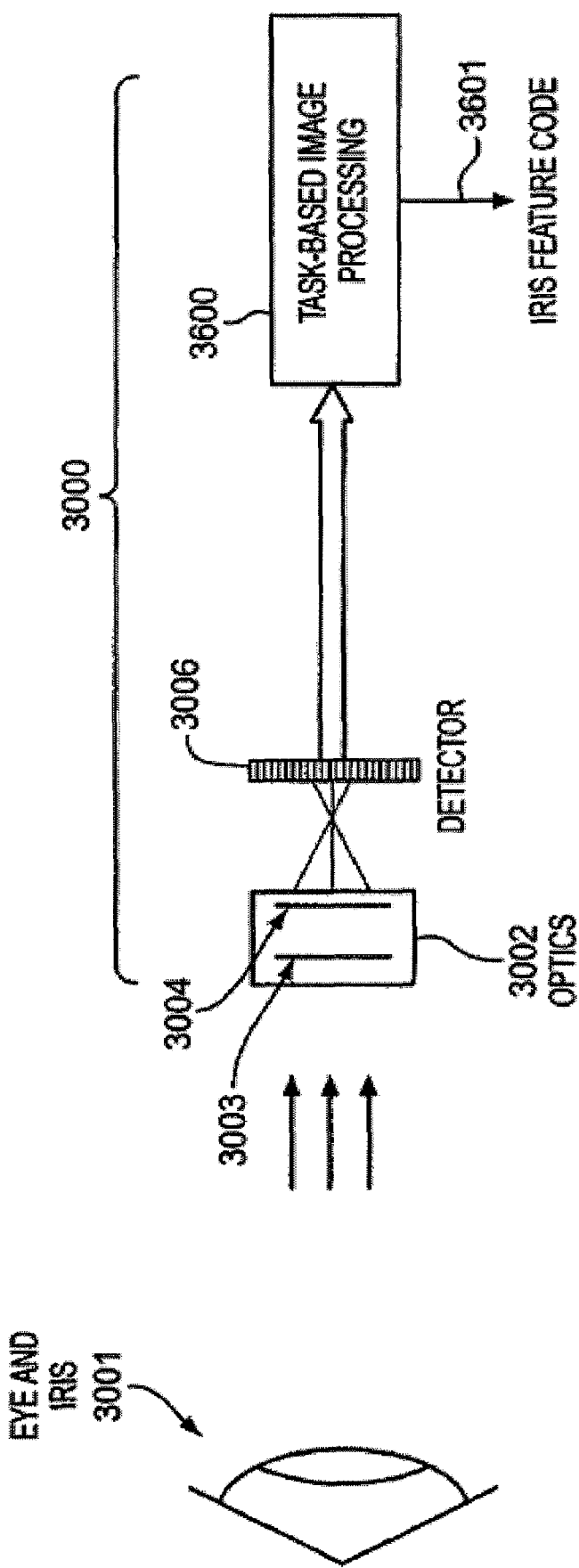
FIG. 29 shows one task-based, iris recognition optical imaging system employing wavefront coding.

Another example of a wavefront coded task-based imaging system is a biometric recognition system, or more specifically, an iris recognition system 3000 of FIG. 29. System 3000 with task-based processing 3600 (specialized for iris recognition) images the iris of eye 3001. System 3000 is functionally equivalent to system 2000A of FIG. 28C with the exception that task-based processing 3600 is specialized for iris recognition. Optics 3002 include image forming optics 3003 and wavefront coding optics 3004. Both optics 3003 and 3004 can be combined onto the same element such that optics 3002 contains a minimum of one optical element. Detector 3006 detects electromagnetic radiation 3005 imaged by optics 3002. Task-based processing 3600 produces a sequence of bits, or an iris feature code 3601, related to the complex phase of the image of iris 3001 convolved with a complex function. In one embodiment, this complex function is a 2D Gabor bandpass function as a function of spatial location and scale. An image of iris 3001 directly useful to a human is not output by task-based processing 3600. Iris feature codes (i.e. iris feature code 3601) take many forms, but all act to arrange features in the iris such that differences in the eye of every person, and even between eyes of the same person, can be determined and such that a specific iris can be recognized and others can be rejected. Task-based processing 3600 may therefore act to code the biometric information of the iris image into a form practical for recognition tasks. See U.S. Pat. No. 5,291,560 (March 1994); Biometric Personal Identification System Based on Iris Analysis; and "Demodulation by Complex-Valued Wavelets for Stochastic Pattern Recognition", by John Daugman, International Journal of Wavelets, Multiresolution and Information Processing, Vol. 1, No. 1, (2003) pg 1-17, each of which is incorporated herein by reference, for more information about iris feature codes and iris recognition.

Task-based processing used to generate iris feature codes can be largely independent of the presence or absence of wavefront decoder 2004 of FIG. 28B. In some cases, the absence of decoder 2004 is preferred in iris recognition because of noise amplification effects that can be introduced by decoder 2004. Consider an example iris that can be described in the spatial domain as:

Iris=I(x)

where again 1D representations are used for ease of illustration. Extension to 2D representations are apparent to those skilled in the art of signal processing. Consider an amount of spatial blurring of the imaging optics as the function h(x). Then the sampled iris image can be described as:

Iris_image=I(x)*h(x)+n(x)

where again '*' denotes spatial convolution. The term n(x) is a noise term that is present in all real imaging systems. This noise can be due to detector additive noise, pixel non-linearity and non-uniformity, image jitter, iris movement, etc. For this representation, both additive and multiplicative noise is represented as additive noise for ease of illustration. Let the complex feature code forming function, which could be a complex Gabor wavelet, a complex Haar wavelet, and many others, be denoted as $c(x)_{ik}$ where i and k are indexes related to the particular parameters of the feature code forming function. The feature code forming function is applied to the iris image to yield the Iris Feature Code:

$$\text{Iris\_Feature\_Code}_{ik} = \text{Phase}[c(x)_{ik} \bullet \{I(x)*h(x)+n(x)\}]$$

where the process Phase[ ] calculates the complex phase of the Iris Image acted on by particular iris feature code forming function. The symbol '•' denotes the general operation performed by the particular iris coding scheme. This could be multiplication, convolution (smoothing), or other operations. Often this complex phase is quantized into two bit sequences relating to the possible four quadrants of a unit circle.

For a given iris, the Iris Feature Code is a statistical quantity with a certain mean, variance and probability density. Consider the differences in the output of the feature code forming function and the iris image with a spatial blurring function from an in-focus diffraction limited imaging system $h(x)_{dl}$, and the spatial blurring function from a well designed wavefront coding system $h(x)_{wfc}$. The well designed wavefront coding system has no zeros in its MTF over a broad range of misfocus-like aberrations over the spatial passband of the digital detector:

$$c(x)_{ik} \bullet \{I(x)*h(x)_{dl}\} \text{ vs. } c(x)_{ik} \bullet \{I(x)*h(x)_{wfc}\};$$

If we assume that the operator • denotes point by point multiplication then we can write, in matrix notation:

$$\underline{C}^T_{ik} H_{dl} \underline{I} \text{ vs } \underline{C}^T_{ik} H_{wfc} \underline{I}$$

where $\underline{C}_{ik}$ is a vector representing the feature code forming function, $\underline{I}$ is a vector representing the iris, and H are convolution matrices. The superscript T denotes transpose. The formed iris images ($H_{dl}\underline{I}$) and ($H_{wfc}\underline{I}$) are different versions of iris feature information from the same iris. Since the MTF of the wavefront coding system was designed so that the MTF has no zeros, there exists a linear filter and convolution matrix $H_f$ such that:

$$H_f H_{wfc} \underline{I} = H_{dl} \underline{I}$$

where the convolution of the filter with the sampled wavefront coded iris image is essentially the same as an iris image from a diffraction limited (or any other) iris image in the absence of noise. Knowledge of the wavefront coded iris image is sufficient to form the iris image that would have been formed by the in-focus diffraction-limited image. So, the features of the iris can be thought of as being reformatted by a deterministic blurring function of the wavefront coding system. No features of the iris are lost, merely rearranged. If decoder 2004 is used, then the iris information can be explicitly formatted to that expected from the diffraction-limited system.

Counting the fraction of bits that differ in two iris images is a common metric to measure differences in iris feature codes. The fraction can vary from 0 (no differing bits) to 1 (all bits differ). This metric is called the Hamming distance. The expected Hamming distance from two noise-free iris feature codes of the same iris can be essentially the same when both iris images are formed with an in-focus diffraction-limited system, when both iris images are formed from a wavefront coded system without decoder 2004, when both iris images are formed with a wavefront coded system where decoder 2004 is used, or when one image is formed with an in-focus diffraction-limited system and the other is formed with a wavefront coding system with decoder 2004. In the latter case, decoder 2004 acts to form an equivalent code as that measured by the diffraction-limited system. The expected Hamming distance between two iris feature codes of different irises when both are imaged with an in-focus diffraction-limited image can also be essentially the same as when the set of iris images are formed with a wavefront coding system without decoder 2004, or when the set of iris images are formed with a wavefront coding system with decoder 2004. The expected Hamming distances between iris feature codes from the same or different iris when imaged with two different imaging systems do not have this ideal characteristic. The ideal characteristics are present when sets of iris images are formed with the same type of imaging system. The performance of the noise-free iris feature codes, in terms of the expected Hamming distance, can be essentially the same when imaged with the diffraction-limited system or a wavefront coding system with or without decoder 2004. That is, the stored electrical representation of the image (the iris feature code) does not contain effects of wavefront coding that would otherwise require explicit processing to remove (due to specialized processing of processing 3600).

If decoder 2004 of FIG. 28B is used before the feature code forming function, the image just after the decoder can be represented as:

$$\{I(x)*h(x)_{wfc}+n(x)\}*f(x) = H_f H_{wfc} \underline{I} + H_f \underline{n}$$

where in this case decoder 2004 applies a linear digital filter f(x). Notice that the decoder acts on the term containing the iris and the term containing the noise. As above, the decoder merely rearranges the form of the iris features, but the noise term after decoder 2004 is now spatially correlated. If we assume for simplicity that the noise is independent white Gaussian noise with zero mean and variance $\sigma^2$, after decoder 2004, the noise is spatially correlated with correlation given by:

$$\text{Noise correlation} = \sigma^2 H_f H^T_f$$

where 'T' again denotes transpose. A grammian ($H_f H^T$) of the decoder convolution matrix now forms the noise spatial correlation. The noise after the decoder may not be independent and white but may be spatially correlated due to the action of decoder 2004. Without decoder 2004, the noise in the iris feature code calculation is uncorrelated and independent for each spatial position and scale. With decoder 2004, the noise in the iris feature code calculation may become correlated with spatial position and scale. This noise correlation may act to remove the efficiency of the estimates of the iris feature code, resulting in a loss in information in the feature code, depending on the particular iris feature code. In essence, spatially correlated noise in the iris images results in the addition of noise-dependent statistical features. The noise features can make the expected Hamming distance between iris feature codes of iris images of the same iris increase (seem more different) and decrease (seem more similar) the expected Hamming distance between iris feature codes of iris images of different irises. In one case then, decoder 2004 acts to reformat the noise-free iris feature codes to be similar to that from the in-focus diffraction-limited system, but also makes the task of iris recognition and rejection in the presence of noise more difficult. For this type of task-based processing, decoder 2004 can be specialized or optional, with some systems preferring the absence of decoder 2004.

If noise n(x) directly from detector 2012, 2012A is spatially correlated, a form of processing q(x) and $H_q$ may be used before feature code formation, possibly in decoder 2004, to remove the noise correlation or whiten the noise to improve system recognition and rejection performance. In this case the whitening processing is:

$$H_q = \text{Noise\_Correlation\_Matrix}^{(1/2)}$$

Another case would be for decoder 2004 to apply a "phase-only" or all-pass filter prior to forming the iris feature code. A phase-only and all-pass filter has a unit magnitude frequency response and non-zero phase response. This type of filter is equivalent to spatially shifting different spatial frequency components by different amounts, but leaving the magnitude of the different spatial frequency components unchanged. Application of this type of filtering in decoder 2004 would not change the power spectrum of the additive noise n(x) and hence not correlate the additive noise n(x).

Another case would be for decoder 2004 to apply an all-pass filter to correct the phase of the different spatial frequency components of the signal while also multiplicatively modifying the amplitude of the spatial frequency components with values close to (including less than) one. This would yield a minimum of noise amplification and possibly a reduction of noise power. Changing the amplitude of the spatial frequency components would change the spatial correlation of the additive noise; this change may be balanced with a decrease in additive noise power for a particular iris feature code forming function.

The optics of wavefront coded imaging systems can be selected and designed so as to maximize certain types of image information transfer as well as to yield imaging advantages such as large depth of field, insensitivity to optical and mechanical aberrations and aliasing, etc. The information content of wavefront coded images can be considered as a function of spatial frequency. All practical images have noise. This noise acts to reduce the information content of the images. If the noise has essentially the same amount of RMS power at each spatial frequency, then the noise affects the information as a function of spatial frequency equally. The MTF of the imaging system varies as a function of spatial frequency. As information is closely related to signal-to-noise ratios, a spatial frequency component of an image formed with a high valued MTF has a higher information value than if formed with a lower valued MTF (assuming the same RMS noise power). In terms of the Hamming distance, two iris feature codes of the same specialized iris that contains only a single spatial frequency component will statistically increase in Hamming distance (become less similar) as the MTF value at the specific spatial frequency decreases. The Hamming distance will also statistically decrease (become more similar) for two different yet specialized irises as the MTF value at the specific spatial frequency decreases.

Rectangularly separable wavefront coding optics allows a high degree of information transfer in the x-y plane. If information transfer should be more angularly independent, if for example the angular orientation of the iris when imaged is not closely controlled, then non-separable optics should be used. The MTFs from these non-separable optics should be more circularly symmetric than is possible with rectangularly separable optics. Circularly symmetric wavefront coding optics can also be used in a case where the optical form is composed of the weighted sum of polynomials in the radius variable. Constant profile path optics are also useful for these systems, as are linear combinations of cosine terms in the form:

$$P(r, \theta) = \Sigma a_i r^i \cos(w_i \theta + \text{phi}_i)$$

Since certain changes may be made in the above methods and systems without departing from the scope thereof, it is intended that all matter contained in the above description or shown in the accompanying drawing be interpreted as illustrative and not in a limiting sense. It is also to be understood that the following claims are to cover certain generic and specific features described herein.

What is claimed is:

1. A biometric optical recognition system, comprising:
   optics, including a phase-modifying element, for encoding a wavefront of electromagnetic energy from an object and for imaging the electromagnetic energy to an intermediate image;
   a detector for detecting the intermediate image, wherein a modulation transfer function detected at the detector contains no zeros within a passband of the detector; and
   means for task based image processing output data from the detector to determine image information about the object and without generating an image for human viewing.

2. The system of claim 1, wherein the means for task based image processing comprises a decoder, connected with the detector.

3. The system of claim 2, the decoder comprising an all-pass filter in the frequency domain.

* * * * *